(12) United States Patent  
Grace et al.

(10) Patent No.: US 8,996,397 B2
(45) Date of Patent: Mar. 31, 2015

(54) PERFORMANCE DASHBOARD MONITORING FOR THE KNOWLEDGE MANAGEMENT SYSTEM

(75) Inventors: Daniel Douglas Grace, Waxhaw, NC (US); Srinivas Darga, Charlotte, NC (US); Eric Nathaniel Hunsaker, Huntersville, NC (US); Bryce Robert Elliott, Huntersville, NC (US); Rajaraman Viswanathan, Allen, TX (US); Michael J. Schreder, Concord, NC (US); Greg M. Lavelle, Jacksonville, FL (US); Darryl Alan Sansbury, Charlotte, NC (US); Christine Roche, Charlotte, NC (US); Rama Rao Pandrapagada, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1076 days.

(21) Appl. No.: 12/428,333

(22) Filed: Apr. 22, 2009

(65) Prior Publication Data
US 2010/0274596 A1 Oct. 28, 2010

(51) Int. Cl.
*G06Q 10/00* (2012.01)
*G06Q 40/00* (2012.01)
(Continued)

(52) U.S. Cl.
CPC .............. *G06Q 10/10* (2013.01); *G06Q 40/02* (2013.01); *G06Q 10/063114* (2013.01)
USPC ....... 705/7.39; 705/7.28; 705/7.29; 705/7.32; 705/7.36; 705/7.38

(58) Field of Classification Search
USPC ........... 705/3, 311, 7.14, 7.29, 35, 7.11–7.41; 370/244; 379/15.01, 133, 32.01; 726/23; 702/186; 709/217, 227
See application file for complete search history.

(56) References Cited

U.S. PATENT DOCUMENTS 5,666,481 A 9/1997 Lewis
(Continued)

FOREIGN PATENT DOCUMENTS

EP 1 202 197 A1 5/2002
(Continued)

OTHER PUBLICATIONS

Ishibashi, Koji. "Maintaining quality of service based on ITIL-based IT service management." Fujitsu scientific and technical journal 43.3 (2007): 334-344.*

(Continued)

*Primary Examiner* — Alan S Miller
(74) *Attorney, Agent, or Firm* — Michael A. Springs; Moore & Van Allen PLLC; Jeffrey R. Gray

(57) ABSTRACT

Embodiments of the present invention provide a method, system, computer program product, or a combination of the foregoing for creating a knowledge management system including a performance dashboard monitoring system that is standardized and centralized across the channels and sub-channels in an organization. The performance dashboard monitoring system is used to track, measure, and resolve incidents that occur throughout the channels, sub-channels, systems, and applications of an organization. The system receives information related to two or more incidents, where each incident is associated with one or more of a business channel, sub-channel, or application. The system stores the information on a memory device. The system tracks the status of at least one incident between the occurrence and the resolution of the incident. The system displays on a user interface the information related to the incident on a channel, sub-channel, application, or individual incident level.

26 Claims, 36 Drawing Sheets

(51) Int. Cl.
*G06Q 10/10* (2012.01)
*G06Q 40/02* (2012.01)
*G06Q 10/06* (2012.01)

(56) References Cited

U.S. PATENT DOCUMENTS

| | | | |
|---|---|---|---|
| 6,032,184 | A | 2/2000 | Cogger et al. |
| 7,069,184 | B1 * | 6/2006 | Barger et al. ............... 702/186 |
| 7,225,139 | B1 | 5/2007 | Tidwell et al. |
| 7,357,301 | B1 | 4/2008 | Bajpay et al. |
| 7,636,424 | B1 * | 12/2009 | Halikhedkar et al. ..... 379/15.01 |
| 7,925,527 | B1 * | 4/2011 | Flam ............................ 705/7.14 |
| 7,957,022 | B2 * | 6/2011 | Anno ............................ 358/1.15 |
| 2004/0153437 | A1 * | 8/2004 | Buchan ............................ 707/1 |
| 2005/0050210 | A1 * | 3/2005 | Kennedy ...................... 709/229 |
| 2005/0221267 | A1 | 10/2005 | Berman |
| 2005/0246184 | A1 | 11/2005 | Abbadessa et al. |
| 2006/0126801 | A1 * | 6/2006 | Laperi et al. ............... 379/32.01 |
| 2006/0134593 | A1 | 6/2006 | Kalous et al. |
| 2006/0173762 | A1 * | 8/2006 | Clater ............................ 705/35 |
| 2006/0204943 | A1 | 9/2006 | Kimball |
| 2007/0050239 | A1 | 3/2007 | Caneva |
| 2007/0094281 | A1 | 4/2007 | Malloy et al. |
| 2007/0168874 | A1 | 7/2007 | Kloeffer et al. |
| 2007/0250360 | A1 | 10/2007 | Goddard et al. |
| 2007/0260735 | A1 * | 11/2007 | Olsson et al. ................. 709/227 |
| 2007/0294258 | A1 * | 12/2007 | Caldwell et al. ............... 707/10 |
| 2008/0016569 | A1 * | 1/2008 | Hammer et al. ................ 726/23 |
| 2008/0062885 | A1 * | 3/2008 | Moon et al. ................... 370/244 |
| 2008/0086359 | A1 * | 4/2008 | Holton et al. ................... 705/10 |
| 2008/0168453 | A1 | 7/2008 | Hutson et al. |
| 2008/0228504 | A1 | 9/2008 | Nguyen et al. |
| 2008/0262904 | A1 | 10/2008 | Conway et al. |
| 2009/0055720 | A1 | 2/2009 | Ngo et al. |

FOREIGN PATENT DOCUMENTS

| | | | |
|---|---|---|---|
| WO | WO 03093931 | A2 * | 11/2003 |
| WO | 2007149924 | A2 | 12/2007 |
| WO | WO 2007/149924 | A3 | 12/2007 |
| WO | 2008060427 | A2 | 5/2008 |
| WO | WO 2008/060427 | A2 | 5/2008 |
| WO | 2008083345 | A2 | 7/2008 |
| WO | WO 2008/083345 | A2 | 7/2008 |

OTHER PUBLICATIONS

Linderman, Kevin, et al. "Integrating quality management practices with knowledge creation processes." Journal of Operations Management 22.6 (2004): 589-607.*

Adam, Frédéric, and Jean-Charles Pomerol. "Developing practical decision support tools using dashboards of information." Handbook on Decision Support Systems 2. Springer Berlin Heidelberg, 2008. 151-173.*

Wu, "A model for inbound supply risk analysis," 2006, Computers in Industry, vol. 57, pp. 350-365.*

GB Search Report dated Oct. 13, 2010 for GB Application No. GB1006615.7.

GB Search Report dated Aug. 11, 2010 for GB Application No. GB1006638.9.

GB Search Report dated Aug. 17, 2010 for GB Application No. GB1006648.8.

GB Search Report dated Aug. 18, 2010 for GB Application No. GB1006634.8.

GB Search Report dated Aug. 19, 2010 for GB Application No. GB1006626.4.

Singapore Patent Application No. 201002766-2 Search Report and Written Opinion dated Jun. 30, 2011.

Singapore Patent Application No. 201002763-9 Search Report and Written Opinion dated Jul. 13, 2011.

Singapore Patent Application No. 201002764-7 Search Report and Written Opinion dated Jul. 15, 2011.

Singapore Patent Application No. 201002765-4 Search Report and Written Opinion dated Jul. 19, 2011.

Singapore Patent Application No. 201002768-8 Search Report and Written Opinion dated Jul. 26, 2011.

Singapore Examination Report for Application No. 201002763-9 dated Mar. 29, 2012.

Singapore Examination Report for Application No. 201002764-7 dated Mar. 27, 2012.

Singapore Examination Report for Application No. 201002765-4 dated Mar. 23, 2012.

Singapore Examination Report dated Apr. 26, 2012 for Application No. 201002766-2.

Singapore Examination Report dated May 11, 2012 for Application No. 201002768-8.

Chinese Office Action dated Nov. 16, 2012 for Application No. 201010167859.3.

* cited by examiner

```
┌─────────────────────────────────────────────────────────────────────────┐
│ THE KNOWLEDGE MANAGEMENT APPLICATION 125 RECEIVES INCIDENTS FROM THE    │
│ BANK COMPUTER SYSTEMS 140 AS THE INCIDENTS OCCUR THROUGHOUT THE VARIOUS │
│ BANK COMPUTER SYSTEMS 140 AND ASSOCIATED BANK APPLICATIONS 145.         │
│ 1502                                                                    │
└─────────────────────────────────────────────────────────────────────────┘
                                    │
                                    ▼
┌─────────────────────────────────────────────────────────────────────────┐
│ THE KNOWLEDGE MANAGEMENT APPLICATION 125 ORGANIZES THE INCIDENTS BY     │
│ STATUS, DESCRIPTION, START-DATE, END-DATE, DURATION, SEVERITY, CHANNEL  │
│ IMPACTED, SUB-CHANNEL IMPACTED, FAILED CUSTOMER INTERACTION, ETC. AND   │
│ STORES THE DATA ON THE BANK DATABASES 130 FOR ANALYSIS.                 │
│ 1504                                                                    │
└─────────────────────────────────────────────────────────────────────────┘
                                    │
                                    ▼
┌─────────────────────────────────────────────────────────────────────────┐
│ THE KNOWLEDGE MANAGEMENT APPLICATION 125 COMMUNICATES WITH THE USER     │
│ COMPUTER SYSTEMS 110 FOR DISPLAYING THE DATA RELATED TO THE INCIDENTS ON A│
│ OVERALL, CHANNEL, SUB-CHANNEL, AND INDIVIDUAL INCIDENT LEVEL THROUGH THE│
│ DASHBOARD 500.                                                          │
│ 1506                                                                    │
└─────────────────────────────────────────────────────────────────────────┘
                                    │
                                    ▼
┌─────────────────────────────────────────────────────────────────────────┐
│ THE USER 104 UTILIZES THE WEB BROWSER 115 TO ACCESS THE KNOWLEDGE       │
│ MANAGEMENT APPLICATION 125 TO STAY AWARE OF THE INCIDENTS OCCURRING AT THE│
│ BANK ON A OVERALL, CHANNEL, SUB-CHANNEL, AND INDIVIDUAL INCIDENT LEVEL  │
│ THROUGH THE DASHBOARD 500.                                              │
│ 1508                                                                    │
└─────────────────────────────────────────────────────────────────────────┘
```

THE KNOWLEDGE MANAGEMENT APPLICATION 125 RECEIVES WEIGHTED VALUES FOR HOW EACH OF THE PREDICTABILITY FACTORS AFFECTS EACH OF THE CATEGORIES MANUALLY FROM A USER 104 THROUGH THE USER COMPUTER SYSTEMS 110 OR AUTOMATICALLY THROUGH THE BANK COMPUTER SYSTEMS 140.
1602

THE KNOWLEDGE MANAGEMENT APPLICATION 125 RECEIVES WEIGHTED VALUES FOR HOW EACH OF THE CATEGORIES AFFECTS EACH OF THE APPLICATIONS, SUB-CHANNELS, OR CHANNELS, AND/OR HOW EACH OF THE APPLICATIONS AFFECTS EACH OF THE SUB-CHANNELS, OR CHANNELS, AND/OR HOW EACH OF THE SUB-CHANNELS AFFECTS EACH OF THE CHANNELS. THE WEIGHTED VALUES ARE RECEIVED MANUALLY FROM A USER 104 THROUGH THE USER COMPUTER SYSTEMS 110 OR AUTOMATICALLY THROUGH THE BANK COMPUTER SYSTEMS 140.
1604

THE KNOWLEDGE MANAGEMENT APPLICATION 125 RECEIVES RELIABILITY DATA FOR THE PREDICTABILITY FACTORS FOR EACH BANK APPLICATION 145 MANUALLY FROM A USER 104 THROUGH THE USER COMPUTER SYSTEMS 110 OR AUTOMATICALLY THROUGH THE BANK COMPUTER SYSTEMS 140.
1606

THE KNOWLEDGE MANAGEMENT APPLICATION 125 TRANSFERS THE RELIABILITY DATA INTO A SCORE FOR EACH PREDICTABILITY FACTOR EITHER MANUALLY BY A USER 104 THROUGH THE USER COMPUTER SYSTEMS 110 OR AUTOMATICALLY THROUGH THE BANK COMPUTER SYSTEMS 140.
1608

THE KNOWLEDGE MANAGEMENT APPLICATION 125 ROLLS UP THE SCORES FOR EACH PREDICTABILITY FACTOR INTO A CATEGORY SCORE, AN APPLICATION SCORE, A SUB-CHANNEL SCORE, AND A CHANNEL SCORE BASED ON THE WEIGHTED VALUES OF THE PREDICTABILITY FACTORS, CATAGORIES, APPLICATIONS, AND SUB-CHANNELS IN EACH CHANNEL.
1610

FIG. 14b

TRIAGE ALLY - OPERATIONAL RELIABILITY INDEX QUESTIONNAIRE

| CATEGORY | FCI PREDICTABILITY FACTORS | ANSWER | SUB CATEGORY WEIGHTING | SOURCE | FORMAT | SCALE | CATEGORY WEIGHTING ||||||
|---|---|---|---|---|---|---|---|---|---|---|---|---|
| | | | | | | | E-COMM. | BCT | DCC | CARD | CRE | ATM |
| | | | | | | | 25% | 20% | 25% | 25% | 30% | 10% |
| CHANGE MANAGEMENT 611 | ARE THE PROCEDURES FOR INITIATING, APPROVING, VERIFYING AND SCHEDULING CHANGES ALWAYS ADHERED TO? | | 30% | APPLICATION MANAGER | YES/NO | | | | | | | |
| | IS THERE A CLEAR DISTINCTION BETWEEN A CHANGE REQUEST (e.g. UPGRADE APPLICATION, CHANGE ROUTER CONFIGURATION, UPDATE FIREWALL POLICIES, ETC) AND A SERVICE REQUEST (e.g. RESETTING A PASSWORD)? | | 15% | APPLICATION MANAGER | YES/NO | 1(LOWEST)-10 | | | | | | |
| | ARE THERE REGULAR REVIEW (ex. AT LEAST QUARTERLY) ON PERFORMANCE OF CHANGES IMPLEMENTED AGAINST DOCUMENTED KEY PERFORMANCE INDICATORS (KPI's) FOR THIS APPLICATION? | | 15% | APPLICATION MANAGER | YES/NO | | | | | | | |
| | ARE MULTIPLE RELATED CHANGES GROUPED AND THEN PROPERLY SCHEDULED AND COMMUNICATED TO MINIMIZE THE IMPACT TO THE BUSINESS USERS INCLUDING LAST MINUTE SCHEDULE CHANGES (FOR EXAMPLE, UNFORESEEN DELAYS DURING IMPLEMENTATION)? | | 40% | APPLICATION MANAGER | YES/NO | | | | | | | |
| AVAILABILITY MANAGEMENT 612 | ARE THERE ANY SINGLE POINTS OF FAILURE (IF NOT KNOWN, PLEASE ANSWER YES)? | | 30% | APPLICATION MANAGER | YES/NO (NO =30%) | NO = 50% | 15% | 20% | 15% | 15% | 10% | 20% |
| | IF YES, CRITICALITY TO ENV OF SPOF? | | | APPLICATION MANAGER | 1 - 5 | YES = 5 | | | | | | |
| | ARE AVAILABILITY IMPACT INFORMATION (INCLUDING THE DETAIL OF THE IMPACT OF PROPOSED CHANGES) COMMUNICATED TO THE CHANGE MANAGEMENT PROCESS AREA? | | 10% | APPLICATION MANAGER | | | | | | | | |
| | IS THERE A REGULAR (ex. AT LEAST EVERY 6-MONTHS) REVIEW OF CURRENT INFRASTRUCTURE AGAINST REQUIRED AVAILABILITY 1. WITH A VIEW TO IDENTIFY SPOF? 2. WITH A VIEW TO OPTIMIZING EQUIPMENT (LOWERING COST)? | | 15% | APPLICATION MANAGER | | | | | | | | |
| | DO YOU HAVE PROCEDURES FOR MONITORING, ANALYZING, AND FORECASTING SERVICE AVAILABILITY? | | 5% | APPLICATION MANAGER | | | | | | | | |
| | ARE THERE AUDIT PROCEDURES IN PLACE TO VALIDATE THE ONGOING ACCURACY AND APPROPRIATENESS OF THE MONITORING AND FORECASTING PROCEDURES? | | 15% | APPLICATION MANAGER | | | | | | | | |
| | DO YOU HAVE DEFINED TARGETS FOR THE AVAILABILITY, RELIABILITY AND MAINTAINABILITY OF IT INFRASTRUCTURE COMPONENTS (INCLUDING 3RD PARTY VENDORS) RELIED UPON BY THE APPLICATION? | | 10% | APPLICATION MANAGER | | | | | | | | |
| | DO YOU CARRY OUT MONITORING AND TREND ANALYSIS OF THE AVAILABILITY, RELIABILITY AND MAINTAINABILITY OF IT INFRASTRUCTURE COMPONENTS (INCLUDING 3RD PARTY VENDORS) TO HELP IDENTIFY POTENTIAL FUTURE BOTTLENECKS? | | 15% | APPLICATION MANAGER | | | | | | | | |

FIG. 14c

TRIAGE ALLY - OPERATIONAL RELIABILITY INDEX QUESTIONNAIRE

| CATEGORY | FCI PREDICTABILITY FACTORS | ANSWER | SUB CATEGORY WEIGHTING | SOURCE | FORMAT | SCALE | CATEGORY WEIGHTING ||||||
|---|---|---|---|---|---|---|---|---|---|---|---|---|
| | | | | | | | E-COMM. | BCT | DCC | CARD | MHETT | ATM |
| | | | | | | | 10% | 15% | 20% | 20% | 10% | 20% |
| SERVICE CONTINUITY MANAGEMENT (613) | BUSINESS CONTINUITY PLAN IN STANDARD FORMAT? | | 30% | AIT | YES/NO | YES=10% NO=0% | | | | | | |
| | DATE OF LAST TEST | | 1-2+YEARS | AIT | >1 YR 0% | <1 YR 30% | | | | | | |
| | HAVE ALL OUTSTANDING ISSUES IDENTIFIED AS A RESULT OF TESTING BEEN RESOLVED OR IS AN APPROVED BUSINESS CONTINUITY REMEDIATION PLAN IN PLACE? | | 15% | AIT | YES/NO | | | | | | | |
| | IS THERE A DOCUMENTED AND KNOWN RECOVERY PLAN IN PLACE FOR EACH SERVICE AREA, IN THE EVENT OF AN UNFORESEEN ISSUE? | | 5% | AIT | | | | | | | | |
| | ARE THERE REGULAR BACKUPS OF CRITICAL DATA TAKEN AND STORED SECURELY? | | 30% | | | | | | | | | |
| | ARE CRITICAL BACKUPS OF INFORMATION TESTED ON A REGULAR BASIS? | | 10% | | | | | | | | | |
| | IS TESTING PERFORMED FOR QUALITY ATTRIBUTES SUCH AS RELIABILITY, USABILITY, AND MAINTAINABILITY? | | 10% | | | | 5% | 5% | 5% | 5% | 5% | 5% |
| KNOWLEDGE TRANSFER MANAGEMENT (614) | HAS HANDOVER/TAKEOVER MEETING CONDUCTED WITH INITIAL TEAM? | | 10% | APPLICATION MANAGER | YES/NO | YES=10% NO=0% | | | | | | |
| | HAS NECESSARY DOCUMENTATION BEEN COMPLETED | | 30% | APPLICATION MANAGER | YES/NO | YES=30% NO=0% | | | | | | |
| | RATE THE QUALITY OF ONBOARDING NEW RESOURCES (BANK AND STRATEGIC PARTNER) | | 20% | APPLICATION MANAGER | 1-5 WITH 5 BEING BEST QUALITY | 5=20% 4=15% 3=10% 2=5% 1=0% | | | | | | |
| | RATE THE QUALITY OF TRAINING DOCUMENTATION AND SCHEDULES | | 20% | APPLICATION MANAGER | 1-5 WITH 5 BEING BEST QUALITY | 5=20% 4=15% 3=10% 2=5% 1=0% | | | | | | |
| | ARE WORKAROUNDS DOCUMENTED/NEW CHANGES TESTED WITH WORKAROUNDS IN PLACE? | | 20% | APPLICATION MANAGER | | | | | | | | |

FIG. 14d

TRIAGE ALLY - OPERATIONAL RELIABILITY INDEX QUESTIONNAIRE

| CATEGORY | FCI PREDICTABILITY FACTORS | ANSWER | SUB CATEGORY WEIGHTING | SOURCE | FORMAT | SCALE | CATEGORY WEIGHTING ||||||
|---|---|---|---|---|---|---|---|---|---|---|---|---|
| | | | | | | | E-COMM. | BCT | DCC | CARD | MHETT | ATM |
| | | | | | | | 15% | 15% | 15% | 15% | 15% | 15% |
| INFRASTRUCTURE AND RISK MANAGEMENT (615) | DOES APPLICATION USE ANY NON-PERMITTED TECHNOLOGIES? (CONSIDER SOFTWARE LEVEL: NON-PERMITTED SCORE BY NCG (CAN BE MORE THAN 1 PER APPLICATION) | | 50% | RTT | YES/NO | NO=50% | | | | | | |
| | IF YES, HOW MANY INSTANCES OF NP TECHNOLOGY EXISTS? | | | RTT | | | | | | | | |
| | DOES APPLICATION HAVE REMEDIATION PLAN FOR ANY NON-PERMITTED TECHNOLOGIES? | | | RTT | | YES=(1 INSTANCE= 30%; >1=10%; NO=0% | | | | | | |
| | DOES APPLICATION HAVE A CONTROL PLAN? | | 30% | AIT | YES/NO | NO=0% | | | | | | |
| | WAS CONTROL PLAN UPDATED WITHIN PAST CALENDAR YEAR? | | | AIT | >1 YR, 0% | <1 YR, 30% | | | | | | |
| | DOES THE BUSINESS IMPACT ANALYSIS EXIST? | | 20% | AIT | YES/NO | NO=0% | | | | | | |
| | ON AVERAGE HOW CLOSE ARE CURRENT PROCESSING VOLUMES TO THE VOLUME CEILING OF THE APPLICATION? | | 40% | AIT | <40%, 40-80%, >80% | <40%= 40%, 40-80%= 15%, >80%= 0% | | | | | | |
| CAPACITY MANAGEMENT (616) | ARE THERE ANY KNOWN INITIATIVES THAT WILL INCREASE RATE OF GROWTH? (INITIATIVE, SALES CAMPAIGNS, ETC.) | | 5% | APPLICATION MANAGER | YES/NO | | 5% | 5% | 5% | 5% | 5% | 5% |
| | ARE THRESHOLD ALARMS IN PLACE FOR INDIVIDUAL SERVICES THAT ALERT STAFF ABOUT APPROACHING MAXIMUM CAPACITY LIMITS? | | 10% | APPLICATION MANAGER | | | | | | | | |
| | ARE KEY COMPONENTS (RESOURCES) MONITORED FOR CAPACITY LOAD (e.g., HARD DISK, MEMORY, CPU, etc.) | | 10% | APPLICATION MANAGER | | | | | | | | |
| | IS CAPACITY DATA CONSTANTLY ANALYZED TO HELP IN RESOLUTION OF INCIDENTS AND PROBLEMS? | | 5% | APPLICATION MANAGER | | | | | | | | |
| | ARE CHANGES TO THE CAPACITY OF THE APPLICATION HANDLED THROUGH A FORMAL CHANGE MANAGEMENT PROCESS? | | 30% | APPLICATION MANAGER | | | | | | | | |

FIG. 14e

TRIAGE ALLY - OPERATIONAL RELIABILITY INDEX QUESTIONNAIRE

| CATEGORY | FCI PREDICTABILITY FACTORS | ANSWER | SUB CATEGORY WEIGHTING | SOURCE | FORMAT | SCALE | CATEGORY WEIGHTING ||||||| 
|---|---|---|---|---|---|---|---|---|---|---|---|---|
| | | | | | | | E-COMM | BCT | DCC | CARD | MHETT | ATM |
| | | | | | | | 10% | 10% | 5% | 5% | 10% | 10% |
| SERVICE LEVEL MANAGEMENT (617) | DO SERVICE LEVEL AGREEMENTS EXIST BETWEEN LOB AND GTS&F? | | 20% | AIT | YES/NO | YES= 20%,NO= 0% | | | | | | |
| | IS RISK RATING ASSIGNED BY LOB? | | 20% | AIT | YES/NO | YES= 20%,NO= 0% | | | | | | |
| | DOES THE CURRENT APPLICATION DESIGN SUPPORT THE LOB RISK RATING/SLA? | | 20% | APPLICATION MANAGER | YES/NO | YES= 20%,NO= 0% | | | | | | |
| | ARE AGREEMENTS WITH VENDORS DOCUMENTED AND REFLECTED IN THE SLA'S? | | 20% | APPLICATION MANAGER | | | | | | | | |
| | DOES THE SLA STRUCTURE INCLUDE FEATURES SUCH AS RELIABILITY, SECURITY, SERVICE HOURS, SUPPORT, RESPONSE TIMES, TURNAROUND TIMES, PERFORMANCE CRITERIA? | | 10% | APPLICATION MANAGER | | | | | | | | |
| | ARE THERE MECHANISMS IN PLACE TO MONITOR AND MEASURE ALL ITEMS IN EXISTING SLAS? | | 5% | APPLICATION MANAGER | | | | | | | | |
| | DO SLAS HAVE CLEARLY IDENTIFIED KEY TARGETS FOR SERVICE HOURS, AVAILABILITY, RELIABILITY, SUPPORT, RESPONSE TIMES AND CHANGE HANDLING? | | 5% | APPLICATION MANAGER | | | 15% | 10% | 10% | 10% | 15% | 15% |
| SYSTEMS MANAGEMENT (618) | ARE TOOLS AND PROCESSES IN PLACE TO AUTOMATE OR QUICKLY REACT TO CUSTOMER/AGENT IMPACTING EVENTS TO PROVIDE OPERATIONAL RELIEF? | | 35% | APPLICATION MANAGER | | | | | | | | |
| | ARE COMPONENT BASED TECHNOLOGY MONITORING TOOLS AVAILABLE? EXAMPLE: INTROSCOPE, PERFMON, NETSCOUT, SITESCOPE, MQUEUE COMMAND CENTER, etc. | | 15% | APPLICATION MANAGER | | | | | | | | |
| | IS THE OPERATING SYSTEM (ON WHICH THE APPLICATION COMPONENTS ARE INSTALLED) MONITORED ON SERVER AND CLIENT MACHINES (CPU LOAD, MEMORY USAGE, DIRECTORY SPACE) | | 10% | APPLICATION MANAGER | | | | | | | | |
| | IS THE OPERATING SYSTEM (ON WHICH THE APPLICATION COMPONENTS ARE INSTALLED) MONITORED ON SERVER AND CLIENT MACHINES (PAGING, FILE I/O, NETWORK I/O, LOCAL DISK I/O, REMOTE DISK I/O) | | 5% | APPLICATION MANAGER | | | | | | | | |
| | ARE APPLICATION PERFORMANCE TRENDS MONITORED AND PROJECTED FORWARD TO INDICATE WHEN THRESHOLDS WILL BREAK AND PROJECTED BREAKS THAT ARE ALERTED WITH SUFFICIENT TIME TO ALTER THE APPLICATION/SYSTEM TO AVOID SERVICE BREAKS FROM HAPPENING? | | 15% | APPLICATION MANAGER | | | | | | | | |
| | ARE COMPONENT/APPLICATION INTERFACES MONITORED (ALL COMPONENT BOUNDARIES, FRAMEWORK INTERFACES) | | 5% | APPLICATION MANAGER | | | | | | | | |
| | ARE CUSTOMER EXPERIENCE MONITORING TOOLS AVAILABLE? EXAMPLE: TOPAZ, ONLINE BANKING MONITOR, COMPUWARE VANTAGE AGENTLESS MONITORING (MEASURE TRANSACTION RESPONSE TIME, TRANSACTION VOLUME) | | 15% | APPLICATION MANAGER | | | | | | | | |
| | | | | | | | 100% | 100% | 100% | 100% | 100% | 100% |

INCIDENT INFORMATION — 751

- 752 — TITLE:
- 754 — START DATE:
- DURATION:
- 760 — INCIDENT TICKET:
- 764 — STATUS: --PLEASE SELECT--
- 766 — ROOT CAUSE OWNER: --PLEASE SELECT--
- 768 — C&CST ASSIGNEE: --PLEASE SELECT--

- 756 — END DATE:
- 763 — SEVERITY: --PLEASE SELECT--
- 762 — PROBLEM TICKET:
- RESTORAL SLA MET:
- SHOW ON DAILY REPORT:

CONTINUE ▷

1 2 3 4

HOME  INITIATIVES  ANALYTICS  GLOBAL FUNCTIONS  FEEDBACK  CONTACT US  ADMIN

FIG. 16

DAILY REPORT

DESCRIPTION: HYDERABAD AND GURGAON AGENTS EXPERIENCING LATENCY WITHIN SALES AND FULFILLMENT SYSTEM (SFS) APPLICATION
START DATE: DATE, TIME   END DATE: DATE, TIME   DURATION: 258   ROOT CAUSE OWNER: LEVEL 2 PROD SUPT
INCIDENT TICKET: XXXXXXX   PROBLEM TICKET: XXXXXXX   SEVERITY: 2   SLA MET: [ ]
PPR RECORD:   CAR:

CAUSAL INFORMATION — 780

WHERE DID FAILURE ORIGINATE? SYSTEM: — 781
WHAT EVENT CAUSED FAILURE? EVENT: — 782         APPLICATION              DCC/DEPOSITS
WHAT ISSUES COMPOUNDED THE IMPACT OF THE INITIAL FAILURE? IMPACT: — 783

IMPACT INFORMATION — 790

| IMPACTED CHANNEL | IMP TECH EXEC | IMP SUB-CHANNEL | GEOGRAPHIC LOCATION | FCI | DCI | PHL | AML |
|---|---|---|---|---|---|---|---|
| DCC | SEESE | DEPOSIT CONTACT CENTERS | MULTIPLE | 0 | 0 | 0 | 8240 |
| TOTAL | | | | 0 | 0 | 0 | 8240 |

791 / 792 / 793 / 794 / 795 / 796 / 797 / 798

ISSUE: STARTING FROM DATE AT TIME, AGENTS IN HYDERABAD AND GURGAON WERE EXPERIENCING 3 TO 5 MINUTES LATENCY WITHIN THE SALES AND FULFILLMENT SYSTEM (SFS) APPLICATION. THIS INCIDENT WAS UPGRADED TO SEVERITY 2 AT TIME AS THE ISSUE WAS ONGOING FOR MORE THAN 3 HOURS.

CUSTOMER: AGENTS IN HYDERABAD AND GURGAON EXPERIENCED LATENCY OF 3 TO 5 MINUTES IN THE SFS APPLICATION WHEN CLICKING THE 'UPDATE' AND 'UPDATE FINAL' FUNCTIONS. 92 AGENTS WERE IMPACTED.

RESTORAL: SERVICE WAS RESTORED AT TIME WITHOUT ANY INTERVENTION.

CAUSE: TECHNICAL TEAMS ARE ENGAGED TO DETERMINE WHAT CAUSED THE SFS APPLICATION LATENCY.

RESOLUTION:

MOD - COMM Incident Report

File Edit View Favorites Tools Help

Back • ⊕ • ⊠ ☒ ⌂ | ⌕ Search ⭐ Favorites | ... | ... | Address [...............] Go

822 — BRIEF DESCRIPTION:
CARD NOT WORKING

823 — PROBLEM DESCRIPTION:*
CARD NOT WORKING

830 — ARE CUSTOMERS/ASSOCIATES IMPACTED:* YES ▼

831 — ▶ INCIDENT IMPACT

☑ECOMMERCE ☐ATM ☐BANKING CENTER ☐DCC ☐CARDS ☐MHEIT ☐SMALL BUSINESS ☐GWIM ☐GCIB ☐OTHERS ☐ALL

ECOMMERCE          832 — CLICK TO ENTER SUB CHANNEL IMPACT          GREEN

FCIs              DCIs
XXXXX              0

FCI-DCI BREAKOUT:
833 — CONSUMER FCIs - XXXXX, CONSUMER DCIs - 0, SMALL BUSINESS FCIs - 0, MILITARY BANKING ONLINE FCIs - 0, MILITARY BANKING ONLINE DCIs - 0

AFFECTED APPLICATION/FUNCTIONALITY:
834 — E-STATEMENT ERRORS

CUSTOMER EXPERIENCE:
835 — SOME CUSTOMERS WILL NOT BE ABLE TO ACCESS THEIR E-STATEMENTS.

Local intranet

*FIG. 21*

MOD - COMM Incident Report
File Edit View Favorites Tools Help

SOME CUSTOMERS WILL NOT BE ABLE TO ACCESS THEIR E-STATEMENTS.

836 — GEOGRAPHICAL LOCATION --SELECT--
837 — TOTAL INCIDENT IMPACT
FCIs    DCIs    AML    PHL
XXXXX    0    0    0        GET TOTAL

840 — ▼ DESCRIPTION

841 — COMMDETAILS UPDATE # 1    DESCRIPTION
    COMMDETAILS    INCIDENTDETAILS
842 — EDIT  DELETE  NEW    ADD NEW COMMUNICATION    ADD NEW
843 — WORK AROUND:    832
    NO WORK AROUND AVAILABLE
844 — RESTORAL/RESOLUTION:
    ISSUE IS ON GOING
    ROOT CAUSE DESCRIPTION:
    UNDER INVESTIGATION

*FIG. 22*

MOD - COMM Incident Report
File Edit View Favorites Tools Help
Back ▸ ⊗ ▸ Search ★Favorites

845 — ROOT CAUSE DESCRIPTION:
UNDER INVESTIGATION

846 — CHANGE NUMBER ASSOCIATED (IF ANY):RFC# 0
847 — INCIDENT DURATION: 0  HOURS 0  MINUTES
848 — LINK TO SERVICE CENTER TICKET
      MANAGER ON DUTY CONTACT# TELEPHONE NUMBER 1

850 — ▼ OTHER DETAILS

851 — PROBLEM SUMMARY:

852 — TICKET ASSIGNMENT:

853 — PERMANENT RESOLUTION:
      0

WHAT TOOLS DID YOU USE TO TRIAGE THIS ISSUE?

```
┌─────────────────────────────────────────────────────────────────────┐
│ THE KNOWLEDGE MANAGEMENT APPLICATION 125 RECEIVES TRAINING MODULES AND │
│ CERTIFICATION PROGRAMS, ALONG WITH THE ASSOCIATED TESTS, QUIZZES, VIDEO │
│ FILES, AUDIO FILES, ETC. FROM A USER 104 THROUGH THE USER COMPUTER SYSTEMS │
│ 110 OR AUTOMATICALLY THROUGH THE BANK COMPUTER SYSTEMS 140 AND STORES │
│ THEM IN THE BANK DATABASES 130. │
│ 1902 │
└─────────────────────────────────────────────────────────────────────┘
                                    ↓
┌─────────────────────────────────────────────────────────────────────┐
│ WHEN A USER 104 SELECTS A TRAINING MODULE OR CERTIFICATION PROGRAM │
│ THROUGH THE USER COMPUTER SYSTEM 110 THE KNOWLEDGE MANAGEMENT │
│ APPLICATION 125 ALLOWS THE USER 104 ACCESS TO THAT MODULE OR CERTIFICATION │
│ PROGRAM. │
│ 1904 │
└─────────────────────────────────────────────────────────────────────┘
                                    ↓
┌─────────────────────────────────────────────────────────────────────┐
│ AS THE USER 104 COMPLETES THE TRAINING MODULES OR CERTIFICATION PROGRAMS │
│ AND THE ASSOCIATED TESTS, QUIZZES, ETC. THE KNOWLEDGE MANAGEMENT │
│ APPLICATION 125 RECEIVES THE NOTIFICATION OF COMPLETION FROM THE USER │
│ COMPUTER SYSTEMS 110 AND STORES THE PROGRESS IN THE BANK DATABASES 130. │
│ 1906 │
└─────────────────────────────────────────────────────────────────────┘
                                    ↓
┌─────────────────────────────────────────────────────────────────────┐
│ AS THE USER 104 COMPLETES THE TRAINING MODULES OR CERTIFICATION PROGRAMS │
│ THE KNOWLEDGE MANAGEMENT APPLICATION 125 UNLOCKS ADDITIONAL TRAINING │
│ MODULES OR CERTIFICATION PROGRAMS FOR THE USER 104. │
│ 1908 │
└─────────────────────────────────────────────────────────────────────┘
                                    ↓
┌─────────────────────────────────────────────────────────────────────┐
│ THE KNOWLEDGE MANAGEMENT APPLICATION 125 ALSO TRACKS AND STORES THE │
│ RESULTS OF ANY TESTS, QUIZZES, TRAINING MODULES, OR CERTIFICATION PROGRAMS │
│ IN A TRANSCRIPT SECTION IN THE BANK DATABASES. │
│ 1910 │
└─────────────────────────────────────────────────────────────────────┘
```

PERFORMANCE DASHBOARD MONITORING FOR THE KNOWLEDGE MANAGEMENT SYSTEM

This invention relates generally to the field of knowledge management, and more particularly embodiments of the invention relate to systems, methods, and computer program products for providing a comprehensive system for production support information.

BACKGROUND

Businesses store applications, information, and data across various lines of business ("LOB") in a decentralized fashion. Typically, specific departments within each LOB are responsible for compiling, sorting, storing, and accessing the knowledge of the associates working within each department in the most effective way they see fit, if it is done at all. The applications, information, and data are neither stored in central locations, nor are searchable or usable for knowledge transfer and general education between departments and LOBs. Furthermore, when production incidents occur, the proper processes and fixes are not within the reach of each of the associates assigned to support the production incidents. Therefore, when an associate has a question outside of his/her department's own knowledge base, the associate makes inquires through calls or e-mails to a business's own call center or other support system, in order to find the appropriate answer or contact reference. Inquires are typically forwarded on to a group with the responsibility of escalating them to the appropriate business team. Subject matter experts can also be pulled into the inquire in order to explain the system architecture, and upstream and downstream system and customer impacts. When the incidents relate to small issues, the personnel necessary to troubleshoot and fix the issue may only be tied up for a short period of time, however this time could be avoided with a more efficient system. When the incidents are significant, the process can take weeks to resolve and involve personnel being sent on-site or communicating on the phone with associates for a considerable amount of time in order to resolve the incidents. This time intensive process removes key associates from their day-to-day responsibilities on a long term basis.

Each time an incident is escalated to a higher support level it costs valuable time and negatively impacts a business's customers. Typical knowledge management systems are personally based, in that they are dependent upon the knowledge levels of certain associates in various groups. Therefore, contacting the specific associates whenever an incident occurs is inefficient and far from a best practice. Employees using these systems respond reactively to any incidents and pull associates in a number of groups away from their normal roles, which translates into increased costs.

Furthermore, when audit reviews take place within a business, a significant manual undertaking must occur to collect the data and organize it in a meaningful way. This data collection and organization is followed by lengthy face-to-face meetings to review and analyze individual data in detail. Audit teams must do this on a LOB-by-LOB and department-by-department basis since most LOBs and departments organize and store their data and documents in different manners. Thus, it becomes particularly expensive and time consuming to audit different departments within an organization if the measuring metrics and processes are organized in a decentralized manner and are not standardized across the business. This problem increases exponentially as the size of the business increases.

There is no central location to house all of a business' critical data for the purpose of system documentation, statistical and other analyses, improving associate skill levels and education, etc. The decentralized approach may duplicate the efforts of associates, since they are not aware that process maps, procedures, data analysis, etc., may have already been developed independently by other associates. Without having the ability to first search in a centralized location for information, associates never know if their efforts are actually a waste of time and could be put to better use on a different issue.

Currently there is no system under which a business can store, generate, distribute, score, and track all of the knowledge generated by the associates of a business through one integrated system in a seamless manner.

BRIEF SUMMARY

Embodiments of the present invention address the above needs and/or achieve other advantages by providing a method, system, computer program product, or a combination of the foregoing for creating a knowledge management system including a performance dashboard monitoring system is standardized and centralized across the channels and sub-channels in an organization. The performance dashboard monitoring system that is used to track, measure, and resolve incidents that occur throughout the channels, sub-channels, systems, and applications of an organization.

One embodiment of the invention is a monitoring system for use in tracking and resolving incidents occurring in a business comprising a user interface, a memory device, a communication device, and a processor. The processor is operatively coupled to the communication device, the user interface, and the memory device. The processor is configured to execute the computer-readable program code to receive information related to two or more incidents, where each incident is associated with one or more of a business channel, sub-channel, or application. The processor is further configured to execute the computer-readable program code to store the information in the memory device. The processor is further configured to execute the computer-readable program code to track the status of at least one incident between the occurrence and the resolution of the incident. The processor is further configured to execute the computer-readable program code to display on the user interface the information related to the incident on a channel, sub-channel, application, or individual incident level.

In further accord with an embodiment of the invention, the user interface displays information associated with the two or more incidents, such as the number of open incident tickets, incidents open longer then a specific response time, the number of incidents per channel, sub-channel, and application per hour, day, and week, the number of failed customer interactions resulting from the incidents, the root cause of the incidents, or the number of failed customer interactions in the channels, sub-channels, or applications as they relate to other channels, sub-channels, or applications.

In another embodiment of the invention, the processor is operable to execute computer-readable instructions stored in the computer-readable medium to display on the user interface the number of incidents associated with each business channel, sub-channel, or application.

In yet another embodiment of the invention, the processor is operable to execute computer-readable instructions stored in the computer-readable medium to display on the user interface a performance score associated with each business channel, sub-channel, or application.

In another embodiment of the invention, the processor is operable to execute computer-readable instructions stored in the computer-readable medium to display on the user interface one or more graphical charts. The graphical charts illustrate one or more of the following factors associated with the incidents, including response times for the incidents, intensity of the incidents or failed customer interactions, root causes of the incidents or failure to resolve the incidents, or ratios of the incidents or failed customer interactions per channel, sub-channel, or application.

In yet another embodiment of the invention, the processor is operable to execute computer-readable instructions stored in the computer-readable medium to display on the user interface failed customer interactions that resulted from the incidents.

One embodiment of the invention is a monitoring system for use in tracking and resolving incidents occurring in a business comprising a user interface, a memory device, a communication device, and a processor. The processor is operatively coupled to the communication device, the user interface, and the memory device. The processor is configured to execute the computer-readable program code to receive information related to one or more incidents associated with two or more of a business channel, sub-channel, or application. The processor is configured to execute the computer-readable program code to store the information in the memory device. The processor is configured to execute the computer-readable program code to display on the user interface the two or more business channels, sub-channels, or applications along with information about the one or more incidents associated with each business channel, sub-channel, or application.

In another embodiment of the invention, the processor is operable to execute computer-readable instructions stored in the computer-readable medium to display on the user interface information related to the one or more incidents on a channel, sub-channel, application, or individual incident level.

In yet another embodiment of the invention, the processor is operable to execute computer-readable instructions stored in the computer readable medium to track the status of at least one incident between the occurrence and the resolution of the incident.

In another embodiment of the invention, the user interface displays information associated with the one or more incidents, such as the number of open incident tickets, incidents open longer then a specific response time, the number of incidents per channel, sub-channel, and application per hour, day, and week, the number of failed customer interactions resulting from the incidents, the root cause of the incidents, or the number of failed customer interactions in the channels, sub-channels, or applications as they relate to other channels, sub-channels, or applications.

In yet another embodiment of the invention, the processor is operable to execute computer-readable instructions stored in the computer readable medium to display on the user interface information regarding whether the performance associated with the incidents is unacceptable or acceptable.

In another embodiment of the invention, the processor is operable to execute computer-readable instructions stored in the computer readable medium to display on the user interface one or more graphical charts. The graphical charts illustrate one or more of the following factors associated with the incidents, including response times for the incidents, intensity of the incidents or failed customer interactions, root causes of the incidents or failure to resolve the incidents, or ratios of the incidents or failed customer interactions per channel, sub-channel, or application.

In yet another embodiment of the invention, the processor is operable to execute computer-readable instructions stored in the computer-readable medium to display on the user interface links to individual incidents for viewing analysis and details related to the individual incident.

One embodiment of the invention is a computer program product for a monitoring system, the computer program product comprises at least one computer-readable medium having computer-readable program code portions embodied therein, the computer-readable program code portions comprise executable portions. One executable portion is configured for receiving, through the use of a processor, information related to two or more incidents, where each incident is associated with one or more of a business channel, sub-channel, or application, and wherein the processor is operatively coupled to a memory device, a communication device, a user interface, and the computer-readable program code. Another executable portion is configured for storing the information on the memory device. Another executable portion is further configured for tracking, through the use of the processer, the status of at least one incident between the occurrence and the resolution of the incident. Another executable portion is configured for displaying, on the user interface, the information related to the incident on a channel, sub-channel, application, or individual incident level.

In further accord with an embodiment of the invention the user interface displays information associated with the two or more incidents, such as the number of open incident tickets, incidents open longer then a specific response time, the number of incidents per channel, sub-channel, and application per hour, day, and week, the number of failed customer interactions resulting from the incidents, the root cause of the incidents, or the number of failed customer interactions in the channels, sub-channels, or applications as they relate to other channels, sub-channels, or applications.

In another embodiment of the invention, the computer program product comprises an executable portion configured for displaying, on the user interface, the number of incidents associated with each business channel, sub-channel, or application.

In yet another embodiment of the invention, the computer program product comprises an executable portion configured for displaying, on the user interface, a performance score associated with each business channel, sub-channel, or application.

In another embodiment of the invention, the computer program product comprises an executable portion configured for displaying, on the user interface, one or more graphical charts. The graphical charts illustrate one or more of the following factors associated with the incidents, including response times for the incidents, intensity of the incidents or failed customer interactions, root causes of the incidents or failure to resolve the incidents, or ratios of the incidents or failed customer interactions per channel, sub-channel, or application.

The yet another embodiment of the invention, the computer program product comprises an executable portion configured for displaying, on the user interface, failed customer interactions that resulted from the incidents.

One embodiment of the invention is a computer program product for a knowledge management system, the computer program product comprises at least one computer-readable medium having computer-readable program code portions embodied therein, the computer-readable program code portions comprise executable portions. One executable portion is configured for receiving, through the use of a processor, information related to one or more incidents associated with two or more of a business channel, sub-channel, or application, and wherein the processor is operatively coupled to a memory device, a communication device, a user interface, and the computer-readable program code. Another executable portion is configured for storing the information on the memory device. Another executable portion is configured for displaying, on the user interface, the two or more business channels, sub-channels, or applications along with the information about the incidents associated with each business channel, sub-channel, or application.

In further accord with an embodiment of the invention the computer program product comprises an executable portion configured for displaying, on the user interface, information related to the incident on a channel, sub-channel, application, or individual incident level.

In another embodiment of the invention, the computer program product comprises an executable portion configured for tracking, through the use of the processor, the status of at least one incident between the occurrence and the resolution of the incident.

In yet another embodiment of the invention, the user interface displays information associated with the one or more incidents, such as the number of open incident tickets, incidents open longer then a specific response time, the number of incidents per channel, sub-channel, and application per hour, day, and week, the number of failed customer interactions resulting from the incidents, the root cause of the incidents, or the number of failed customer interactions in the channels, sub-channels, or applications as they relate to other channels, sub-channels, or applications.

In another embodiment of the invention, the computer program product comprises an executable portion configured for displaying, on the user interface, information regarding whether the performance associated with an incidents is unacceptable or acceptable.

In yet another embodiment of the invention, the computer program product comprises an executable portion configured for displaying, on the user interface, one or more graphical charts. The graphical charts illustrate one or more of the following factors associated with the incidents, including response times for the incidents, intensity of the incidents or failed customer interactions, root causes of the incidents or failure to resolve the incidents, or ratios of the incidents or failed customer interactions per channel, sub-channel, or application.

In another embodiment of the invention, the computer program product comprises an executable portion configured for displaying, on the user interface, links to individual incidents for viewing analysis and details related to the individual incident.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
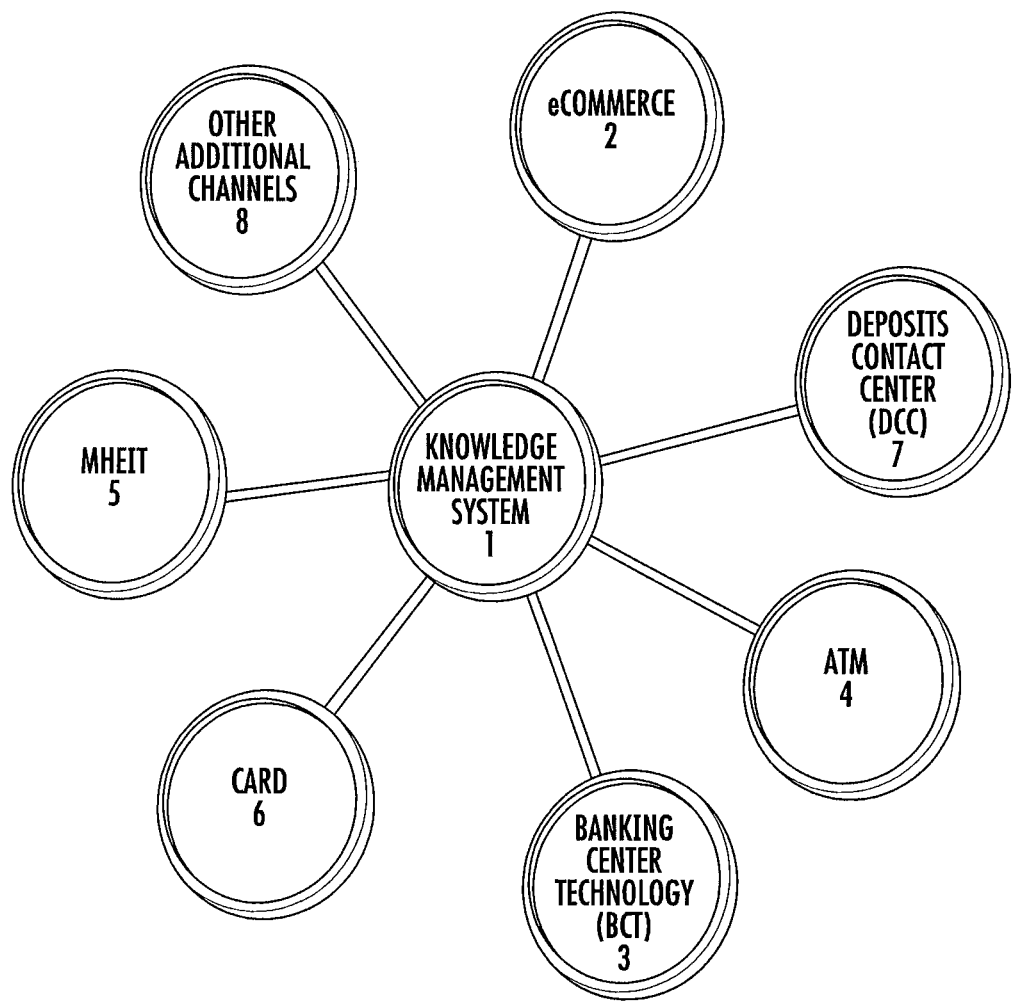
Figure 2:
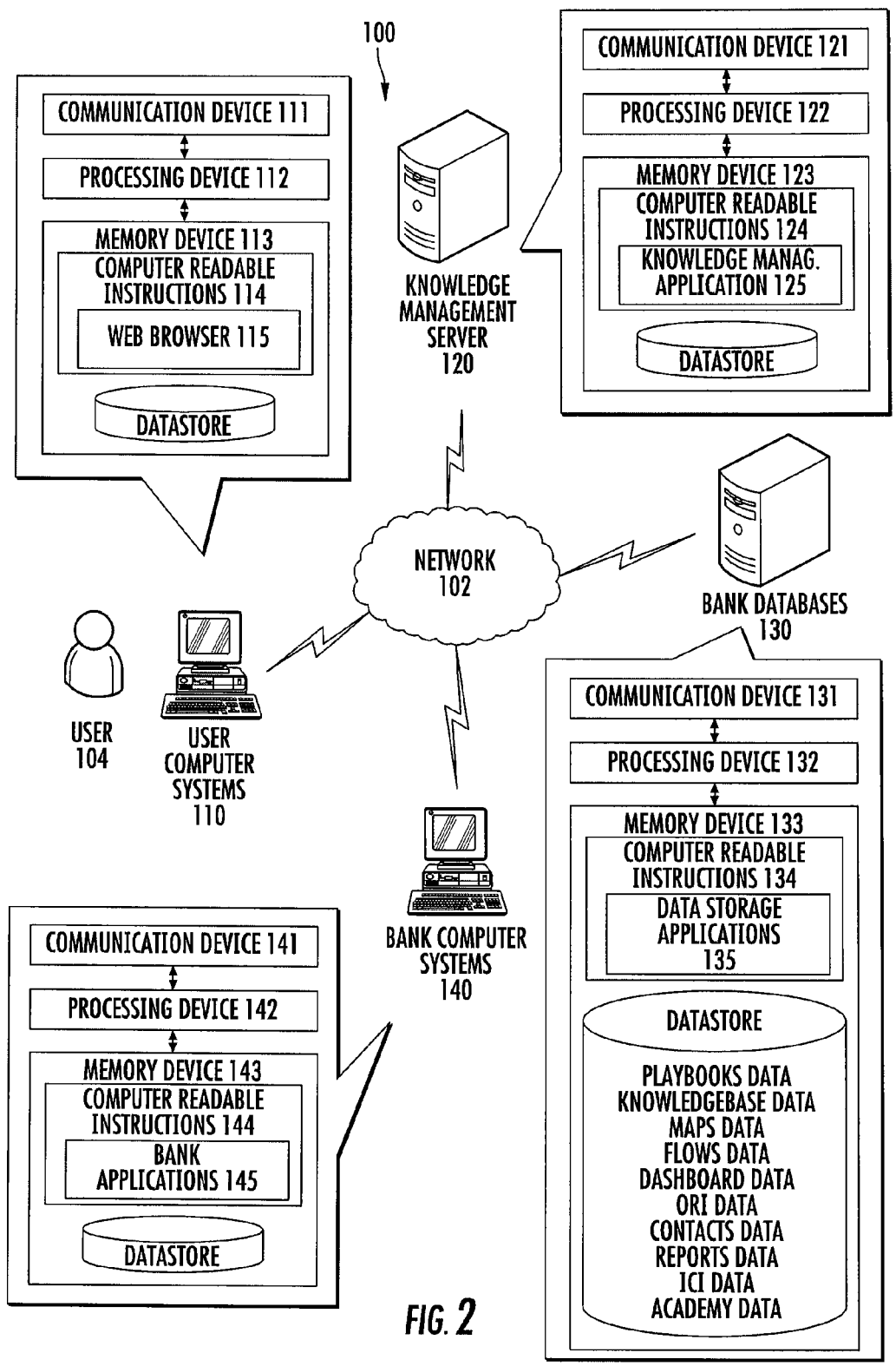
Figure 3:
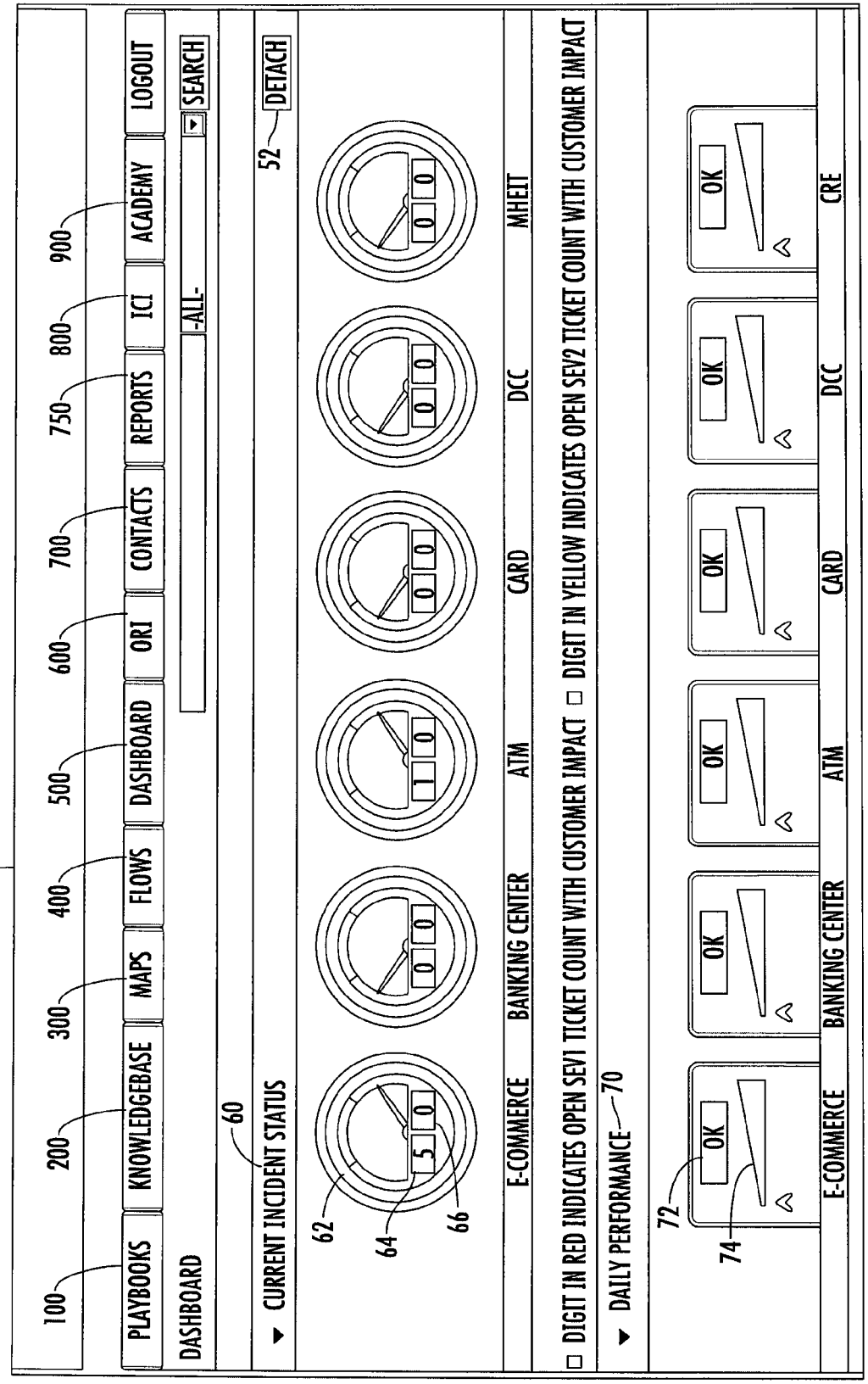
Figure 4B:
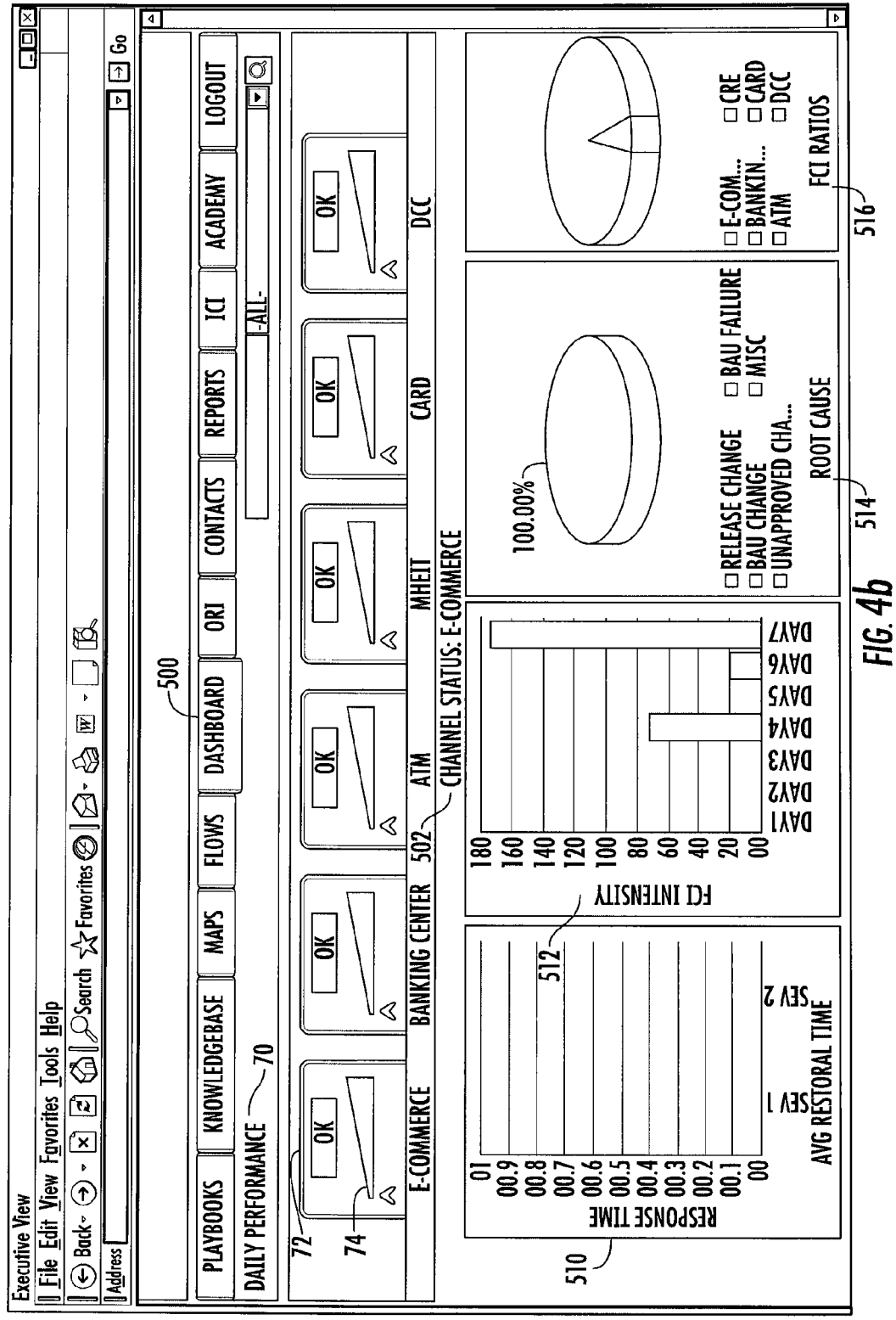
Figure 5:
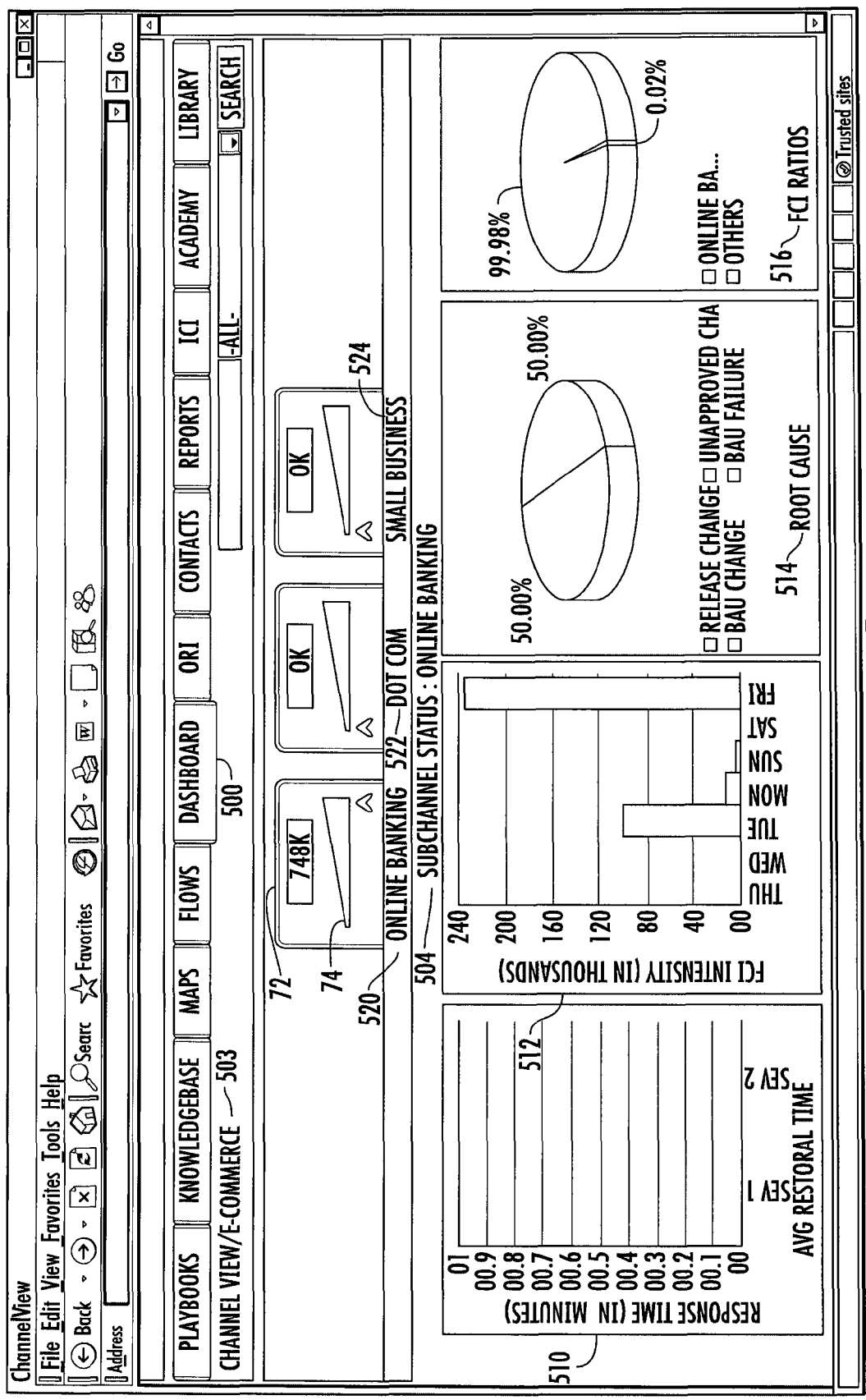
Figure 6:
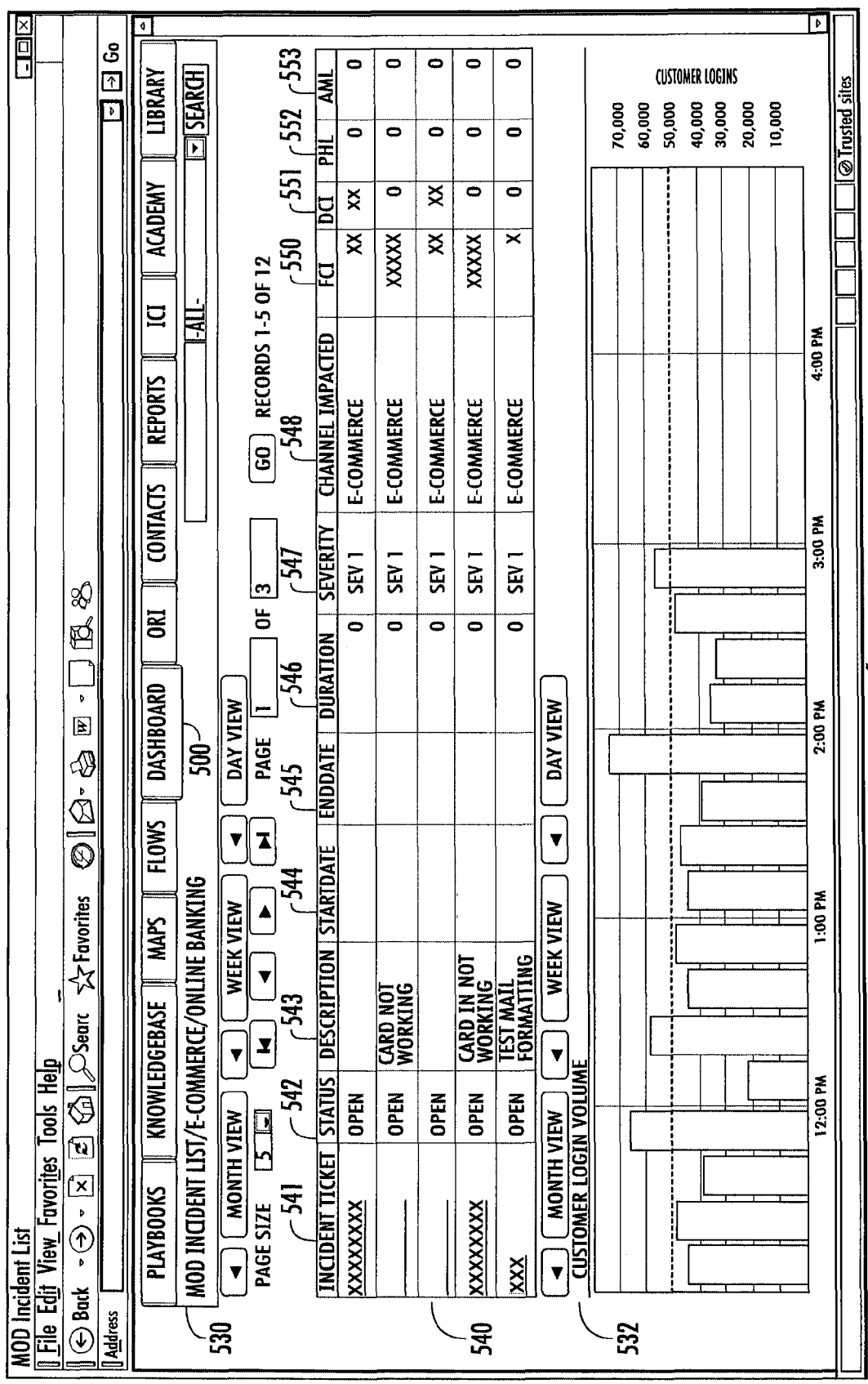
Figure 8:
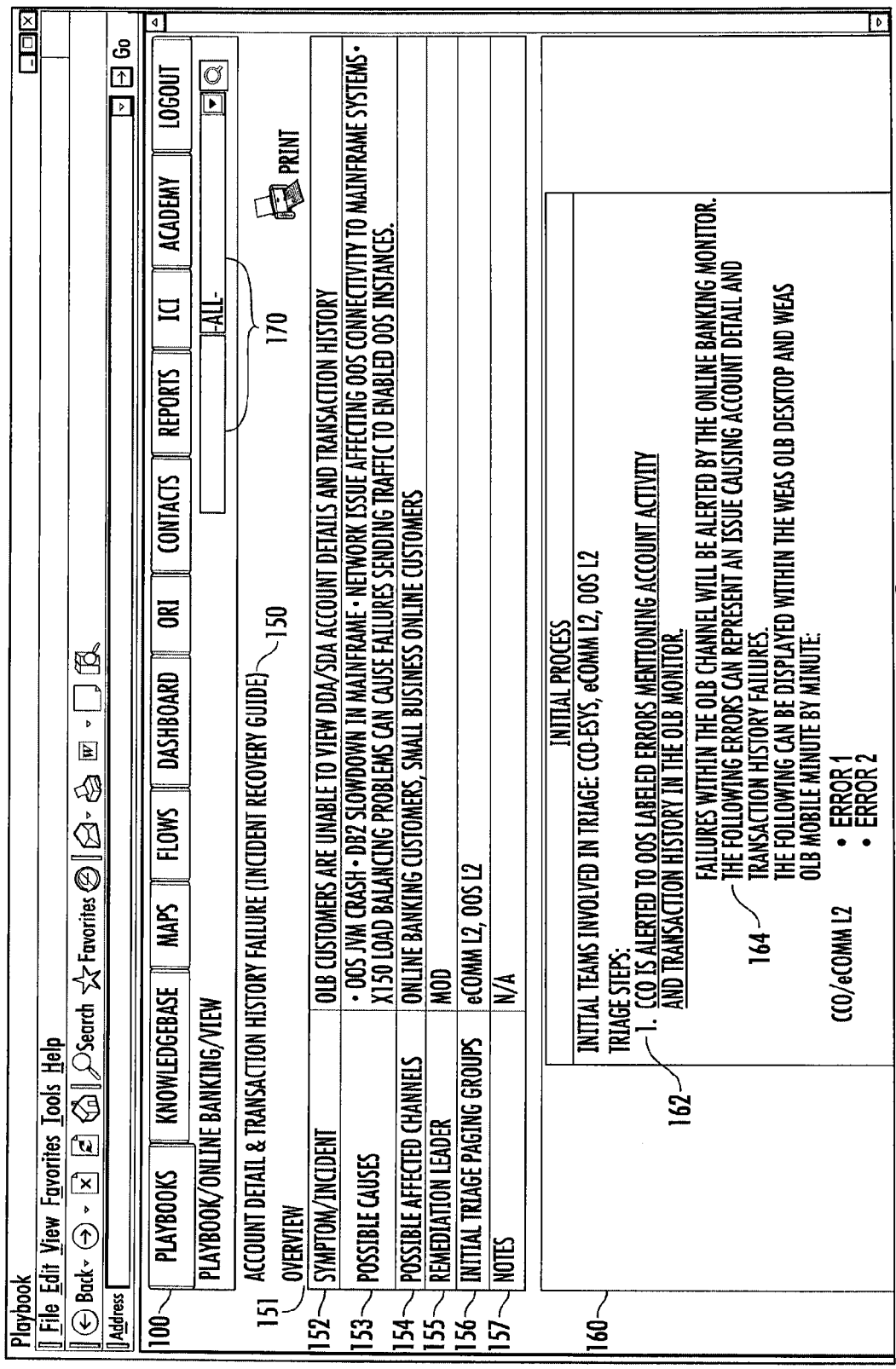
Figure 9:
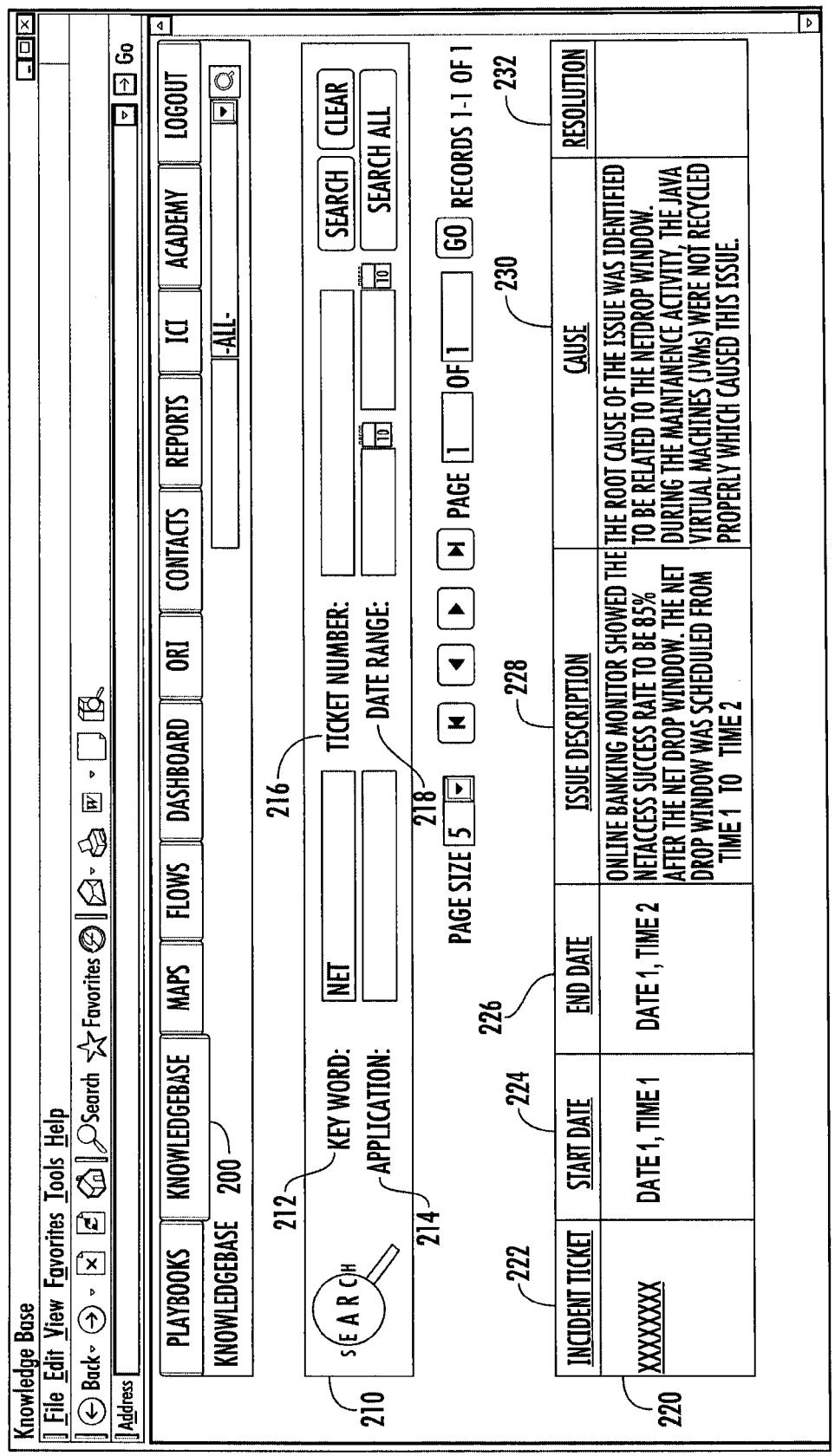
Figure 10:
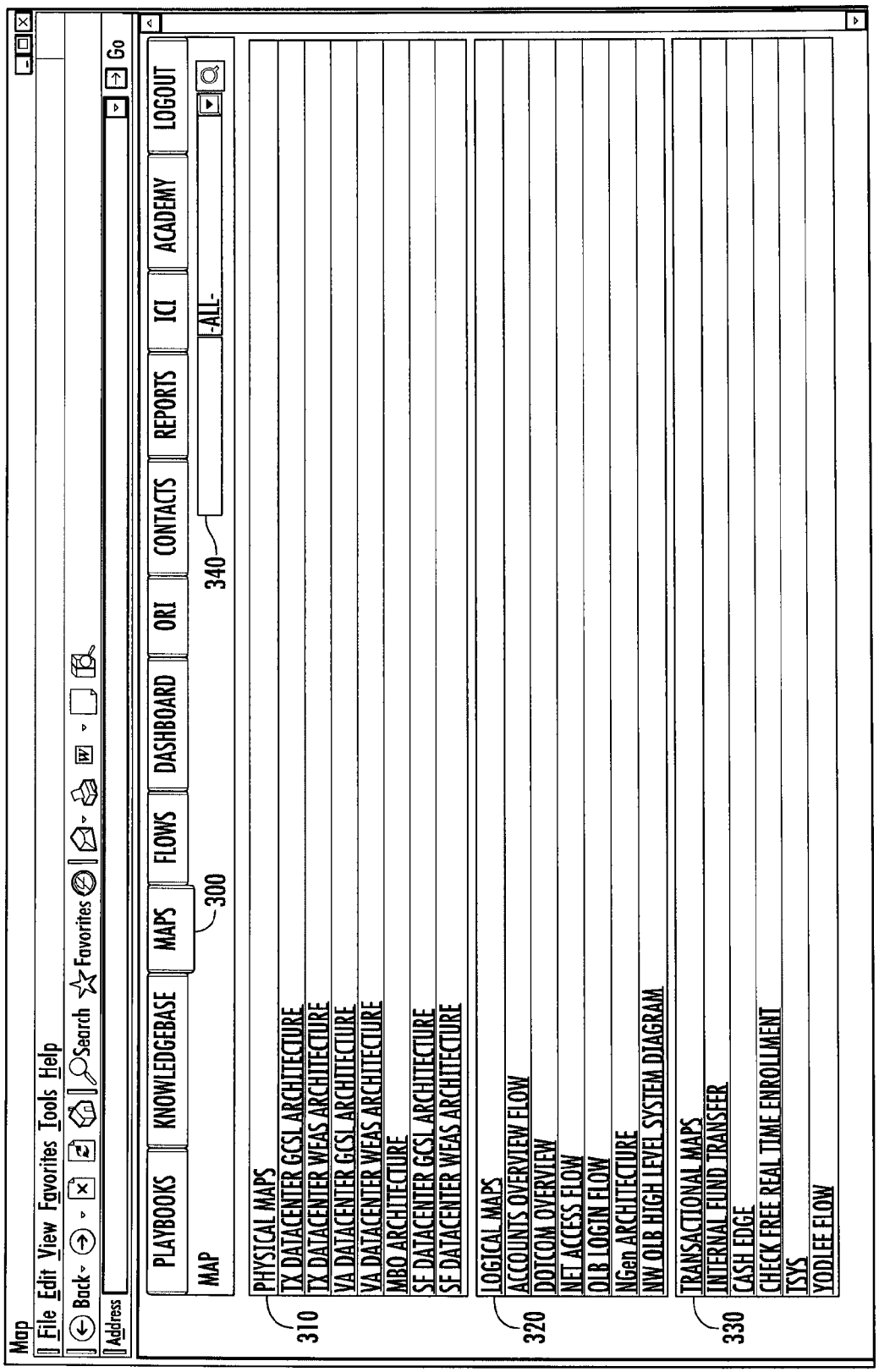
Figure 17:
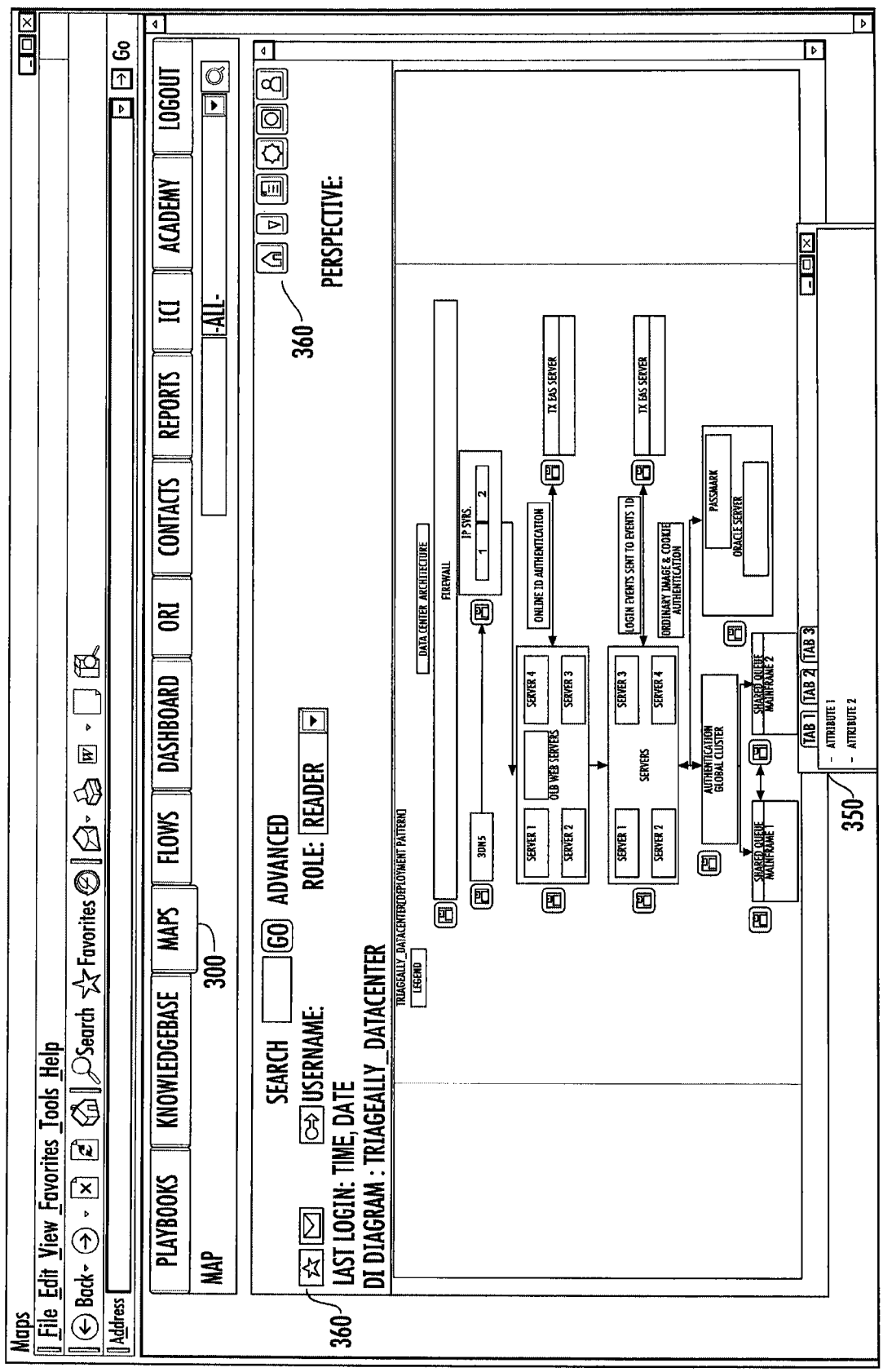
Figure 12:
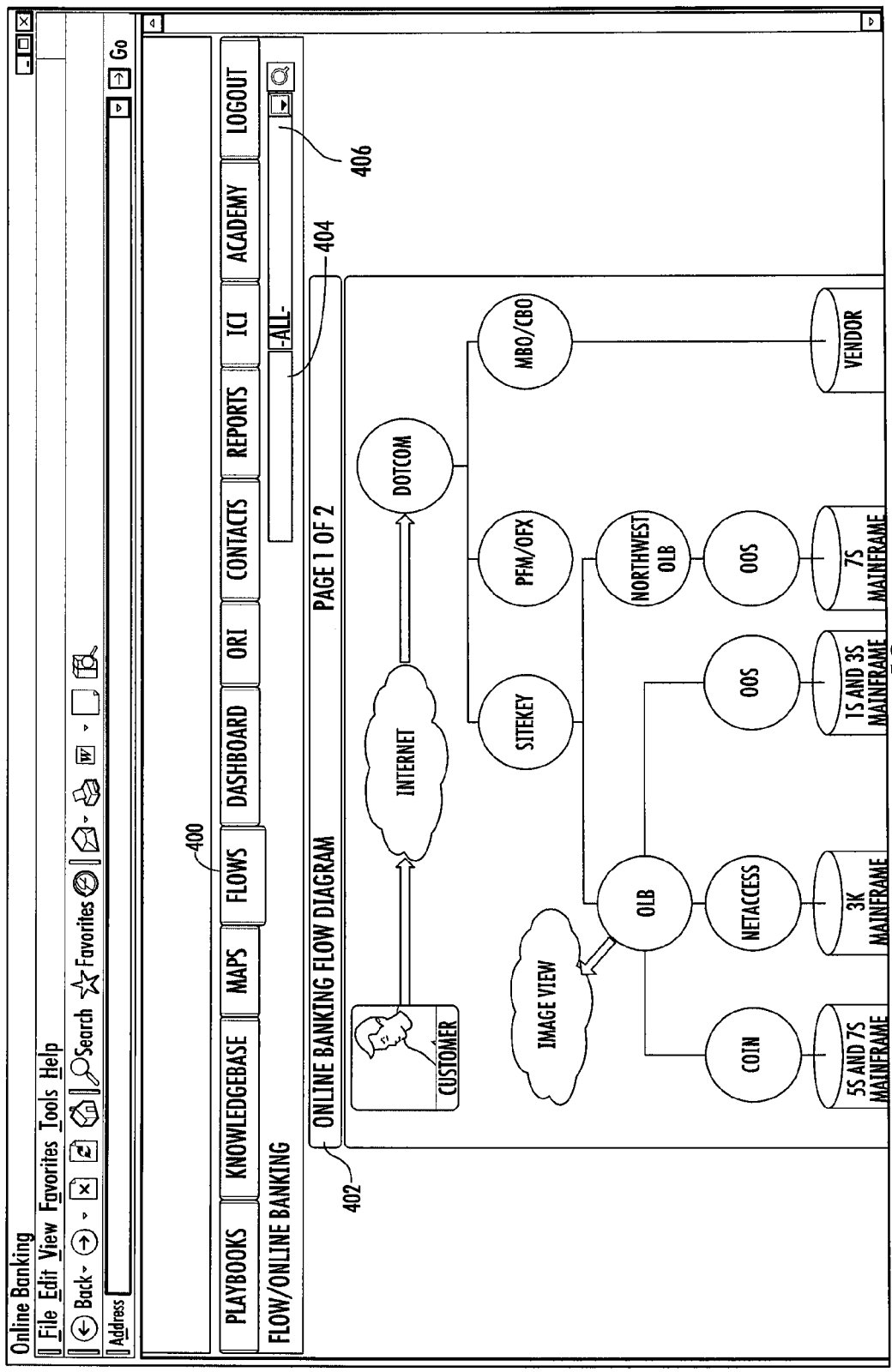
Figure 13B:
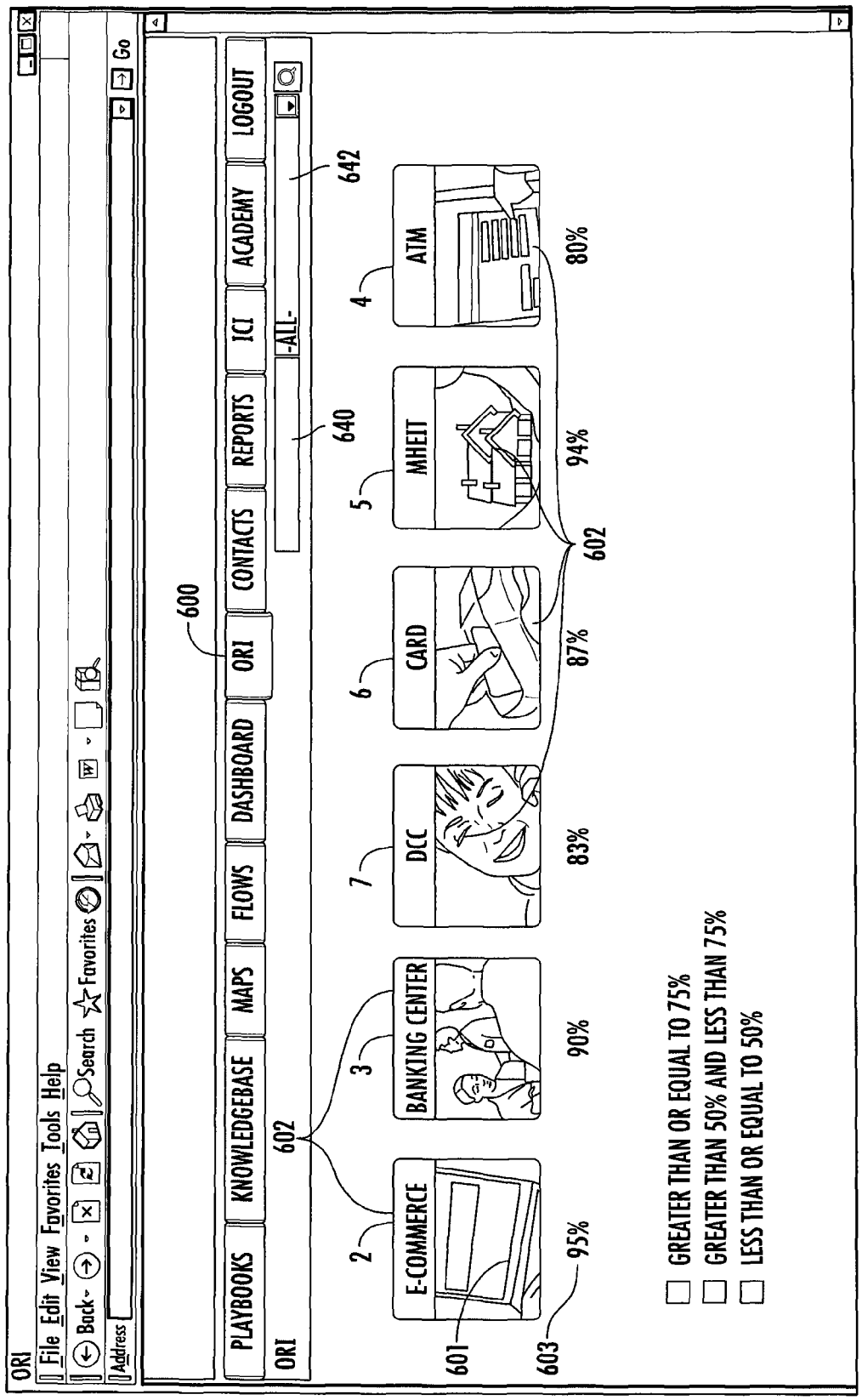
Figure 14A:
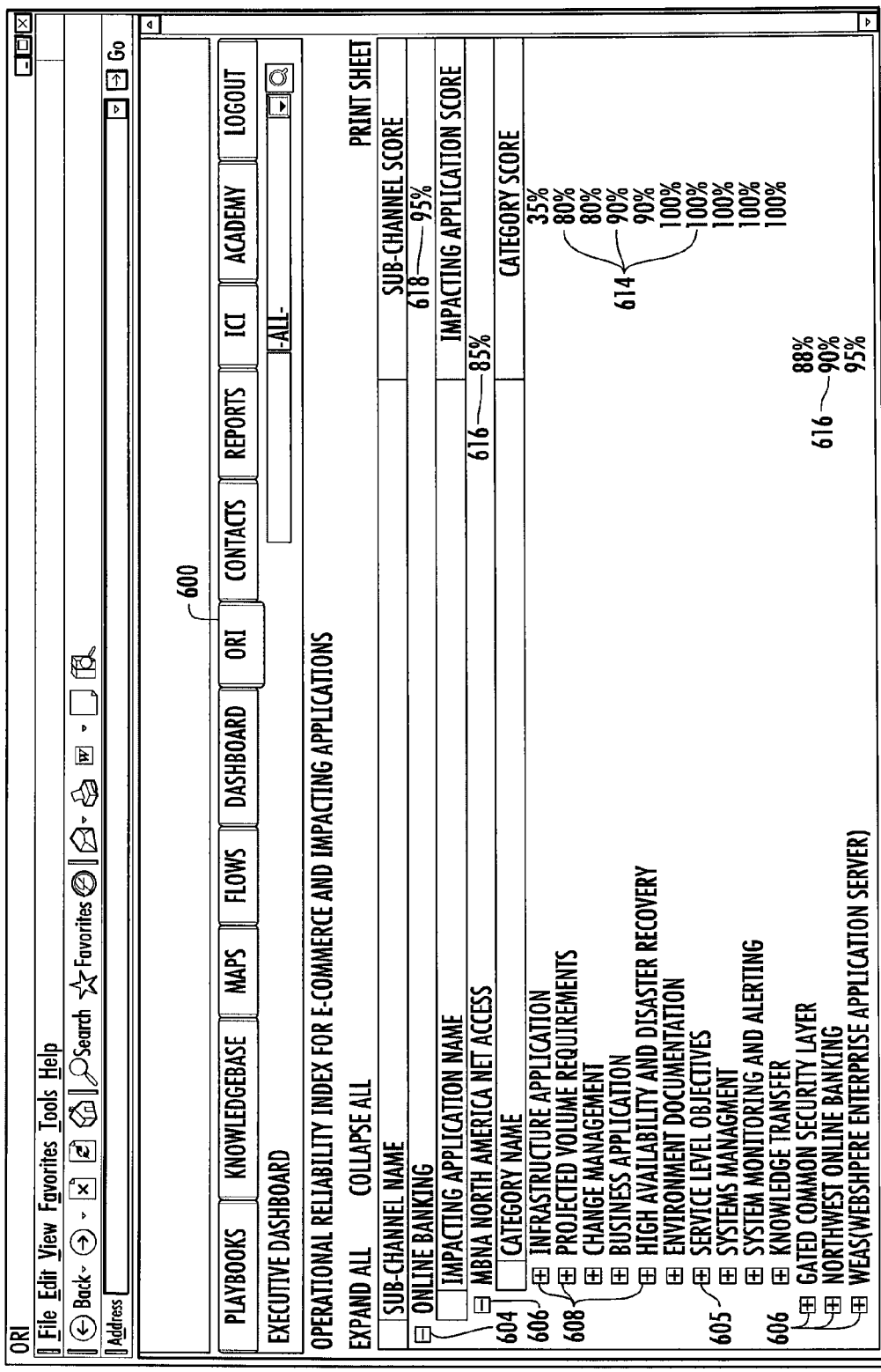
Figure 15:
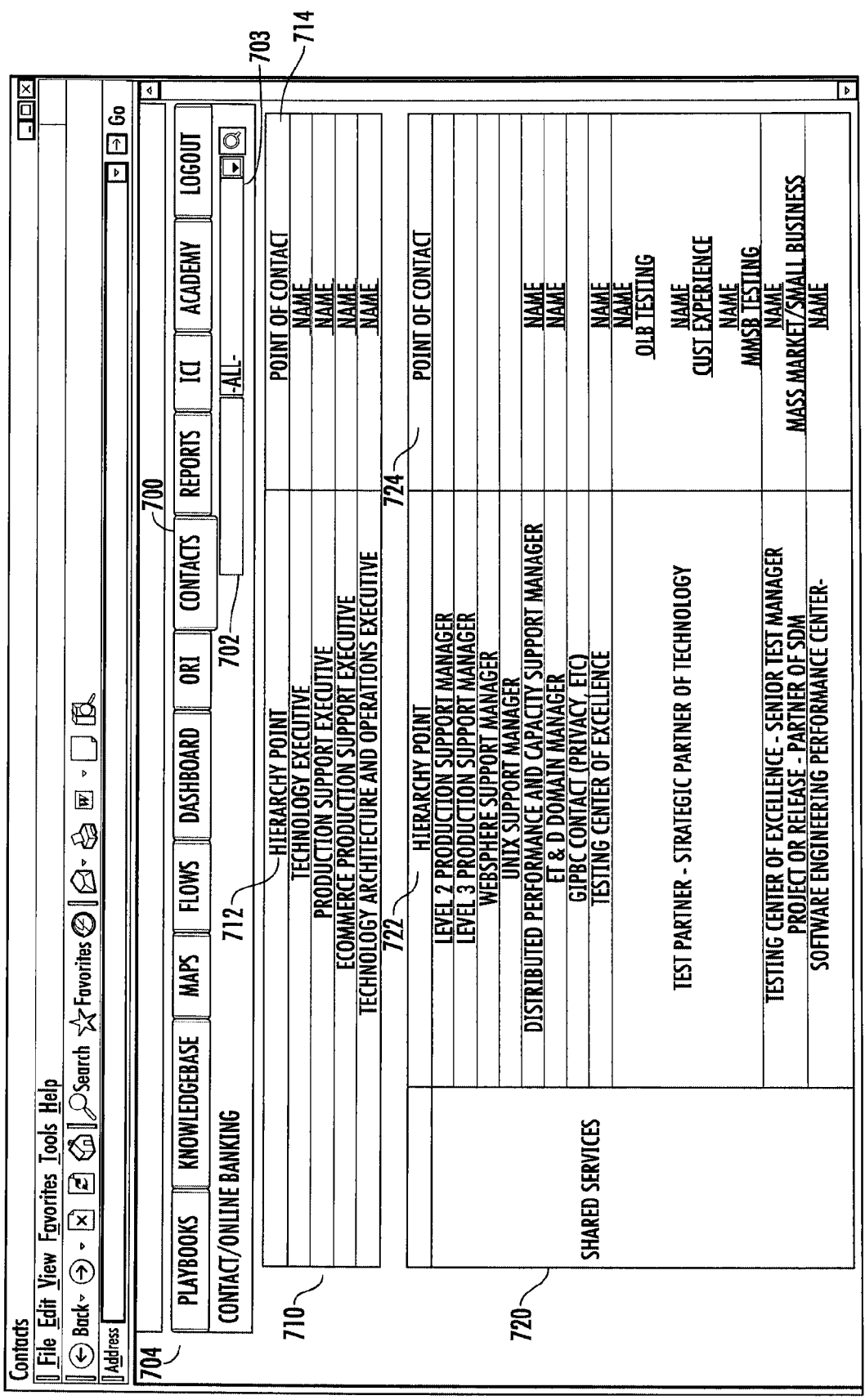
Figure 18:
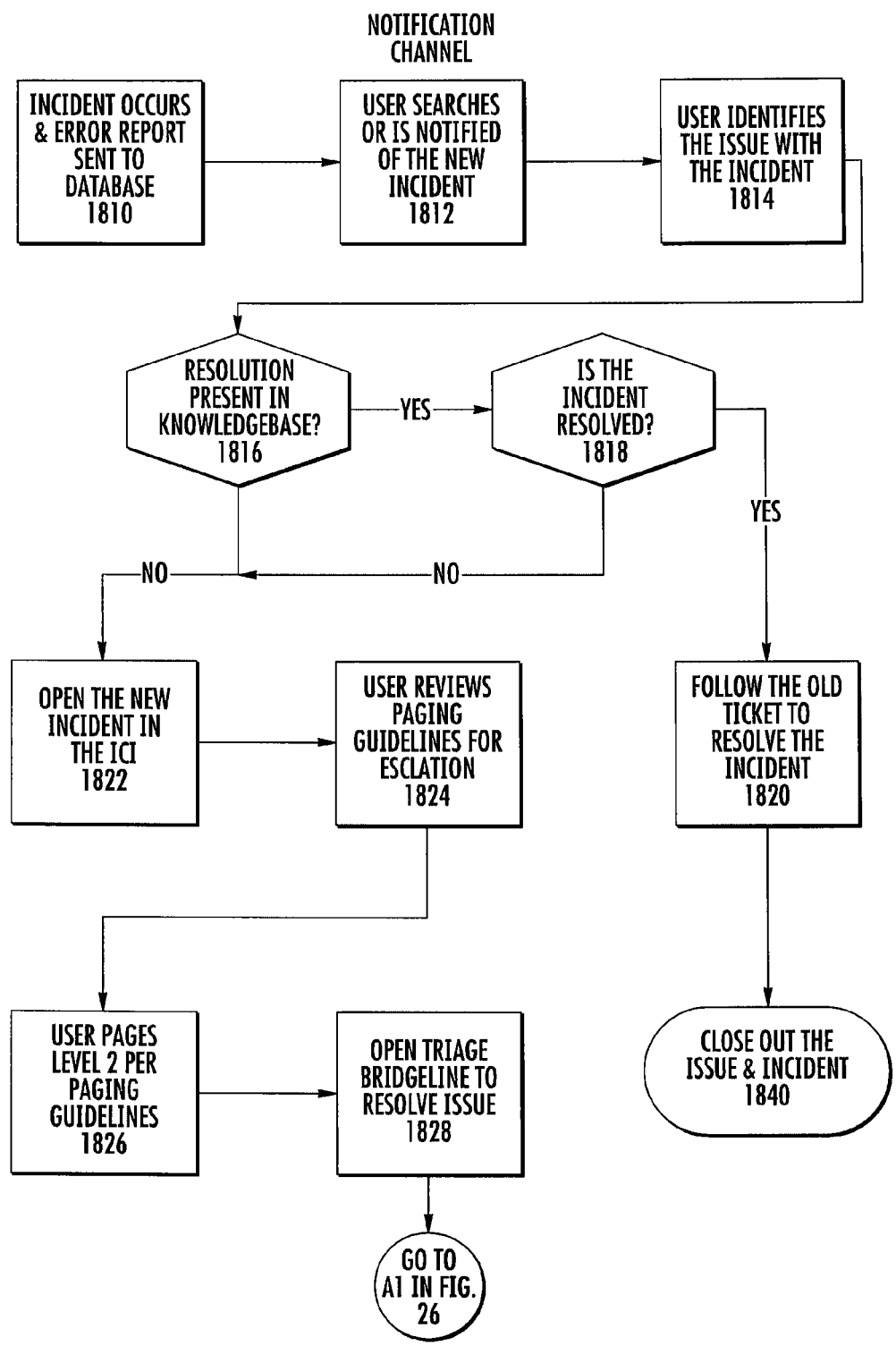
Figure 19:
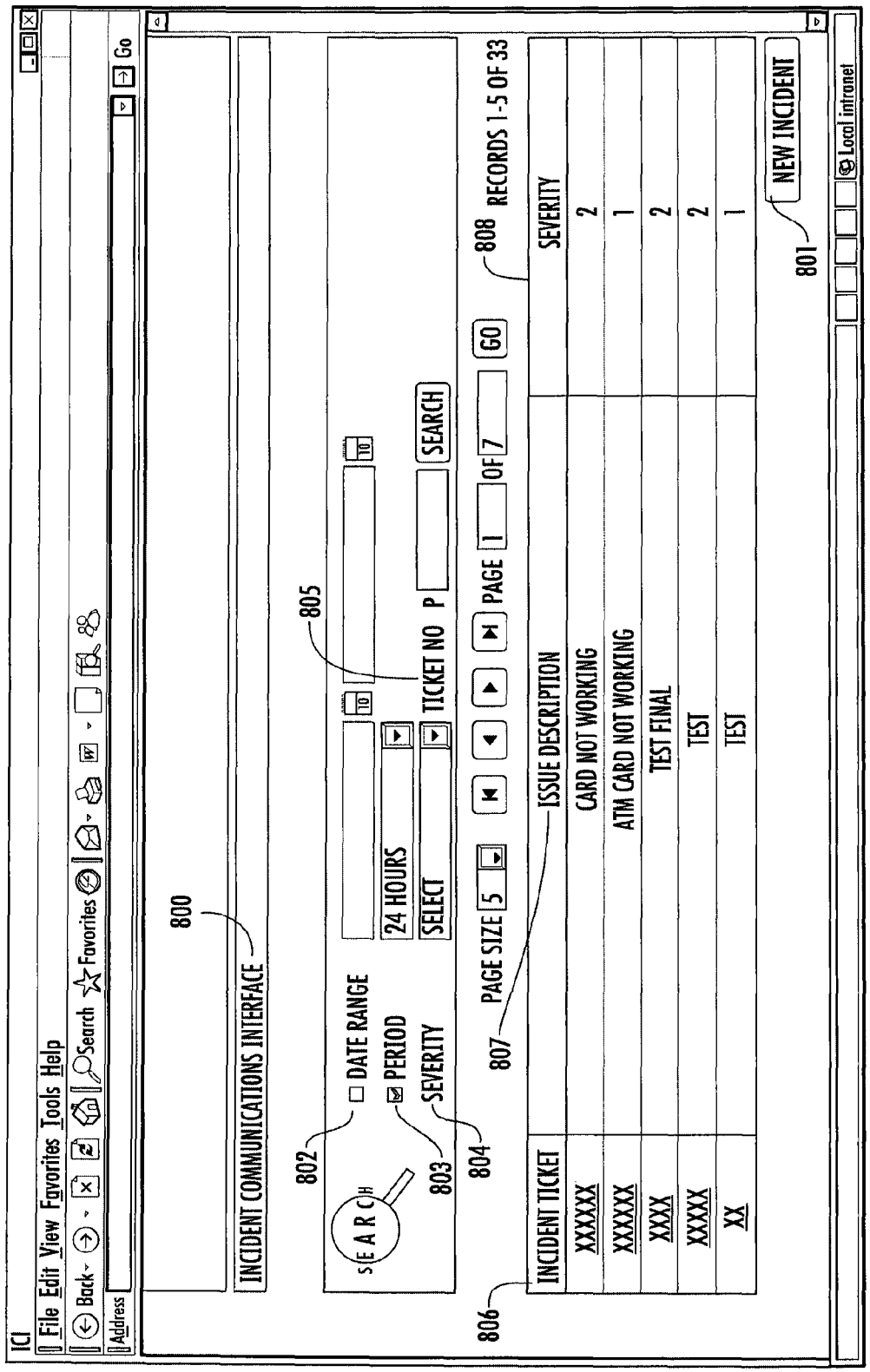
Figure 24:
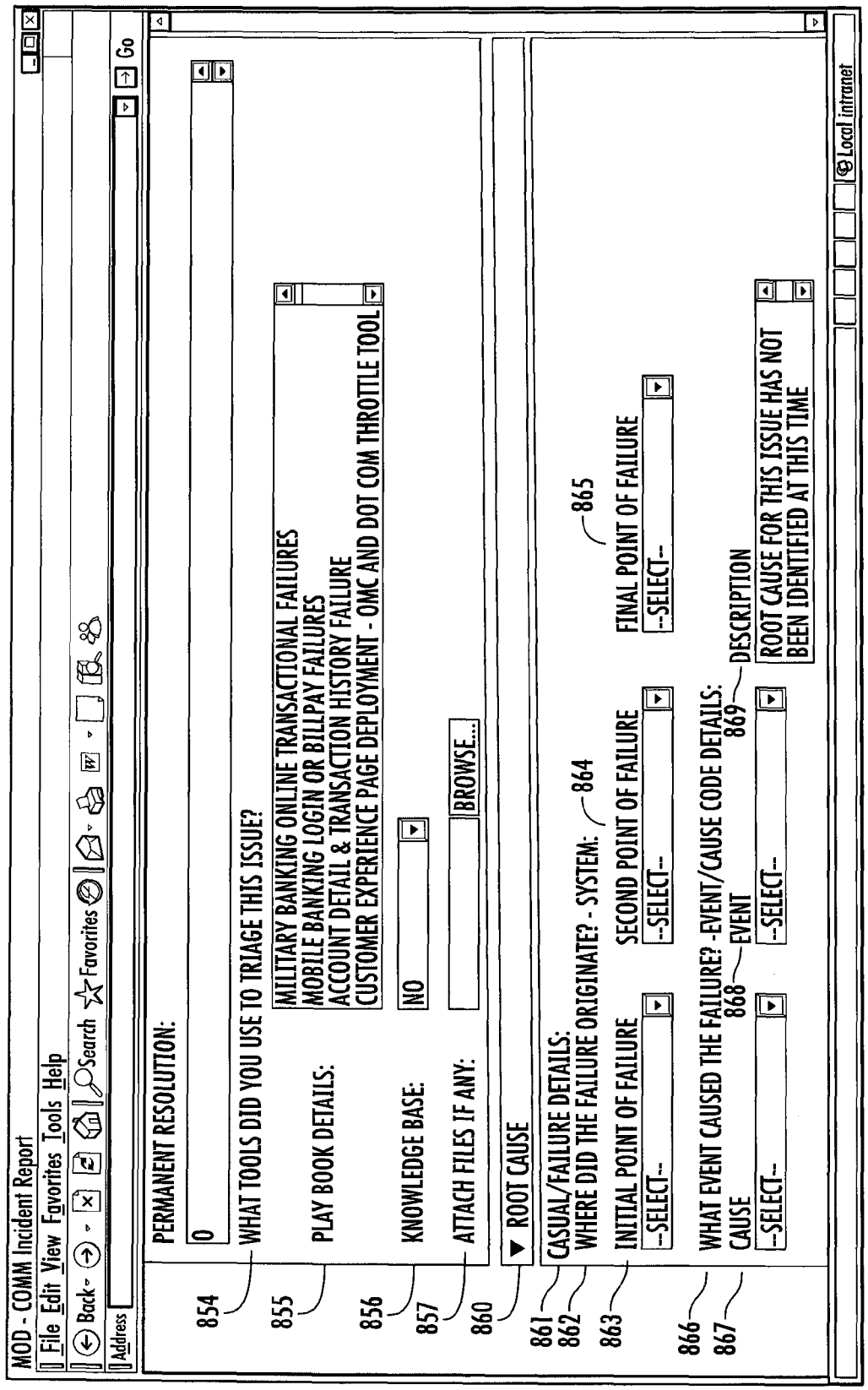
Figure 26:
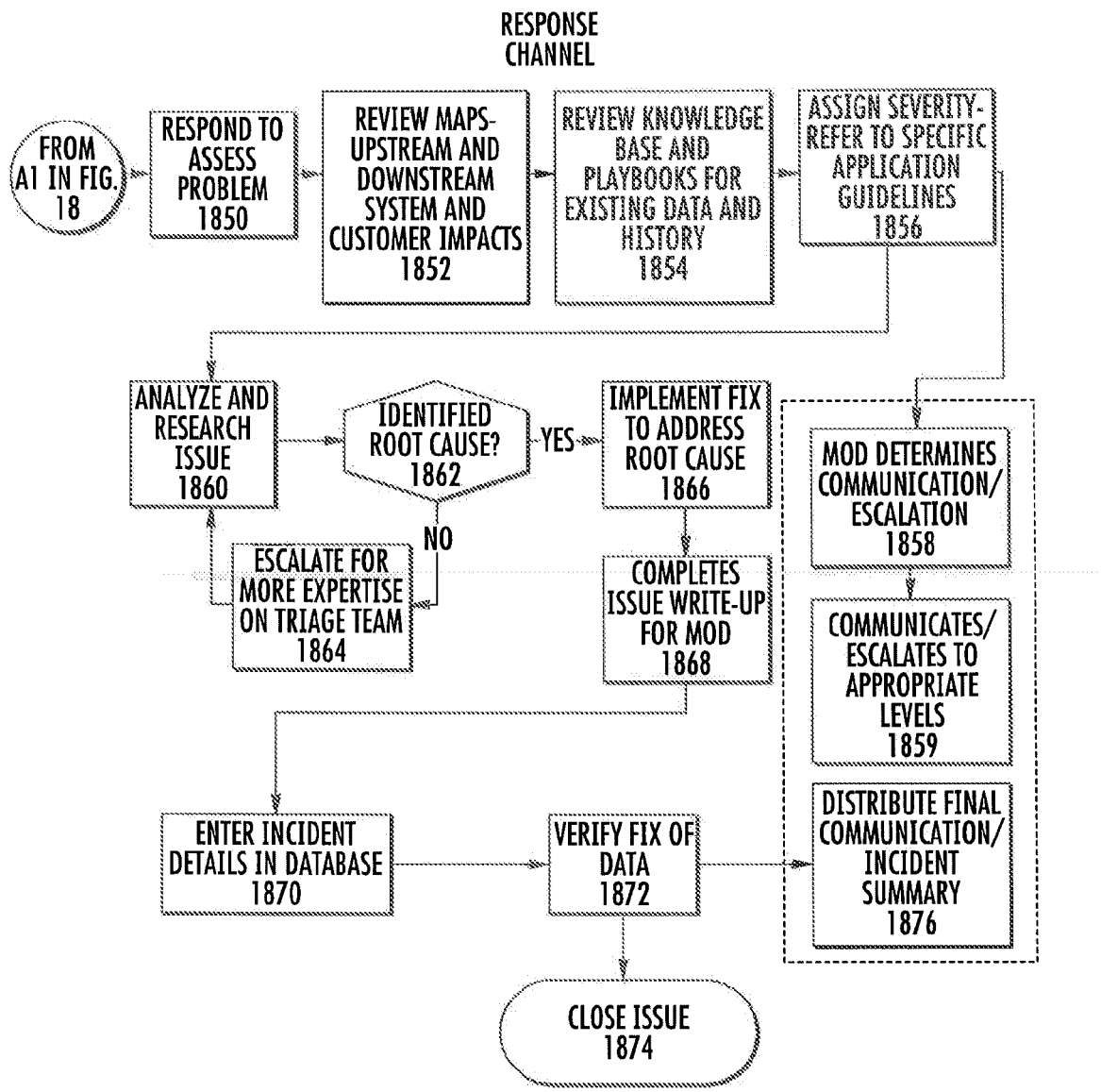
Figure 27:
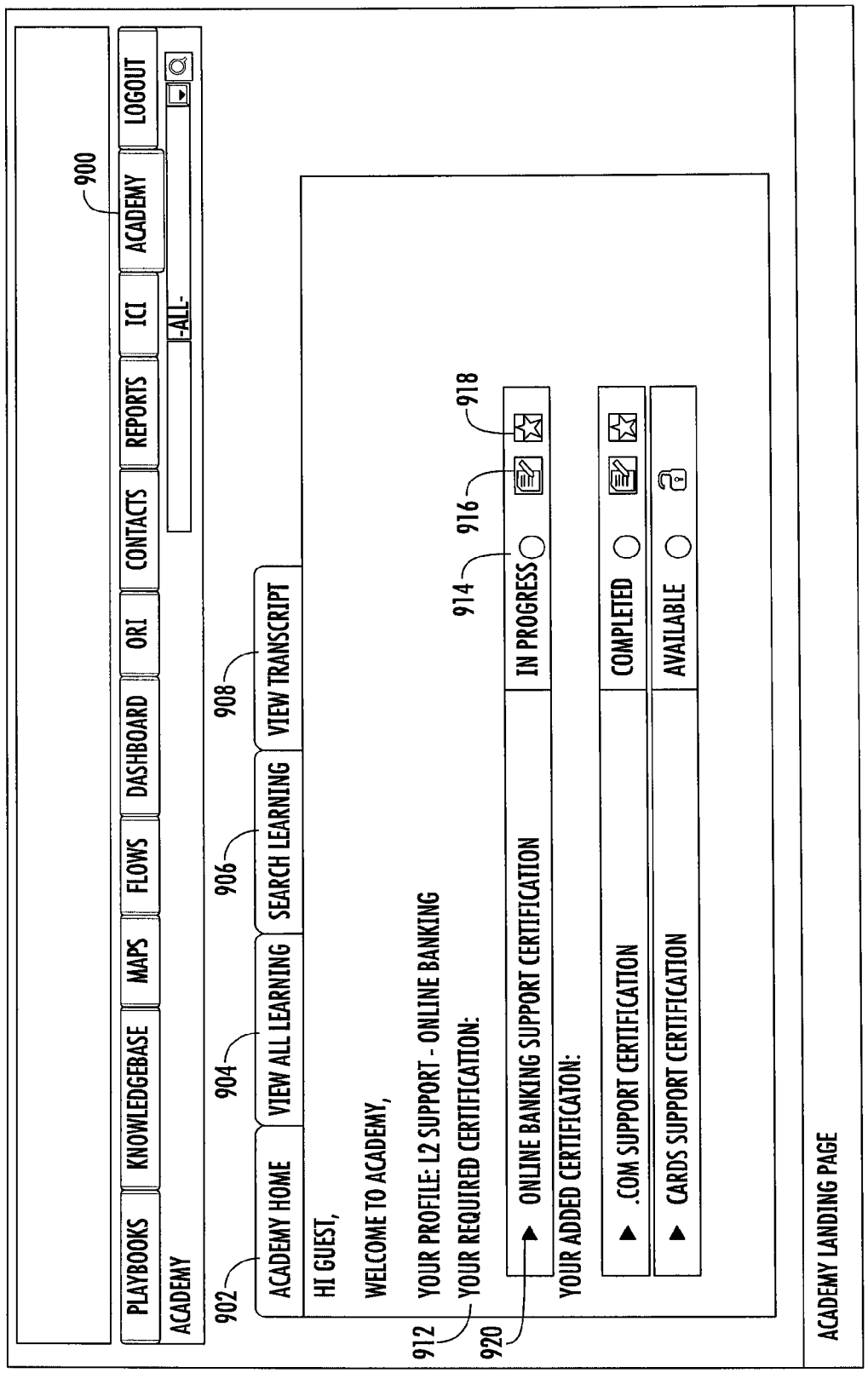
Figure 28:
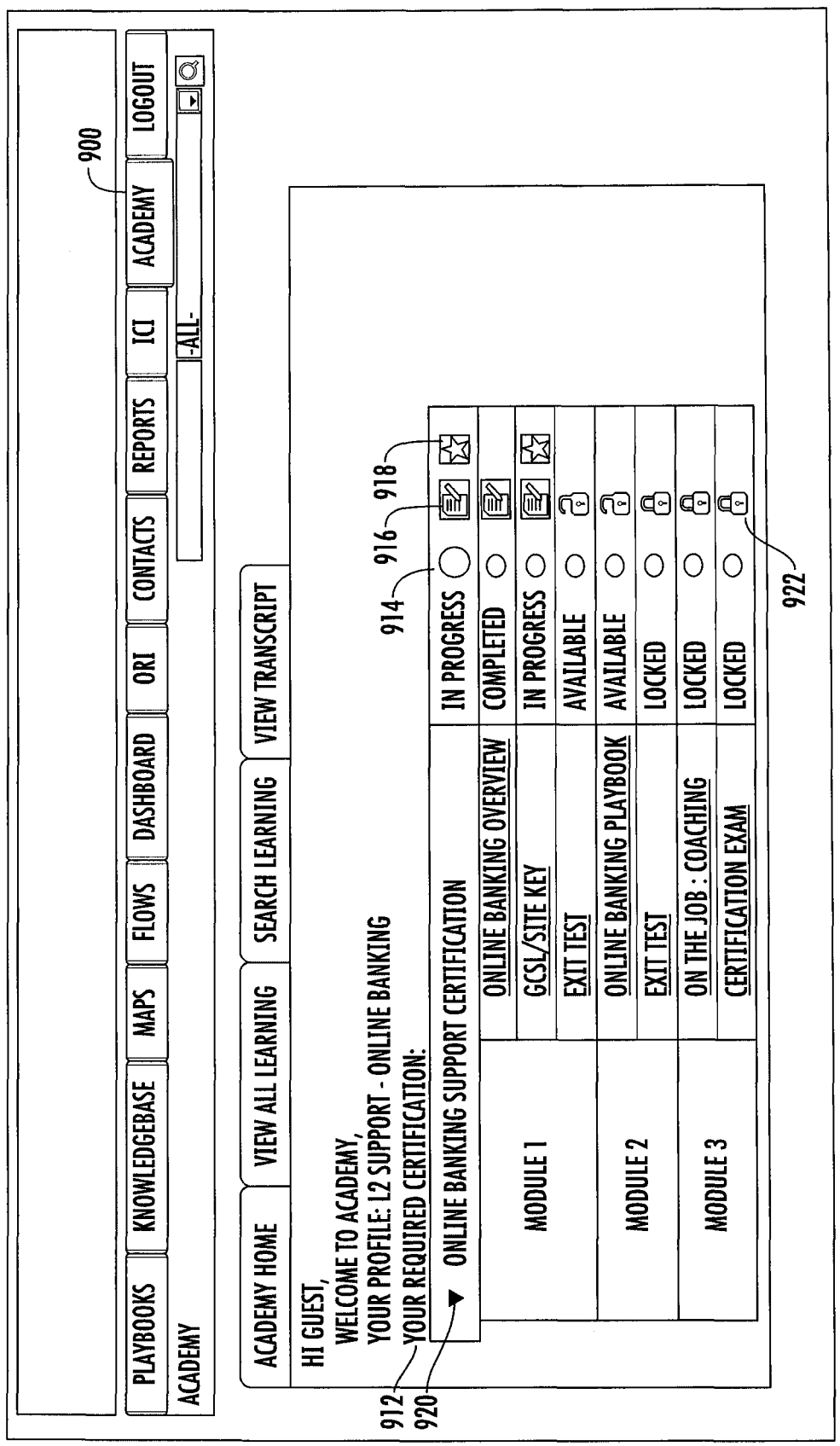

Having thus described embodiments of the invention in general terms, reference will now be made to the accompanying drawings, which are not necessarily drawn to scale, and wherein:

FIG. 1 provides an overview of the interaction between the knowledge management system and the channels within a business, in accordance with an embodiment of the invention;

FIG. 2 provides a system diagram illustrating the interaction of the systems in the knowledge management system, in accordance with an embodiment of the invention;

FIG. 3 provides a home page for the knowledge management system illustrating an overview of the incidents within production support, in accordance with an embodiment of the invention;

FIG. 4a provides a process flow for the dashboard system of the knowledge management system, in accordance with an embodiment of the invention;

FIG. 4b provides a dashboard for the knowledge management system illustrating a channel summary of the incidents within production support, in accordance with an embodiment of the invention;

FIG. 5 provides another dashboard for the knowledge management system illustrating a sub-channel summary of the incidents within production support, in accordance with an embodiment of the invention;

FIG. 6 provides another dashboard for the knowledge management system illustrating an incident level summary of the incidents within production support, in accordance with an embodiment of the invention;

Figure 7:
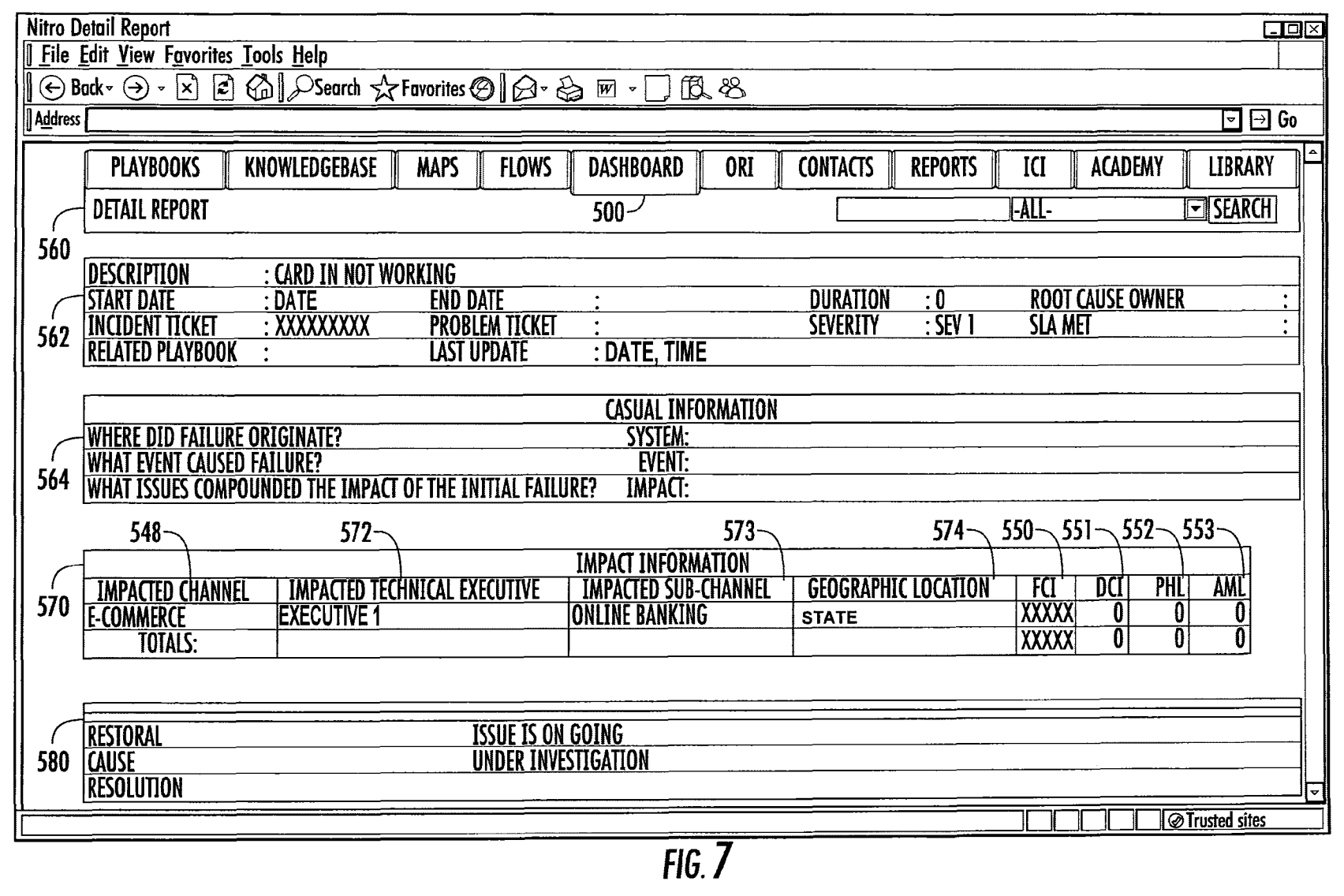

FIG. 7 provides another dashboard for the knowledge management system illustrating an incident summary of a specific incident within production support, in accordance with an embodiment of the invention;

FIG. 8 provides a playbook interface for the knowledge management system illustrating the searching and display functions for incident recovery processes for responding to specific incidents, in accordance with an embodiment of the invention;

FIG. 9 provides a knowledgebase interface for the knowledge management system illustrating the searching and display functions for the resolved incident tickets, in accordance with an embodiment of the invention;

FIG. 10 provides a process map interface for the knowledge management system illustrating the searching and display functions for the physical, logical, and transactional process maps, in accordance with an embodiment of the invention;

FIG. 11 provides a process map display for the knowledge management system illustrating an example of a physical, logical, or transactional process map, in accordance with an embodiment of the invention;

FIG. 12 provides a flow chart display for the knowledge management system illustrating an example of a flow chart from a customer perspective, in accordance with an embodiment of the invention;

FIG. 13a provides a process flow for the operational reliability index system of the knowledge management system, in accordance with an embodiment of the invention;

FIG. 13b provides a operational reliability index home page for the knowledge management system illustrating the reliability scores for each channel, in accordance with an embodiment of the invention;

FIG. 14a provides an operational reliability index scoring interface for the knowledge management system illustrating the reliability scores for each sub-channel, application, and category within a channel, in accordance with an embodiment of the invention;

FIG. 14b provides an operational reliability index scoring template for the knowledge management system illustrating the scoring metrics for two categories, in accordance with an embodiment of the invention;

FIG. 14c provides another operational reliability index scoring template for the knowledge management system illustrating the scoring metrics for two categories, in accordance with an embodiment of the invention;

FIG. 14d provides another operational reliability index scoring template for the knowledge management system illustrating the scoring metrics for two categories, in accordance with an embodiment of the invention;

FIG. 14e provides another operational reliability index scoring template for the knowledge management system illustrating the scoring metrics for two categories, in accordance with an embodiment of the invention;

FIG. 15 provides a contacts interface for the knowledge management system illustrating the searching and display interface for the hierarchy and contacts related to one section of the knowledge management system, in accordance with an embodiment of the invention;

FIG. 16 provides an incident report request interface for the knowledge management system illustrating a request form for reporting the incidents in the system, in accordance with an embodiment of the invention;

FIG. 17 provides an incident report for the knowledge management system illustrating a report summary of a particular incident, in accordance with an embodiment of the invention;

FIG. 18 provides a process flow for the knowledge management system illustrating the incident notification process flow, in accordance with an embodiment of the invention;

FIG. 19 provides an incident home page for the knowledge management system illustrating the list of open incidents, in accordance with an embodiment of the invention;

Figure 20:
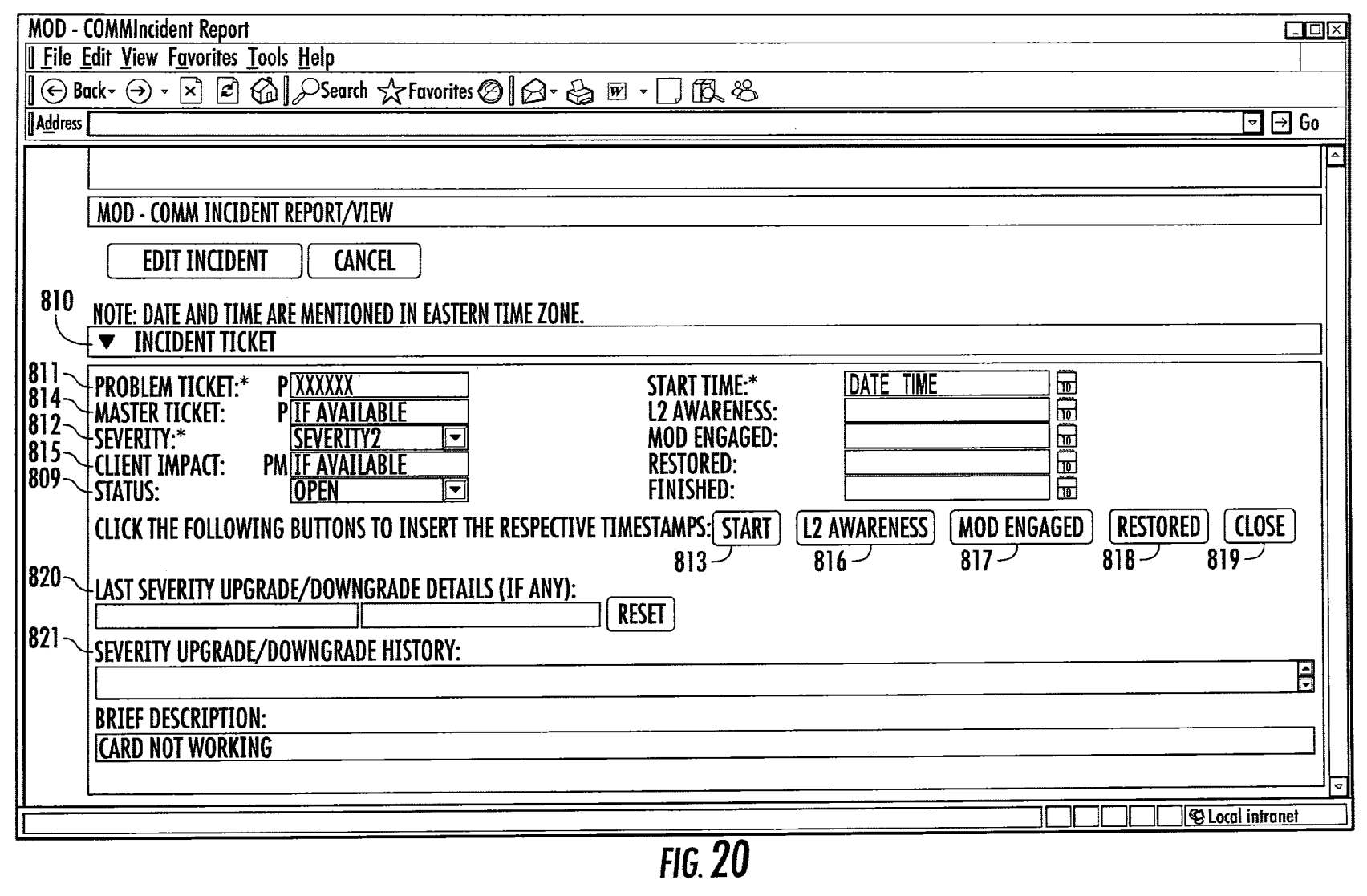

FIG. 20 provides part of an incident communication interface for the knowledge management system illustrating part of the information located within an incident ticket, in accordance with an embodiment of the invention;

FIG. 21 provides another part of the incident communication interface for the knowledge management system illustrating another part of the information located within an incident ticket, in accordance with an embodiment of the invention;

FIG. 22 provides another part of the incident communication interface for the knowledge management system illustrating another part of the information located within an incident ticket, in accordance with an embodiment of the invention;

FIG. 23 provides another part of the incident communication interface for the knowledge management system illustrating another part of the information located within an incident ticket, in accordance with an embodiment of the invention;

FIG. 24 provides another part of the incident communication interface for the knowledge management system illustrating another part of the information located within an incident ticket, in accordance with an embodiment of the invention;

Figure 25:
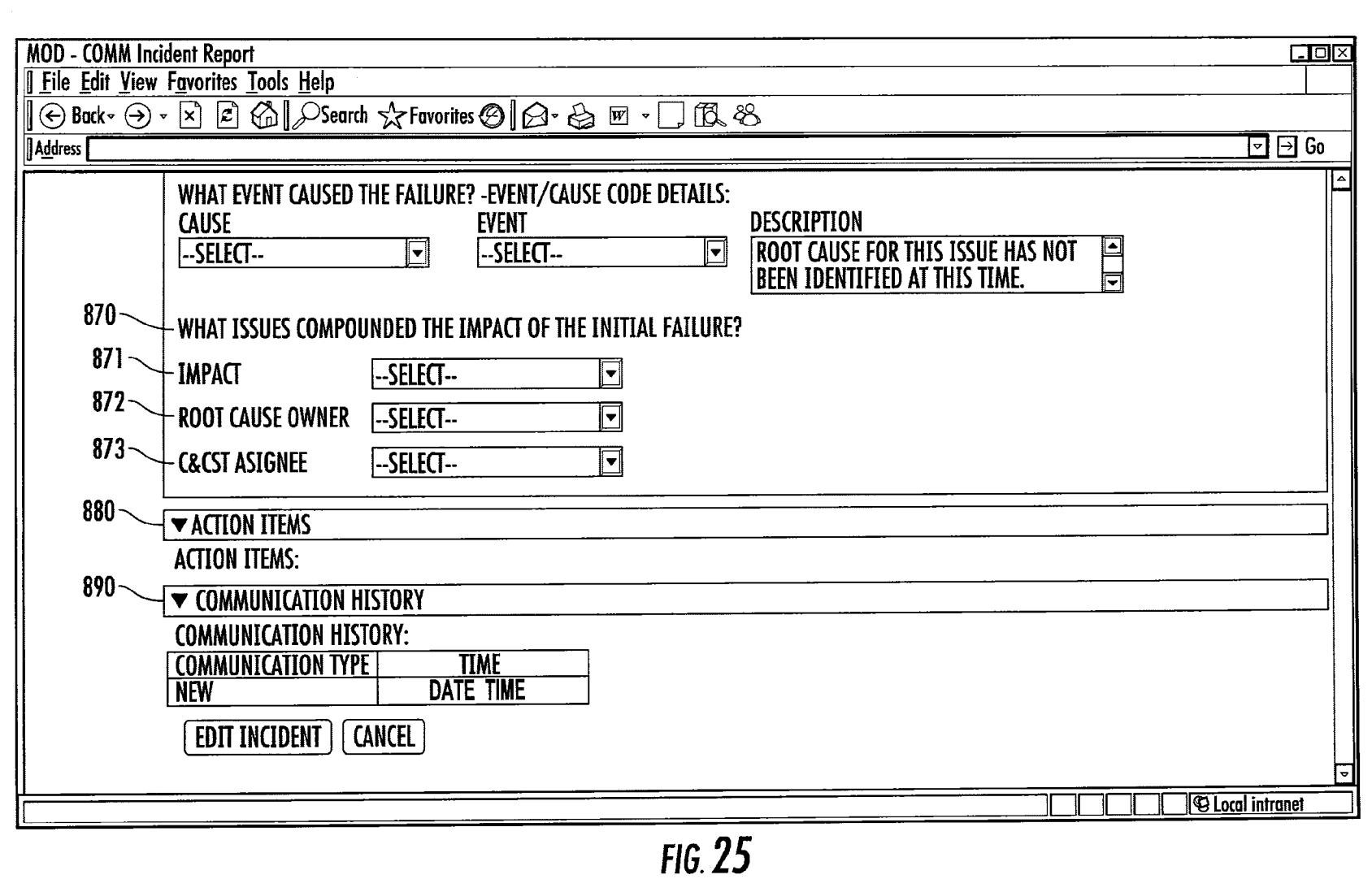

FIG. 25 provides another part of the incident communication interface for the knowledge management system illustrating another part of the information located within an incident ticket, in accordance with an embodiment of the invention;

FIG. 26 provides a process flow for the knowledge management system illustrating the incident response process flow, in accordance with an embodiment of the invention;

FIG. 27 provides an academy home page interface for the knowledge management system illustrating the certification and modules available to the user, in accordance with an embodiment of the invention;

FIG. 28 provides an expanded academy home page interface for the knowledge management system illustrating the certification and modules available to the user, in accordance with an embodiment of the invention.

Figure 29:
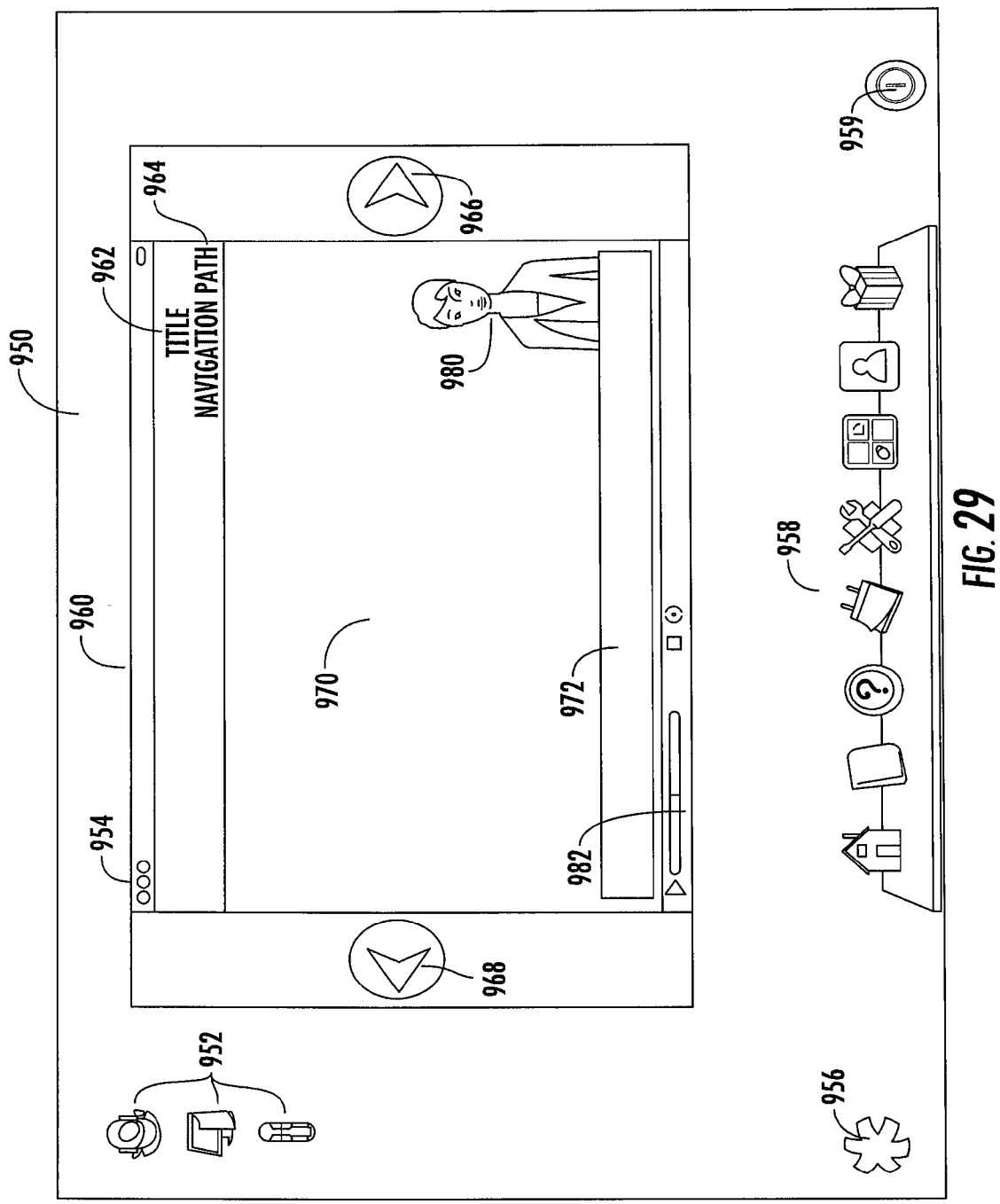

FIG. 29 provides an academy module interface for the knowledge management system illustrating the module display for a user, in accordance with an embodiment of the invention; and FIG. 30 provides a process flow for the academy system of the knowledge management system, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although the embodiments of the invention described herein are generally described as involving a "bank," one of ordinary skill in the art will appreciate that other embodiments of the invention may involve other businesses or financial institutions that take the place of or work in conjunction with the bank to perform one or more of the processes or steps described herein as being performed by a bank. Other embodiments of the invention may involve other businesses outside of the financial industry altogether.

As will be appreciated by one of skill in the art in view of this disclosure, the present invention may be embodied as a method or an apparatus (system, computer program product, device, etc.), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatus (systems, computer program products, devices, etc.). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

FIG. 1 illustrates the knowledge management system 1, in accordance with an embodiment of the invention. The knowledge management system 1 is a system configured to manage knowledge for all, or at least a plurality, of the channels across a bank and the sub-channels within those channels. In the illustrated embodiment, the channels include, for example, an e-commerce channel 2, a banking center technology ("BCT") channel 3, an automated teller machine (ATM) channel 4, a mortgage, home equity, and insurance technology ("MHEIT") channel 5, a card services channel 6, a deposits contact center ("DCC") channel 7, as well as other additional channels 8. However, in other embodiments of the invention, the knowledge management system 1 can provide the same or similar support for different LOBs, departments, or channels across any type of business.

FIG. 2 provides a system diagram 100 illustrating the interaction of the systems in the knowledge management system 1, in accordance with an embodiment of the invention. As illustrated in FIG. 2, a user computer system 110 is operatively coupled, via a network 102, to a knowledge management server 120, one or more bank databases 130, and one or more bank computer systems 140. In this way, a user 104 of the user computer system 110 can receive electronic information from the knowledge management server 120, bank databases 130, and the bank computer systems 140. The network 102 may be a global area network (GAN), such as the Internet, a wide area network (WAN), a local area network (LAN), or any other type of network or combination of networks. The network 104 may provide for wireline, wireless, or a combination of wireline and wireless communication between devices in the network.

As illustrated in FIG. 2, the user computer system 110 generally comprises a communication device 111, a processing device 112, and a memory device 1 13. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device 113.

The processing device 112 of the user computer system 110 is operatively coupled to the communication device 111 and the memory device 113. The processing device 112 uses the communication device 111 to communicate with the knowledge management server 120, bank databases 130, and the bank computer systems 140 over the network 102. As such, the communication device 111 generally comprises a modem, server, or other device for communicating with other devices on the network 102, and a display, mouse, keyboard, microphone, and/or speakers for communicating with one or more users 104. As further illustrated in FIG. 1, the user computer system 110 includes computer-readable instructions 114 stored in the memory device 113, which include the computer-readable instructions 114 of a web browser 115 or other similar application that allows the user computer system 110 to communicate with one or more other devices on the network 102. The web browser 115 allows the user 104 to access the knowledge management application 125 in the knowledge management server 120. The knowledge management application 125 gathers information representing the knowledge of the associates across all of the channels into one application and stores the information for, among other things, resolving production incident problems that occur within the various channels. Users 104, who are often bank employees, use the knowledge management application 125 as their go to source for the location of all business related information references, as is discussed in greater detail below.

As illustrated in FIG. 2, the knowledge management server 120 generally comprises a communication device 121, a processing device 122, and a memory device 123. The processing device 122 is operatively coupled to the communication device 121 and the memory device 123. The processing device 122 uses the communication device 121 to communicate with the user computer system 110, the bank databases 130, and the bank computer systems 140 over the network 102. As such, the communication device 121 generally comprises a modem, server, or other device for communicating with other devices on the network 102. As further illustrated in FIG. 2, the knowledge management server 120 includes computer-readable instructions 124 stored in the memory device 123, which include the computer-readable instructions 124 of the knowledge management application 125. Although FIG. 2 illustrates the knowledge management server 120 as one system, it is important to note that there can be one or multiple systems, each with similar components that handle collecting, storing, and distributing the information for the knowledge management system 1.

The bank databases 130 generally comprise a communication device 131, a processing device 132, and a memory device 133. The processing device 132 is operatively coupled to the communication device 131 and the memory device 133. The processing device 132 uses the communication device 131 to communicate with the user computer system 110, the knowledge management server 120, and the bank computer systems 140 over the network 102. As such, the communication device 131 generally comprises a modem, server, or other device(s) for communicating with other devices on the network 102. As further illustrated in FIG. 2, the bank databases 130 contain computer-readable program instructions 134 stored in the memory device 133, which includes the computer-readable instructions 134 of data storage applications 135. The data storage applications 135 are used to capture and store information from the various bank computer systems 140, and knowledge management server 120, for the knowledge management application 125. For example, in one embodiment, the bank databases 130 store the data related to the playbooks, knowledgebases, maps, flows, operational reliability indexes, contacts, reports, incident communication interfaces, and academies of the knowledge management system 1, which are all discussed in detail below. Although FIG. 2 illustrates the bank databases 130 as one system, it is important to note that there can be one or multiple databases, each with similar components that handle capturing, storing, and/or distributing the information for the knowledge management system 1.

The bank computer systems 140 generally comprise a communication device 141, a processing device 142, and a memory device 143. The processing device 142 is operatively coupled to the communication device 141 and the memory device 143. The processing device 142 uses the communication device 141 to communicate with the user computer system 110, the knowledge management server 120, and the bank databases 130 over the network 102. As such, the communication device 141 generally comprises a modem, server, or other device(s) for communicating with other devices on the network 102, and a display, mouse, keyboard, microphone, and/or speakers for communicating with one or more users 104. As further illustrated in FIG. 1, the bank computer systems 140 contain computer-readable program instructions 144 stored in the memory device 143, which includes the computer-readable instructions 144 for bank applications 145. The bank applications 145 are used, in part, to capture the necessary information for the knowledge management application 125 along with providing support for other bank systems. Although FIG. 2 illustrates the bank computer systems 140 as one system, it is important to note that there can be one or multiple systems, each with similar components that handle capturing and distributing the information for the knowledge management system 1.

FIG. 3 illustrates the knowledge management application home page 50. This is the page that, in one embodiment of the invention, a user 104 is brought to when signing on, either automatically or manually, to the knowledge management system 1. The knowledge management application home page 50 has tabs for the various applications within the knowledge management system 1. The knowledge management home page 50 contains tabs for the playbooks 100, the knowledgebase 200, the maps 300, the flows 400, the dashboards 500, the operational reliability index ("ORI") 600, the contacts 700, the reports 750, the incident communication interface ("ICI") 800, and the academy 900 sections. The knowledge management application 125 is used by all of the production support teams, as well as other employees with access, in order to monitor, troubleshoot, and fix any production incidents, implement new production applications, and store all of the knowledge related to production support.

In one embodiment of the invention, the knowledge management system 1 can be used to track incidents that occur within the bank. Incidents are events that occur within the bank systems and applications that are outside the normal operating procedures. The incidents can lead to failed customer interactions ("FCIs") if the customer is affected by the incident at the time of the incident or at a later point in time. Incidents can also lead to degraded customer interactions ("DCI"), people hours lost ("PHL"), and agents minutes lost ("AML") for each incident. The knowledge management system 1 through the knowledge management application 125 tracks all of these metrics for incident troubleshooting and analysis of the bank computer systems 140 and bank applications 145.

Traditionally, when incidents would occur, details of the incidents were stored and employees reviewed the incidents on an as demanded basis. Furthermore, system information related to the incidents and accurate contact groups were not established or maintained in a centralized location. Therefore, incidents were reviewed when employees would get to the next incident in the queue, or when management pushed for resolution of a particular incident, and employees would not know what process owners to contact to resolve the incidents. This method of tracking and resolution takes longer than necessary to review the impacts of the incidents and to engage the appropriate resources to resolve the incidents. Such a system would allow for many FCIs that occurred for the same reasons over and over again.

Embodiments of the knowledge management system 1 were designed, in part, with the goal of reducing the FCIs. In general, the number and duration of incidents corresponds directly to the number of FCIs. As such, embodiments of the knowledge management system 1 focus on reducing the number and duration of incidents, which in turn reduces the negative impact to customers.

The incidents can be assigned different levels of severity in order to organize the incidents by levels of priority or other categories. In one embodiment, the incidents are organized into three severity levels as the incidents occur in the bank computer systems 140. Severity one (1) incidents are high impact significant events that cause full disruption of service or outages to customers and/or associates. These types of incidents represent the highest rating. Typically there are no workarounds in severity one (1) incidents, and they are addressed immediately to prevent further disruption of service or outages to customers and/or associates. Severity two (2) incidents are medium impact events that cause partial disruption of service or outages to customer and/or associates. Typically a workaround or process change is available for these events, which may be utilized by the bank to prevent further disruption of service or outages for the time being until a permanent fix is implemented. Severity three (3) incidents are low impact or non-widespread events that have minimal impact to customers and/or associates. These types of events are fixed by the bank on an as needed basis. In some embodiments of the invention only severity one (1) and two (2) incidents are tracked by the knowledge management system 1.

FIG. 4a illustrates a dashboard process flow 1500 used by the knowledge management system 1 to track and display the incidents that occur at the bank on and through the dashboards 500. As illustrated by block 1502, the knowledge management application 125 receives, by either pulling or being pushed, information related to the incidents that occur throughout the various bank computer systems 140 and associated bank applications 145 from the bank computer systems 140, as the incidents occur. Thereafter, as illustrated by block 1504 in FIG. 4a, the knowledge management application 125 organizes the incidents by status, description, start-date, end-date, duration, severity level, channel impacted (i.e. e-commerce 2, BCT 3, ATM 4, etc.), sub-channel impacted (i.e. online banking, dot com, small business, etc.), failed customer interaction, etc. and stores the data on the bank databases 130 for analysis by the user 104. As illustrated by block 1506, the knowledge management application 125 communicates with the user computer systems 110 for displaying the data related to the incidents on an overall, channel, sub-channel, and individual incident level through the use of the dashboards 500. As illustrated by block 1508, the user 104 utilizes the web browser 115 or similar application, to access the knowledge management application 125 in order to review and analyze the incidents occurring at the bank on an overall, channel, sub-channel, and individual incident level though the dashboards 500.

The incident information gathered and displayed by the knowledge management system 1 is displayed in various dashboards, illustrated in FIGS. 3, and 4b through 7. As illustrated in FIG. 3, the knowledge management application home page 50 provides data related to tracking the number of incidents that are currently open in the various channel levels. For each channel the knowledge management application home page 50 displays a current incident status section 60 and a daily performance section 70. The current incident status section 60 displays gauges 62 illustrating, in some embodiments, the number of open severity level one (1) ticket incidents 64 and the number of severity level two (2) ticket incidents 66. In one embodiment, the gauges 62 display a reading in the green, yellow, or red for illustrating the general status level for all of the incidents in each channel.

A user 104 of the knowledge management application 125, can select the detach button 52 and the current incident status box 60 remains as the top level view on the user's screen as the user 104 navigates through the rest of the knowledge management application 125.

The knowledge management application home page 50 is a tool for upper management to see the overall health of the systems by providing an overview of the data related to severity one (1) and severity two (2) failed customer incidents at the channel level.

The daily performance section 70 of the knowledge management application 125, in some embodiments, illustrates the total number of incidents 72 that have occurred thus far in a day for each channel in increments of one thousand (K). The daily performance section 70 also gives a general overview on a scale 74 providing the user 104 a visual display of the number of incidents that are normal (in the green) or that are abnormal (in the red). The gauges 62 and scales 74 are used by employees, especially executives, to track on a high level the number of ongoing incidents and the response of the production support teams. If there is a particular channel showing a high level of incidents a user 104 can drill down into additional data analysis tools to troubleshoot and track what factors are causing the incidents.

A user 104 navigates to additional tools in the knowledge management application 125 by selecting the dashboard 500 tab. As illustrated in FIG. 4b, selecting the dashboard 500 tab presents a dashboard 500 that, like the home page 50, displays the daily performance section 70 and includes the total number of incidents 72 and the scale 74 illustrating if the number of incidents is normal or abnormal. However, the dashboard 500 also illustrates a channel status section 502. The channel status section 502 provides a view of the impact of the incidents across each channel in a number of charts. The user 104 may view the separate channel information by selecting a channel name link or icon in the daily performance section 70. For example, FIG. 4b illustrates the charts related to the e-commerce channel 2. The channel status section 502 illustrates the response and restoral chart 510, the FCI intensity chart 512, the root cause chart 514, and the FCI ratio chart 516 for the e-commerce channel 2. The response and restoral chart 510 indicates the average time it is taking production support to resolve any severity level one (1) or severity level two (2) incidents for a particular day. The FCI intensity chart 512 illustrates the number of incidents that were not fixed within the proper response time over a period of several weeks, days, or hours. The root cause chart 514 is a pie chart illustrating the root causes of the incidents as a percentage of various changes, such as a production release change, a business as usual ("BAU") change, a BAU failure, an unapproved change, or a miscellaneous change. Finally, the FCI ratio chart 516 illustrates the percentage of FCIs for each channel in relation to the other channels within the bank.

A user 104 can drill-down to view the incidents associated with specific sub-channels of each channel, by selecting (double-clicking) a link or icon for a channels in the daily performance section 70. For example, FIG. 5 illustrates a view of the incidents in the sub-channels of the e-commerce channel 2, such as the online banking 520, dotcom 522, and small business 524 sub-channels. The incidents are displayed for each sub-channel in the channel view section 503, in much the same way as they were displayed for the channel level in the daily performance section 70 of FIG. 4b. The incident summaries for each of these sub-channels are displayed in the sub-channel status section 504, as illustrated in FIG. 5. The sub-channel status section 504 displays the same charts and information that were displayed in the channel section 502 of FIG. 4b, but the charts show the break down of the incidents for each sub-channel when the user 104 selects the associated sub-channel name or icon in the channel view 503.

If a user 104 wants to examine a particular incident within any of the sub-channels, the user 104 drills-down in the dashboards 500 to the manager on duty ("MOD") incident list 530 illustrated in FIG. 6, by, for example, selecting (double-clicking) the sub-channel name or icon in the dashboard 500 illustrated in FIG. 5. The MOD, in one embodiment, is the manager that is responsible for the eventual resolution of incidents in a particular channel, sub-channel, or application level at the bank. The MOD incident list 530 has an incident status section 540 and a customer login volume 532. The incident status section 540 lists the incident ticket number 541, the status 542, the description 543 of the incident, the start date 544, the end date 545, the duration 546, the severity 547, the channel impacted 548, and the FCI 550, DCI 551, PHL 553, and AML 554 for each incident. This dashboard allows the user 104 to examine each unresolved incident in the system and check the status of each incident. As illustrated in FIG. 6, a user 104 can view the incidents by month, week, and day, as well as change the number of incidents viewed at one time on the page.

The customer login view 532 illustrated in FIG. 6, allows the user to view the number of customers who have logged into the related channels, sub-channels, and applications at the bank. For example, the customer login view 532 illustrated in FIG. 6, provides the number of customers who have logged into the online banking sub-channel of the e-commerce channel 2. The chart provides a general measurement of the number of customer to logged into a channel, sub-channel, or application so it can be compared against the amount of incidents that have occurred in that channel, sub-channel, or application. In many cases the number of incidents is proportional to the number of customer logins, but that is not always the case. The customer login view 532 simply provides another tool in helping to track and troubleshoot any incidents that occur at the bank.

The dashboard 500 also allows the user 104 to view the specifics about each individual incident, as illustrated in FIG. 7. The user 104 may select the incident ticket number 541 in the MOD incident list 530 to view the detail report 560. The detail report 560 contains a summary of important information contained in the incident ticket, which is discussed in detail below. The detail report 560 has four sections, the general information section 562, the causal information section 564, the impact information section 570, and the summary information section 580. The general information section 562 lists the description, start date, end date, duration, root cause owner, incident ticket number, problem ticket number, severity, did the resolution meet the service level agreement, the related playbook, and the time and date of the last update. The casual information section 564 lists where the failure occurred, what event caused the failure, and what issues compounded the impact of the failure. The impact information section 570 includes the impacted channel 548, the impacted technical executive 572, the impacted sub-channel 573, the geographic location 574, the FCI 550, the DCI 551, the PHL 552, and the AML 553. The summary information section 580 includes a summary of the restoral, the cause, and the resolution of the incident, as it currently stands. The number of fields completed in the detail report 560 are dependent on how difficult it is to resolve the incident, how far along the incident stands within the production support process, and how much detail has been added to the incident ticket, as is discussed in further detail with the ICI section 800.

The detail report 560 allows a user 104 to examine and track the incident progress of particular incidents of interest to that user 104. By examining open incident tickets or completed incident tickets, a user 104 with a similar or the same issue may reduce the work load on himself/herself, or others involved with a particular incident. If the same or similar problem has occurred in the past the resolution of that incident may help solve the present incident. The detail report 560 and the incident tickets provide a detailed outline of the process, people, and fixes involved with each of the production incidents. Furthermore, a user 104 can also utilize the detail report 560 to identify the status of an incident and determine the next step in the process of resolving the incident because the detail report 560 lists the last person to work on the incident, and the last time the incident ticket was viewed.

The playbook 100 tab is illustrated in FIG. 8. The playbook 100 database gives a user access to incident recovery guides 150. The incident recovery guides 150 include information on how an incident can be resolved and the steps taken for the resolution of the incidents. A playbook search section 170 is provided, in which the user 104 selects the channel and application for which he/she needs the incident recovery guide 150. Alternatively, the user 104 may search for the incident recovery guide 150 using the playbook search section 170. In some embodiments the playbook search section 170 may be a specific page displaying all of the incident recovery guides 150 for an application, sub-channel, or channel selected by the user 104.

An incident recovery guide 150 is a step-by-step process for identifying the root causes of an incident and fixing the problem. The incident recovery guides 150 include information about how an incident can be resolved and the steps taken for the resolution. An exemplary incident recovery guide 150 is illustrated in FIG. 8. The incident recovery guide 150 has an overview section 151 that lists the symptom/incident 152, the possible causes 153, the possible effected channels 154, the remediation leader 155, the initial triage paging groups 156, and any associated notes 157 for the incident recovery guide 150. The symptom/incident 152 lists the error that produced the incident, such as for example, if an online banking monitor was showing a login failure, or the incident itself. The possible causes 153 of the symptom/incident 152 indicate the common causes that have produced the error in the past or that could produce the error. The possible affected channels 154 indicate to the user 104 the different channels, or sub-channels that the error may affect. The remediation leader 155, lists the MOD and the infrastructure domain generalist ("IDG"). The MOD provides senior level accountability over the production support environments, while the IDG partners with the MOD on critical events to focus on service restoral and follows established root cause analysis. The initial triage paging groups 156 is a list of the groups that may need to be included in the incident recovery process in order to resolve the incident. A notes section 156 is also included giving the person who drafted the incident recovery guide 150 a place to list any comments or special instructions.

The incident recovery guide 150 also has an incident recovery guide display section 160. This section lists all of the process steps 162 for each incident recovery guide 150. The process steps 162 include links and notes 164 that further define the incident recovery guide 150 process and provide cross-linked references to other areas and data within the knowledge management application 125. The links and notes 164 can take the user 104 to other tabs within the knowledge management application 125. Therefore, during specific steps in the recovery process a user 104 can click on a link to a "process map" and the user is taken to the corresponding process map in the maps 300 section. Additionally, the user 104 may have a problem with one of the steps and may need to discuss it with the appropriate contact. The user 104 may select the "contact" link and be taken to the proper contact list in the contacts 700 tab, which outlines who is the appropriate contact for that that particular step. Furthermore, the incident recovery guide 150 is linked to specific incident tickets in the knowledgebase 200 tab, discussed later, that have been resolved using that particular incident recovery guide 150. The user 104 may view the incident tickets linked in the incident recovery guide 150 in order to identify how previous incidents were resolved using the incident recovery guide 150.

In one embodiment, the playbook 100 includes incident recovery guides 150 for every production incident that occurred within the business. If an incident occurs that does not already have an incident recovery guide 150, the team assigned to fix the incident creates an incident recovery guide 150 and add it to the playbooks 100.

The knowledgebase 200 is the second tab in the knowledge management application 125. As discussed below, whenever there is an incident that needs to be examined the ICI 800 tab can be used to fill out an incident ticket. After the incident is resolved, the completed ticket is stored in the knowledgebase 200. Therefore, associates that have problems with resolving incidents may search the knowledgebase 200 for resolutions of similar incidents.

FIG. 9 illustrates one exemplary embodiment of the interface for the knowledgebase 200 tab, which includes the search section 210 and the results section 220. In the knowledgebase search section 210, a user 104 can search any of the available tickets by keyword 212, application 214, ticket number 216, and date range 218. The application 214 search finds and displays any tickets related to a specific application used in production support. The results section 220 lists each incident found in the search and lists the ticket number 222, start date 224, end date 226, issue description 228, cause of the incident 230, and resolution 232.

Users 104 of the knowledge management application 125 researching particular incidents may search for related incidents and find resolutions to the related incidents before the users 104 have to escalate the incidents to other associates for resolution. This prevents other associates at the bank from having to put aside their everyday workload to troubleshoot incidents that they have already taken care of in the past. The users 104 can utilize the knowledge of other associates to troubleshoot the incident on their own without having to contract those specific associates.

The users 104 of the knowledge management application 125 click on the selectable incident ticket number 222 link to open up the full incident report outlining the history of the incident ticket. The contents of the incident ticket is described below when describing the ICI 800 tab. Links within the incident ticket allow the users 104 to be sent directly to other tabs throughout the knowledge management application 125, such as the playbook 100 tab. For example, as described later in greater detail with regard to the ICI 800 tab, the users 104 examining the history of an incident ticket may select the incident recovery guides 150 related to the particular incidents being viewed and are taken to the associated incident recovery guide 150 in the playbook 100 tab. Different versions of the incident ticket may be stored in order to allow the users 104 to see how incident reports were amended over time. As described later in greater detail with regard to the ICI 800 tab, the users 104 have the ability to look at the changes in the ticket over time to examine the process, failures, and successes in resolving the incidents.

FIG. 10 illustrates the maps 300 tab, which includes the three primary types of process maps that are used for troubleshooting incidents: the physical 310, the logical 320, and the transactional 330 process maps. A user 104 can select (click-on) any of the names of the maps 300 in FIG. 10 to access that particular map 300. The user 104 may also search the maps 300 through a keyword search function 340. In other embodiments of the invention, the left side of the interface for the maps 300 lists the available process maps of each channel and sub-channel. When the process map name is selected on the left side, the process map is displayed in a window on the right side of the maps 300 interface. In one embodiment, all of the procedures and systems in the process maps are cross-linked to other process maps and directly accessible through the other tab sections in the knowledge management application 125.

FIG. 11 illustrates an example of a physical process map from the maps 300 tab. In one embodiment of the invention, the maps 300 section has a roll over feature that displays more information whenever the curser is over an element in the process map. When an element in the process map is rolled over, the objects are drilled down to a lower level providing more information related to the element, such as additional pictures or text explaining the element of the process map.

In one embodiment when an icon in a particular map is clicked on or scrolled over, a pop-up window 350 appears on the interface display. The window 350 has tabs and lists associated attributes of the element. The tabs relate to different aspects of the icon and the attributes list information for each of the tabs. In some embodiments, each tab may have a search function, a hierarchy drilldown tree, and/or lists of information for organizational purposes. The attributes in each tab relate to information, including but not limited to, documentation, performance metrics, links to other process maps, data in the knowledge management application 125, as well as system requirements for the elements in the process map with which the window 350 is associated. The navigation icons 360 at the top of the page of each map are used, in one embodiment, for linking to other areas of the knowledge management system 1 and for creating and editing the data located in the pop-up window 350.

The physical maps 310 display the hardware and physical details about a system. They include the hardware components, location of the components, databases, servers, etc. of the system being investigated. The physical maps 310 capture information related to the box (or the physical hardware in the bank), transport protocol (standardized format for delivering audio & video data over the internet), network devices, databases, service providers, location of the box, IP Address, capacity on demand for the system, server role identification (such as primary, failover, active vs. inactive status), box owner (organization that is responsible for physical hardware), object orchestration services ("OOS") (used for tying different types of hardware together), and interaction information with other systems, applications, and/or elements.

The information for a specific element in the physical map 310 can be accessed by scrolling over or clicking on an icon in the map. For example, when a server is included in a process map a user may click on or scroll over the server icon and a window 350 pops up showing a number of tabs and the attributes for the server listed below the tabs. In some embodiments, the physical maps 310 can have tabs with information, including but not limited to monitoring summary documents ("MSDs"), change records, server information, and performance & capacity information.

The tabs for the MSD information provide links to documents and data throughout the knowledge management application 125, such as, but not limited to the incidents in the knowledgebase 200 that are associated with that particular server. The server may also contain links to specific incident recovery guides 150, which are used in fixes of incidents associated with the server. Links to the dashboard 500 may also be included in the MSD tab. The user can quickly evaluate how the server is performing using the dashboard 500 to view the open incidents associated with that server or application.

The tabs for change record information provide a list of all the changes made to the server, such as, changes in the host name, as well as the service provided to the server over a specified time period.

The tabs for server information can include operating system information, service level agreement data, as well as other system information for the server, such as an application inventory tool ("AIT"), which is used to track inventory related to applications, host name, box owner, box availability time, and IP address. These tabs may also include links to contacts responsible for maintaining the server, and by clicking the link the user 104 is taken to the contacts 700 tab see the contact information for the contacts.

The tabs for the performance & capacity information illustrate real time performance metrics indicating how well the server is working and the capacity indicating how much more information the server can control and store, such as the outage time of the server and any up or down time.

The logical maps 320 display all the interacting applications, the application structures and interfaces, and the linkage between them. The logical maps 320 capture the application information without any hardware details, including front end applications, helper applications, web servers information, including, simple object access protocol ("SOAP") (a protocol specification or exchange structure information in the implementation of web services in computer networks), web logic, web sphere (sets-up, operates, and integrates electronic business applications across multiple computing platforms), middleware tools, web methods, and online support systems ("OSS") interaction.

In one embodiment, the logical maps 320 interface is set up in much the same way as the physical maps 310 interface. A user 104 views information about a particular application or part of an application by scrolling over the icon or selecting the icon. A window pops up on the screen showing a number of tabs with attributes of the tab listed below. The tab sections can have some of the same tabs of the physical maps 310 and/or different tabs. The tabs can include information for change control, tools, and process map review information. The change control information lists all the change records, such as updates to the application, for a particular application over a specified time period. The tools information captures tools, such as the monitoring tool, log file, routing tool, and any other kind of tool launched from the application. The map review information shows whether a map was flagged as reviewed, when it was done, who has reviewed it, and when it was created. In some embodiments the tabs provide a facility for search functionality allowing the user 104 to search for information in the knowledge management application 125 related to a particular application, system, or transaction depending on what process maps are being reviewed.

The transactional map 330 shows how a particular transaction is flowing into and out of the applications and systems. This process map captures end-to-end transaction flow communicating or interacting with different interfaces, including both applications and hardware. The transactional map 330 captures information, such as, interaction flow between different applications, input and output from each application, process system flow, business function, sequencing different business functions, and impacts on transactions to other processes. A user 104 views information about a particular transactional map 330 by scrolling over an icon or selecting an icon in the map. A window pops up on the screen showing a number of tabs with attributes of the tab listed below. The tab sections for the transactional maps 330 can have some of the same tabs of the physical maps 310 and logical maps 320, and/or different tabs.

In general, the process maps further include support team information indicating who is responsible for maintaining the process maps. In one embodiment the user 104 is able to point-out the changes required in the process map to the support team, who receives notification for the requested change from the user 104 through the maps 300 interface.

In one embodiment the flow 400 tab provides flow charts 402 from a customer interface perspective, as illustrated in FIG. 12. It is understood that in other embodiments the flow 400 tab can provide charts from the bank or business perspective. The flow charts 402 provide a high level overview of the applications that the customer interfaces with throughout the bank. A user 104 can also drill down to lower level flow charts 402 that provide more detail related to the customer interface applications and systems or view other flow charts 402 for other applications and systems, by searching in the search field 404, using the drop-down menu 406, or in some cases selecting icons within the flow charts 402.

There can be multiple flow charts 402 per channel and sub-channel within the bank. The flow charts 402 are cross-linked with other customer flow charts 402 and the physical 310, logical 320, and transactional 330 process maps, as well as with other sections within the tabs of the knowledge management application 125, as described for the maps 300 section. As described in regard to the process maps, the user 104 scrolls over or select an icon in the flow charts 402 to receive more information about that element in the flow chart 402. Again, the information is displayed in a pop-up window with tabs and attributes within each tab.

Elements and information related to each of the process maps and the flow charts 402 can be updated in the knowledge management application 125. Changes made to the elements and information in the process maps and flow charts 402 automatically update any other process maps and flow charts 402 or other information that is cross-linked to the elements and information changed. For example, an upgrade to a server may be implemented at the bank. A user 104 updates the information related to the server in one of the process maps in order to display the new server capacity information. As a result, if the server appears in any other process map, the information related to that server is automatically updated to include the new capacity information.

The ORI 600 tab is a multi-level corporate performance scoreboard. It allows a user to drill down to channel, sub-channel, application, category, and predictability factor level views to evaluate the reliability and stability of the applications as they relate to each category, sub-channel, and channel. Each predictability factor, category, application, sub-channel, and channel is assigned a weighted average related to how important each is in scoring the reliability of the level above. Therefore, the scores from the predictability factor level can be rolled-up into a score for each of the category, application, sub-channel, and channel levels.

FIG. 13A illustrates an ORI process flow 1600 used by the knowledge management system 1 to track and display the reliability of the applications, sub-channels, and channels. As illustrated by block 1602, the knowledge management application 125 receives weighed values for how each of the predictability factors affects each of the categories. The weighed values may be assigned manually by a user 104 through the user computer systems 110 or they may be determined automatically based on data gathered by the knowledge management application 125 through the bank computer systems 140. The user 104 assigning the weighted averages may be an application manager, MOD, or other bank employee in charge of determining the how each predictability factor affects each of the categories for specific applications within the bank.

As illustrated by block 1604 the knowledge management application also receives weighted values for how each of the categories affect each of the applications, sub-channels, or channels, how each of the applications affect each of the sub-channels and channels, and/or how each of the sub-channels affects each of the channels. Again, the weighted values may be assigned manually by a user 104 through the user computer systems 110, or they may be determined automatically based on data gathered by the knowledge management application 125 through the bank computer systems 140.

As illustrated by block 1606 the knowledge management application 125 receives reliability data for the predictability factors for each of the bank applications 145. As illustrated by block 1608 the knowledge management application 125 then transfers the reliability data into a score for each predictability factor. For example, for the predictability factor of "if an application has a control plan" the reliability data received is either yes or no. In some embodiments, if the answer is yes the knowledge management application 125 transfers the yes into a score of 100% and if the answer is no it is transferred to 50%. In other embodiments, different reliability data is received and transferred into different scores, as discussed in further detail later. Again, the reliability data and scores may be assigned manually by a user 104 through the user computer systems 110 or they may be determined automatically based on data gathered by the knowledge management application 125 through the bank computer systems 140.

As illustrated by block 1610 the knowledge management application 125 takes the scores for each predictability factor in each category and calculates a category score, an application score, a sub-channel score, and a channel score based on the weighted values of the predictability factors, categories, applications, and sub-channels within each channel.

FIG. 13b illustrates one embodiment of the ORI 600 home page. FIG. 13b illustrates the top level ORI score for each major channel 602; the e-commerce channel 2, the BCT channel 3, the DCC channel 7, the card channel 6, the MHEIT channel 5, and the ATM channel 4. Each channel 602 has an icon 601, and the icons 601 list the channel score 603 for each channel 602. A user 104 can view the ORI 600 scores for each of the sub-channels 604 within the channels 602 by clicking on one of the channel icons 601. In other embodiments, the user 104 can view the ORI 600 score for each of the sub-channels 604 by clicking on the channel name, or using the search function 640, or drop-down menu 642.

FIG. 14a illustrates part of the ORI 600 for the e-commerce channel 2. The ORI 600 for each channel 602 includes the all of the sub-channels 604 within a channel 602, each application 606 that impacts the sub-channels 604, and the categories 608 that score the impact of each application 606. Not shown are the predictability factors 610 for each category 608, which are discussed in detail below. A drill-down button 605 is used to drill-down in the index from the sub-channel 604 level, to the impacting application 606 level, to the category 608 level, and down to the predictability factor 610 level. The scores are calculated based on the predictability factor score 612 and the weighted averages are then used to calculate a category score 614, an impacting application score 616, a sub-channel score 618, and finally the channel score 603.

The scores are calculated for each application 606 by using an ORI score-sheet 620, as illustrated in FIGS. 14b through 14e. The score-sheet has a category column 622, a FCI predictability factor column 624, an answer column 626, a sub-category weighting column 628, a source column 630, a format column 632, a scale column 634, and a channel category weighting column 636.

The categories 608 in the category column 622 cover a range of management areas in production support. They are the major management categories 608 that are addressed with any application 606 that is used in production support. Each application 606 is scored in the knowledge management application 125 on the basis of each of the categories 608. The categories 608 for the ORI 600 were determined based on an analysis of the where, when, and how the FCIs occurred throughout the production support process. In one embodiment, the most important categories 608 were identified as change management 611, availability management 612, service continuity management 613, knowledge transfer management 614, infrastructure and risk management 615, capacity management 616, service level management 617, and systems management 618. However, it is understood that, in other embodiments, the criteria may be split into any number of different categories 608.

Each of the categories 608 have a number of associated predictability factors 610 illustrated in the predictability factor column 624. The predictability factors 610 are questions, data values, metrics, or other factors which relate to how FCIs occur within the bank for each particular category 608. Within each category 608, the predictability factors 610 are weighted as to how much each predictability factor 610 contributes to causing FCIs that occur within the category 608 for the applications 606, as illustrated in column 628. The weighted percentages are based on historical data analysis of the predictability factors 610 causing FCIs in the past. The total percentages of the predictability factors 610 within each category 608 add up to one-hundred percent (100%).

As illustrated in FIG. 14b, the change management 611 category's FCI predictability factors 610 may include:
Are the procedures for initiating, approving, verifying and scheduling changes always adhered to?
Is there a clear distinction between a change request (e.g. upgrade application, change router configuration, update firewall policies, etc) and a service request (e.g. resetting a password)?
Are there regular reviews (i.e. at least quarterly) on performance of changes implemented against documented key performance indicators ("KPIs") for this application?
Are multiple related changes grouped and then properly scheduled and communicated to minimize the impact to the business users including last minute schedule changes (e.g. unforeseen delays during implementation)?

As illustrated in FIG. 14b, the availability management 612 category's FCI predictability factors 610 may include:
Are there any single points of failure ("SPOF") (If not known, please answer yes)?
If yes, criticality to environment of SPOF?
Are availability impact information (including the detail of the impact of proposed changes) communicated to the change management process area?
Is there a regular (e.g. at least every 6-months) review of current infrastructure against required availability
with a view to identify SPOF?
with a view to optimizing equipment (lowering cost)?
Do you have procedures for monitoring, analyzing, and forecasting service availability?
Are there audit procedures in place to validate the ongoing accuracy and appropriateness of the monitoring and forecasting procedures?
Do you have defined targets for the availability, reliability and maintainability of IT infrastructure components (including 3rd party vendors) relied upon by the application?
Do you carry out monitoring and trend analysis of the availability, reliability and maintainability of IT infrastructure components (including 3rd party vendors) to help identify potential future bottlenecks?

As illustrated in FIG. 14c, the service continuity management 613 category's FCI predictability factors 610 may include:
Is the business continuity plan in standard format?
What is the date of the last test?
Have all outstanding issues identified as a result of testing been resolved or is an approved business continuity remediation plan in place?
Is there a documented and known recovery plan in place for each service area, in the event of an unforeseen issue?
Are there regular backups of critical data taken and stored securely?
Are critical backups of information tested on a regular basis?
Is testing performed for quality attributes such as reliability, usability, and maintainability?

As illustrated in FIG. 14c, the knowledge transfer management 614 category's FCI predictability factors 610 may include:
Has handover/takeover meeting conducted with initial team?
Has necessary documentation been completed?

Rate the quality of on-boarding new resources (bank and strategic partner)
Rate the quality of training documentation and schedules
Are workarounds documented/new changes tested with workarounds in place?

As illustrated in FIG. 14d, the infrastructure and risk management 615 category's FCI predictability factors 610 may include:
Does the application use any non-permitted ("NP") technologies? (consider software level: non permitted score by enterprise technology and delivery ("ET&D") (can be more than 1 per application))
If yes, how many instances of NP technology exist?
Does application have remediation plan for any non-permitted technologies?
Does application have a control plan?
Was the control plan updated within past calendar year?
Does the business impact analysis exist?

As illustrated in FIG. 14d, the capacity management 616 category's FCI predictability factors 610 may include:
On average how close are current processing volumes to the volume ceiling of the application?
Are there any known initiatives that will increase rate of growth? (Initiative, Sales campaigns, etc.)
Are threshold alarms in place for individual services that alert staff about approaching maximum capacity limits?
Are key components (resources) monitored for capacity load? (e.g. Hard disk, memory, CPU, etc.).
Is capacity data constantly analyzed to help in resolution of incidents and problems?
Are changes to the capacity of the application handled through a formal change management process?

As illustrated in FIG. 14e, the service level management 617 category's FCI predictability factors 610 may include:
Do service level agreements ("SLA") exist between LOB and consumer and small business bank technology and operations?
Is risk rating assigned by LOB?
Does the current application design support the LOB risk rating/SLA?
Are agreements with vendors documented and reflected in the SLA's?
Does the SLA structure include features such as reliability, security, service hours, support, response times, turnaround times, performance criteria?
Are there mechanisms in place to monitor and measure all items in existing SLAs?
Do SLAs have clearly identified key targets for service hours, availability, reliability, support, response times and change handling?

As illustrated in FIG. 14e, the system management 618 category's FCI predictability factors 610 may include:
Are tools and processes in place to automate or quickly react to customer/agent impacting events to provide operational relief?
Are component based technology monitoring tools available? (e.g. Introscope, PerfMon, NetScout, SiteScope, Mqueue Command Center, etc.)
Is the operating system (on which the application components are installed) monitored on server and client machines? (Paging, File I/O, Network I/O, Local Disk I/O, Remote Disk I/O)
Are application performance trends monitored and projected forward to indicate when thresholds will break and projected breaks that are alerted with sufficient time to alter the application/system to avoid service breaks from happening?
Are component/Application interfaces monitored (All Component Boundaries, Framework Interfaces)
Are customer experience monitoring tools available? (e.g. Topaz, Online Banking Monitor, Compuware Vantage Agentless Monitoring (Measure transaction response time, transaction volume))

Each of the predictability factors 610 listed above are assigned a particular weight in the sub-category weighting column 628 associated with how each predictability factor 610 contributes to producing FCIs. The scores of each predictability factor 610 may be manually entered by the source listed in column 630, other employees, or a user 104 in charge of reviewing the scoring. Alternatively, the scores may be automatically populated by receiving information from other applications in the knowledge management system 1 or the bank computer systems 140. As illustrated by the format column 632 and scale column 634, the scores may be based on a "yes" or "no" response, a scale, a count value, percentages, a number range, pass or fail, a high, medium, and low response, or some other similar rating system. Items with multiple rating values, such as a scale, may have associated text that defines the best practices for scoring the predictability factor 610. In some embodiments, the score-sheet 620 may have note fields allowing users 104 to populate why a particular score was given for a particular predictability factor 610, in order to justify the rating. The text and notes fields help to create uniformity in the scoring across the channels.

Depending on the answer to the predictability factors 610, in one embodiment, the predictability factors receive a score in the answer column 626 of zero (0) to one-hundred (100) percent. The score of a particular category 608 for an application 606 is based on the sum of the scores for each of the predictability factors 610 in that category multiplied by the factor weight listed in the sub-category weighting column 628.

In some embodiments of the invention, other scores are used along with the predictability factors 610 for each category when determining the application score and before the application score is used to calculate the sub-channel and channel scores. For example, in some embodiments an application risks and control assessment tool ("ARCAT") is utilized to determine an ARCAT risk score and an ARCAT control score. The ARCAT risk score is related to inherent application risks. The ARCAT risk score is determined by taking into account the risks related to the application, such as business impact analysis, downstream applications, upstream applications, transaction rate, data volume, recovery time requirements, related hardware and software, and privacy data. The ARCAT control score is a measure of the control an application has over various other systems or applications. The ARCAT control score is calculated based on how the application is related to business continuity, technology architecture, platform or environment, production stability, regulatory compliance, business process, and information security. The ORI score for each application may be reduced to a percentage of the total score, and the ARCAT risk score and ARCAT control score may be added to the final ORI score. For example the ORI score for a particular application in one embodiment may be multiplied by eighty percent (80%). The resulting score may be added to the ARCAT risk score, measured on a zero (0) to ten (10) basis, and the ARCAT control score, measured on a zero (0) to ten (10) basis. The final score is still out of 100%, but now includes the additional factors of the ARCAT risk score and ARCAT control score.

Furthermore, as illustrated in the category weighting column 636 each channel, and in some cases each sub-channel, is assigned a category weight related to how the category 608 for each application affects the occurrence of FCIs in each channel and sub-channel in relation to the other categories 608 within the application. For example, as illustrated in FIG. 14*b*, the change management weight for the e-commerce channel 2 is twenty-five percent (25%), while the weight for the BCT channel 3 is twenty percent (20%), etc. Also, for the availability management category, the category weight for e-commerce is fifteen percent (15%), while the weight for the BCT channel is twenty percent (20%). The sum of each weighted average for each category in one channel equals a total of one-hundred percent (100%). Therefore, category scores 614 for each application are multiplied by the weighted average for each sub-channel and channel and then summed, so each application has a score as to how it impacts each sub-channel and channel.

Therefore, as previously discussed, the category score 614 is a weighted average of the predictability factor scores 610 listed in answer column 626. The application score 616 for a sub-channel or channel is a weighted average of the category scores 614 for that application for each sub-channel or channel. In other embodiments, the sub-channel score 618 may be a weighted average of the application scores 616 for that sub-channel. Finally, the channel scores 603 can be a weighted average of the sub-channel scores 618 or the application scores 616 for that channel.

The score-sheets 620 for each application can be updated in real-time, during periodic intervals, or on an as needed basis to examine the confidence scores of the channels, sub-channels, and applications. In some embodiments, the scores for a particular application or category are e-mailed to a subject matter expert or application manager at various intervals, in order to remind the person tasked with populating that field to do so in a timely fashion. In other embodiments of the invention, the measure time is tracked, and alarms and requests for updates to the predictability factor 610 scores are sent to the proper employees to make sure the scoring of each application is kept up to date. Access to make changes to the predictability factors 610, the associated scores, or the weighted averages may be restricted to only those who have been granted clearance.

In one embodiment, color-coded scoring is applied to each scoring level to give a user 104 the ability to quickly identify the channels 602, sub-channels 604, applications 606, categories 608, or predictability factors 610 that are acceptable, in danger of failing, or failing. Scores greater than 75% are assigned a green color code indicating that the associated metric has passed and is acceptable. Scores between 50% and 75% are assigned a yellow color code indicating that the associated metric is in danger of failing and should be monitored closely. Scores below 50% are assigned a red color code indicating that the associated metric has failed and needs immediate analysis to determine a fix.

The contacts 700 section, as illustrated in FIG. 15, is a reference tab for finding the necessary information for the teams, partners, points of contract, hierarchy levels, notification contacts, as well as other contact references. As with other tabs throughout the knowledge management application 125, in one embodiment, a user 104 can drill-down from the channel level, to the sub-channel level, to the application level, in order to review contact information for various employees. The user 104 can drill-down to the levels by selecting the names or title of various employees in the different channels, sub-channels, or application levels. Alternatively, the user 104 may use the contact search feature 702 or drop-down menu 703 to find a specific contact.

FIG. 15 illustrates an example of a contact display interface 704 in the contacts 700 tab for the online banking sub-channel of the e-commerce channel 2. The contact display interface 704 has two sections, the executive contacts 710 and the manager contacts 720. The executive contacts 710 section lists the hierarchy point 712 (or the title) and the point of contact 714 for each hierarchy point 712. In one embodiment the hierarchy point 712 in the executive contacts 710 section lists the technology executive, production support executive, e-commerce production support executive, and the technology architecture and operations executive.

The manager contacts 720 section in this example displays the contacts for shared services, which includes the internal bank production support partners. The manager contacts 720 section lists the same information as the executive contacts 710 section but on a lower hierarchy level. The manager contact 720 section also has the hierarchy point 722 and the point of contact 724 for each hierarchy point 722. In one embodiment of the manager contracts 720 section, the hierarchy point 722 lists the level one, two, and three production support managers, the websphere, the unix, the distributed performance and capacity support managers, the domain manager, center of excellence managers, test partners, as well as a number of other managers and the employees who work below these managers.

The incident recovery guides 150, the incident tickets, or other areas of the knowledge management application 125, indicate that a specific hierarchy point 722 is contacted in order to resolve a particular incident. A link is provided to send the user 104 to the proper contacts 700 tab. For example, if an incident recovery guide 150 indicates that the incident should be brought to the attention of the level 3 production support manager for shared services, a link brings the user 104 to the mangers contact 720 section illustrated in FIG. 15. The user 104 can then send the incident ticket to the proper level 3 production support manager listed in the point of contact 724 column.

In some embodiments a hierarchy point link may be provided so a user 104 can view a hierarchy map by selecting on the hierarchy point link. In other embodiments, the user 104 may view the phone number and email of the contact point by clicking on the name listed in the point of contact 724 column.

The reports 750 tab, as illustrated in FIG. 16, allows the user the capability of extracting reports from the incidents that are tracked within the knowledge management application 125. A user 104 can create, receive, and send a canned or custom report through the reports 750 tab. As illustrated in FIG. 16, the incident information report generator 751 can be filled out to create a custom or canned report. The reports 750 tab includes fields for generating reports on specific tickets by entering the title 752, the start date 754, or the end date 756 of the incident ticket. A user 104 may also populate the incident ticket number 760 or problem ticket number 762 that they want a report on. Users 104 can also create reports based on the severity rating level 763 one, two, or three, the status 764 of the incidents, the root cause owner 766 of the incidents, and the consumer and small business bank technology and operations assignee 768, to name a few.

FIG. 17, illustrates what the custom or canned report 770 looks like after a request is entered in the reports 750 tab. The report contains the information entered in the incident information report generator 751 in the overview section 772 of the report 770. The causal information 780 section illustrates the how the incident occurred including the origination system 781, the causal event 782, and the failure impact 783. The Impact Information 790 section lays out the impacted channel 791, impacted technical executive 792, the impacted sub-channel 793, the geographic location 794 of the impact and the number of FCIs 795, DCIs 796, PHLs 797, and AMLs 798. The report 770 also lists the issue 784, the customer 785 impacted, the restoral 786 information, the cause 787, and the resolution 788 of the incident. The reports 770 are typically generated for senior executive management reporting and are reviewed on a daily basis. The reports 770 can also be used for metrics collection and analysis used for driving the strategic goals of the bank.

The ICI 800 tab, as illustrated in FIG. 19, is where the incidents are tracked from when they are first identified. FIG. 18 illustrates the notification process to deal with an incident when it is first found. The first step in the process when a production incident occurs during a production process or on a production system is that an error record with information of the incident is sent for storage in a database, such as the bank database 130, as illustrated by block 1810. In some embodiments a user 104 receives a notification, through e-mail or some other communication that an error has occurred. After receiving a notification or while performing proactive monitoring the user 104 searches the database for a new incident, as illustrated by block 1812. After the user 104 identifies a new incident, the user 104 identifies the issue associated with the incident by examining the error report in the database, as illustrated in block 1814. Once the issue with the incident is identified the user 104 searches the knowledgebase 200 for any related incidents that have resolved the same issue in the past, as illustrated in diamond 1816. If the user 104 finds that the there is in fact a related incident, the user 104 drills-down into the incident report to see if that particular related incident is resolved, as illustrated in diamond 1818. If the incident ticket is resolved and closed-out then the user follows the procedure outlined in the knowledgebase 200 incident ticket to resolve the current incident, as illustrated in block 1820. The user 104 may close out the issue when the incident is resolved, as illustrated in the termination block 1840. Furthermore, as previously described the user 104 can update the incident ticket found in the knowledgebase 200 with any additional information found during the process of closing the current incident report, in order to help subsequent users facing the same or similar incident.

As illustrated by diamonds 1816 and 1818, if the user 104 cannot find a related incident ticket or the incident is not resolved, the user 104 logs a new incident ticket into the ICI 800, as illustrated by block 1822. FIG. 19 illustrates the incident home page for the incident tickets. A user 104 can enter an incident by selecting the "new incident" button 801 in the ICI 800 home page, as illustrated by block 1822. After opening a new incident the user 104 is taken to the incident ticket screen 810, as illustrated in FIGS. 20 through 25. In some embodiments the knowledge management application 125 can pull data into the new incident ticket from the data in the error report stored in the bank databases 130, such as the problem ticket number 811, severity 812, or start time 813, as well as any other information that can be found in the error report. However, a user 104 also has the ability to edit or delete any information in the incident ticket. Therefore, after a user 104 creates a new ticket he/she can enter in or change the problem ticket 811, the severity 812, the master ticket number 814 (the number of the first error report for identifying the production incident when it is first identified), the client impact 815, and the status 809 of the ticket. Furthermore, as users 104 populate the incident ticket they may select various buttons to time stamp the incident ticket when it is received by them or when it reaches certain milestones in the process by selecting the start time 813, L2 awareness 816, MOD engaged 817, restored 818, and finished 819 buttons.

After the user 104 logs the new ticket into the ICI 800, the user 104 reviews the paging guidelines for escalation, as illustrated by block 1824. The paging guidelines tell the user 104, based on what type of incident occurs, who needs to be informed of the incident. In one embodiment, the paging guidelines are located in the incident recovery guides 150 of the playbooks 100 tab. Next, the user 104 alerts the level two (2) paging list for the incident, as illustrated by block 1826. In one embodiment, the level one (1) paging list is the group of people who are first notified of an incident. The level one (1) paging list basically serves as the first help desk level used to troubleshoot any basic problems. In one embodiment, the level two (2) paging list is the next group of people that are made aware of the incidents, and are usually tasked to determine the root cause and fix the incident or provide a work around. Finally, the level three (3) paging list is the group of people that are contacted when software code needs changing to fix a particular incident. After the level two (2) paging is complete, the user 104 opens a knowledge management bridgeline (or phoneline) with the employees on the paging lists, in order to begin use the knowledge management application 104 to resolve the incident, as illustrated by block 1828.

The user 104 then begins to respond to the incident to assess the problem as illustrated in block 1850 of the response process provided in FIG. 26. The user 104 reviews the maps 300 tab as well as the upstream and downstream systems and customers affected through the flow charts 400, as illustrated in block 1852. Furthermore, as illustrated in block 1854 the user also examines the knowledgebase 200 and the incident recovery guides 150 in the playbooks 100 tab for processes that help resolve the incidents, as well as existing data and history of related incident tickets. These tabs help the users 104 find the appropriate resources from each group, and determine the customer impact for the current incident ticket.

As illustrated in block 1856, the user assigns a severity level to the incident ticket. The severity level 812 helps determine the process taken to resolve the incident, as well as the proper individuals to make aware of the incident. If the severity level 812 changes throughout the resolution process of the incident ticket, the user may enter in the severity upgrades or downgrades 820, if any, over the life of the incident ticket. The history of any severity changes are recorded in the severity upgrade or downgrade history field 821. The user 104 also enters a brief description 820 and problem description 821 into the incident ticket, as illustrated in FIG. 21. The brief description 822 is a title or short sentence outlining the general problem, and the problem description 823 is a more detailed description of the problem.

After the severity level 812 is determined the MOD makes a determination on who the incident should be communicated to and what level to escalate the incident ticket to, as illustrated by block 1858. Thereafter the MOD escalates the incident ticket to those levels, as illustrated by block 1859.

At the same time the MOD is determining the escalation, the user 104 and anyone that the MOD has already escalated the ticket to, begin the step of analyzing and researching the issues associated with the incident ticket by using the resources contained in the knowledge management application 125, as illustrated by block 1860. The user 104, and anyone notified of the incident ticket, may fill out the fields describing the problems, tracking the progress of the incident ticket resolution, identifying the source of the error, etc. The ICI 800 has the ability to store the history of changes made to the incident tickets, and store information for each field from previous incident tickets. Thus, the user 104 fills in the appropriate fields in the incident ticket through pre-stored drop down data, or if there is no associated related data the user 104 may manually fill in the required fields. The user 104 is encouraged to utilize the pre-stored incident data because it standardizes the language used across the channels in the incident tickets. This allows the users 104 to better understand the issues and resolutions for the incident tickets in a timelier manner.

As the users 104 are analyzing the incident they may add information to the incident ticket. Within the incident impact section 830, illustrated in FIG. 21, a user 104 selects the affected channels 831 and drills-down to the specific sub-channels using the sub-channel impact button 832. Within each of these channels 831 the user 104 may enter in the number of FCIs, DCIs, AMLs, and PHLs for each channel and sub-channel. The FCI and DCI breakout 833 further illustrates how the FCIs and DCIs are broken down within each channel and sub-channel. The user 104 also fills in the affected application and functionality section 834, outlining in greater detail how the incident is affecting the applications in each channel and sub-channel. The customer experience section 835 is populated with information related to how the incident is affecting the customer, and what impact that is having on the customer base. The user 104 also indicates the geographical location 836 that the incident is impacting, which may help to identify the root cause as a particular system or server. The total incident impact 837 is tallied at the end of the impact section 830, and lists the total FCIs, DCIs, AMLs, and PHLs for each channel and sub-channel.

The description section 840 of the incident ticket keeps a running tab of communications between users 104 trying to resolve the ticket. A user 104 enters a title and description in the CommDetails 841 section, indicating information related to resolving the incident ticket. A running tab of the communications 842 is kept in the description section 840 and may be edited or deleted as the incident is investigated. Also available in the description section 840 is a work around 843 section, which allows a user 104 to describe how the problem can be temporality fixed until the root cause is identified and fixed. There are also restoral and resolution 844, and root cause description 845 sections that a user 104 populates with information for identifying and fixing the root cause of the incident ticket.

As illustrated by diamond 1862, if the root cause is not identified at the initial level the incident is escalated to a higher level for more expertise on the incident team, as illustrated by block 1864. Thereafter, the team analyzes and researches the incident ticket again until the root cause is identified. After the root cause is identified the incident team implements a fix that addresses the root cause failure, as illustrated by block 1866. If this fix includes a request for change ("RFC") form, which is used for making a system, hardware, or process change, then the RFC number 846 is included in the incident ticket. Furthermore, the incident duration 847 is populated indicating the time it took from when the user logged the incident into the knowledge management application 125 until the fix for the incident ticket was identified. A link to the RFC ticket 848, as well as the MOD contact information is also provided for follow-on inquires by the user 104.

After the fix is implemented the user drafts a write up for the MOD indicating how the team resolved the incident ticket, as illustrated in block 1868. The user 104 fills out the other details section 850 and the root cause section 860 of the incident ticket. The other details section 850 has data entry areas for a problem summary 851, ticket assignment 852, and permanent resolution 853. The problem summary 851 section is populated with information indicating how the problem occurred, what the users did to troubleshoot the problem, and the outcome of the troubleshooting analysis. The ticket assignment 852 section describes the technical team responsible for the permanent resolution. The permanent resolution 853 section describes the final outcome of the fix for the incident.

The other details section 850 also identifies the tools 854 used to solve the incident. The identification of the tools utilized includes, but is not limited to, the playbook used 855, whether the user 104 consulted the knowledgebase 856, and an attachment area for any files 857 that were created or used to fix the incident. Also, in some embodiments links are included in the incident ticket, which take the user 104 to the tools utilized, including but not limited to, the incident recovery guides 150 used from the playbooks 100, the incident tickets used from the knowledgebase 200, etc.

The root cause section 860 is also populated by the user 104 after the incident fix is determined. In the root cause section 860, the user 104 describes the causal/failure details 861 by answering the following questions: where did the failure originate 862; what event caused the failure 866; and what issues compounded the impact of the initial failure 870?

Under the question, where did the failure originate 861, the user populates the fields describing the initial point of failure 863, the second point of failure 864, and the final point of failure 865. Under the question, what event caused the failure 866, the user populates the cause 867, the event 888, and the description 869 sections. Under the question, what issues compounded the impact of the initial failure 870, the user 104 populates the impact 871, the root cause owner 872, and the consumer and small business bank technology and operations assignee 873.

The user 104 also fills out the action items section 880 outlining what needs to be done to complete the fix of the incident. Furthermore, the incident ticket also has a communication history section 890 that keeps a list and time stamps all of the new, edited, and deleted information in the incident ticket.

The incident details are then saved in the bank databases 130, as illustrated by block 1870. Afterward it is verified that the incident has in fact been fixed in the system, as illustrated by block 1872. Thereafter, the user 104 can close out the issue as illustrated by block 1874. The final communication regarding the incident is sent to the MOD with an incident summary, as illustrated in block 1876. When the MOD approves the report the MOD submits the incident report to the knowledgebase 200, where the incident report is stored for future searching and troubleshooting for related incidents.

Any user 104 that has access to and wants to edit information in a particular ticket can pull up the ICI 800 home page as illustrated in FIG. 19. The user 104 may search for tickets within a particular date range 802, time period 803, severity 804, or by ticket number 805. The home page lists all of the incident ticket numbers 806 that match the search criteria, as well as the associated issue description 807, and severity 808 for each of the incident ticket numbers. The user 104 views incident tickets for editing by clicking on the ticket number of the incident in the incident ticket number 806 column.

The knowledge management system also has an academy 900 tab, as illustrated in FIG. 27. The academy 900 is a cross functional training forum for production support associates. In other embodiments the academy 900 can be used to store and track all of the training for all of the employees at the bank or the employees in any other business. The academy 900 provides online training to users 104 of the knowledge management application 125, including bank personnel, such as the production support employees and the MODs. The academy 900 provides access to certification programs, which contain training modules for specific positions within the bank. In other embodiments, the modules may be singular modules not associated with specific certification programs. FIG. 27 illustrates the academy 900 home page, including tabs for the academy home 902, view all learning 904, search learning 906, and view transcripts 908 sections. The training modules may be provided to the user 104 in a number of different formats. The modules may be slide presentations, videos, pure audio, or an interactive display, to name a few.

The academy home 902 tab includes any required certifications 912 that are deemed necessary by the bank, LOB, department, or group in which the user 104 works. A status indicator 914 notes if the certificate program is available to take, if it is in process, or if it has been completed. A note icon 916 is also provided to make notes related to the certification, and a bookmark 918 is provided to take the user to specific links associated with the certification program.

The academy home 902 tab also has a drill-down button 920 to allow the user 104 to look at each of the specific modules and requirements associated with the certification program, as illustrated in FIG. 28. The drill-down of the certification lists each module that is required and whether or not the module is available, in progress, completed, or locked 922 (which indicates that the user must complete other modules before locked modules become available). Each module may have a number of sections that the user 104 completes before being allow to move on to the next section or module. Test or quizzes may also be required at the end of the modules to determine the user's 104 proficiency with the subject matter before the user 104 is allow to proceed to other modules or before certification for a particular program is granted. Again, a status indicator 914 displays the status for each module.

The view all learning 904 tab allows the user to browse through all of the learning modules that are available at the bank and add them or any certificate programs to the user's 104 academy home 902. The certificate programs and modules may be organized as requirements for specific job openings, or jobs within a group, department, sub-channel, or channel. The user 104 can add the certification programs or modules that the user 104 is required to take, along with any that are available to the user 104 to improve the user's 104 general knowledge about other groups, departments, sub-channels, or channels within the bank. Furthermore, some users 104 who are in charge of a group, department, etc. may have the ability to assign specific certification programs or modules to other users 104 that work in that group, department, etc. The certification program or modules may be uploaded by the boss of the group, department, etc. to all of the users 104 in that specific group, department, etc. as required training or areas of interest for the user's 104 in the boss' group, department, etc.

The search learning 906 tab allows a user 104 to perform keyword, date, group, department, sub-channel, channel, etc. searching for any certification programs or modules that the user 104 may want to take. The search results display all of the certification programs or modules at the bank. If the user 104 is allowed access to the certification programs or modules, then the user 104 may add any of the programs found in the search leaning 906 tab to the user's 104 academy home 902 tab.

The view transcript 908 tab allows a user to view the user's 104 certification program or module history outlining what programs and modules the user 104 has completed and passed. Furthermore, it lists the scores of any tests or quizzes that the user took or was required to take. The view transcript 908 tab is not only very helpful in keeping track of the various certification programs and modules by the user 104, but also for the manager and executives as well as audit organizations, and regulators. Manager's and executives can easily upload modules to the academy home 902 tab of an employee, and track in the view transcript 908 tab what employees have completed the modules. Furthermore, audit teams do not have to spend time finding out if users 104 of a bank application have been properly appraised of and trained on a particular application because they can view the transcript 908 tab to see instantly whether all of the user's 104 have completed the required training. Additionally, if regulators want to know if the bank has informed the employees about changes in federal regulations, the regulators can be shown the view transcript 908 tab outlining the user's 104 who have completed the associated training module.

Within the modules in the academy 900, a user 104 can navigate through links to content pages looking for information elsewhere in the knowledge management application 125. The user 104 can also, add, edit, and delete notes on particular pages of each of the modules, and return to the modules or note sections if they have questions in the future. Bookmarks for specific areas visited within the knowledge management application 125 can be added or removed within the modules to help direct the users 104 to areas related to the modules.

In other embodiments of the invention users 104 may play games in the academy 900 that are related to modules. The academy 900 also contains a glossary of terms so users 104 not familiar with certain terms within the modules are able to look them up to provide a better understanding of the module.

FIG. 29 illustrates an example of the interactive display module interface 950. Icons 952 are used for global functions such as changing the theme, time keeping, or bookmarking different modules or areas within the knowledge management application 125. Window buttons 954 are provided for closing, minimizing, and resizing the display. The display module interface 950 also has a main link 956 for linking with the knowledge management application 125 home page. A tool bar 958 contains icons for links within the interactive display to areas, such as but not limited to, the home page, glossary function, resources page, help page, notes page, print function, interactive games, quizzes and test page, playbooks 100 tab, etc. A user 104 can view any of these sections by clicking on the link provided in the tool bar 958. A course exit button 959 is also provided for the user 104 to exit the course during or after a module is completed. If the interactive display module interface 950 is exited during a module the user's 104 progress is saved before the module is exited.

In one embodiment, the main content area 960 of the interactive display module interface 950 has a title 962, a navigation path area 964 for moving throughout the module, and go forward 966 and go back 968 features for moving back and forth throughout a module. The content display 970 shows the specific page of the module that user is working on and the audio transcript area 972 provides text of the audio content. Finally, the character animation 980 makes it look and sound as if the character is teaching the lesson and includes character animation controls 982 for controlling the audio and animation of the character.

FIG. 30 illustrates an academy process flow 1900 used by the knowledge management system 1 outlining how it tracks and displays the training modules and certification programs for each of the users 104 at the bank. As illustrated by block 1902, the knowledge management application 125 receives training modules and certification programs, along with the associated tests, quizzes, video files, audio files, etc. from a user 104 though the user computer systems 110 or automatically through the bank computer systems 140 and stores them in the bank databases 130. The modules and certification programs may be created and uploaded to the knowledge management application 125 by the user 104 or they can be pulled or pushed into the academy 900 by the knowledge management application 125 as they are created.

As illustrated by block 1904 when a user 104 selects a training module or certification program through the user computer system 110, the knowledge management application 125 allows the user 104 access to that module or certification program. As illustrated by block 1906, as the user 104 completes the training modules or certification programs and the associated tests, quizzes, etc. the knowledge management application 125 receives the notification of completion from the user computer systems 110 and stores the progress in the bank databases 130. Furthermore, as illustrated in block 1908, as the user 104 completes the training modules or certification programs the knowledge management application 125 unlocks additional training modules or certification programs for the user 104. As illustrated in block 1910 the knowledge management application 125 also tracks and stores the results of any tests, quizzes, training modules, or certification programs in a transcript section in the bank databases 130.

The following U.S. patent applications are filed concurrently with the present application on Apr. 22, 2009 and are hereby incorporated by reference: U.S. patent application Ser. No. 12/428,330 to Grace et al. and entitled "Knowledge Management System," which has issued into U.S. Pat. No. 8,589,196; U.S. patent application Ser. No. 12/428,335 to Grace et al. and entitled "Operational Reliability Index for the Knowledge Management System," which has issued into U.S. Pat. No. 8,527,328; U.S. patent application Ser. No. 12/428,337 to Grace et al. and entitled "Incident Communication Interface for the Knowledge Management System," which has issued into U.S. Pat. No. 8,266,072; and U.S. patent application Ser. No. 12/428,340 to Grace et al. and entitled "Academy for the Knowledge Management System," which has issued into U.S. Pat. No. 8,275,797.

Specific embodiments of the invention are described herein. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A monitoring system for use in tracking and resolving incidents occurring in a business, the system comprising:
    a user interface;
    a memory device;
    a communication device; and
    a processor operatively coupled to the communication device, the user interface, and the memory device, and configured to execute the computer-readable program code to:
        receive information related to one or more incidents, where each incident is associated with a business channel, a sub-channel, and an application;
        store the information in the memory device;
        provide a knowledge management application for tracking and displaying each of the one or more incidents, wherein the knowledge management application includes a knowledgebase for searching resolved incidents and an incident communications interface for viewing information related to the incidents;
        track a status of each of the one or more incidents between an occurrence and a resolution of the one or more incidents;
        display on the user interface the information related to the one or more incidents on a channel level, a sub-channel level, an application level, and an individual incident level;
        store, for each of the one or more instances the status and a resolution in the memory device, wherein the stored information, status, and resolution further comprises data relating to the process, people, and resources utilized to resolve each of the one or more incidents; and
        allow searchable access to the stored information, status, and resolution for each of the one more incidents that have been resolved such that the information, status, and resolution of each of the one or more incidents that have been resolved aid in determining resolutions for similar incidents that occur.

2. The system of claim 1, wherein the user interface displays information associated with the two or more incidents, such as the number of open incident tickets, incidents open longer than a specific response time, the number of incidents per channel, sub-channel, and application per hour, day, and week, the number of failed customer interactions resulting from the incidents, the root cause of the incidents, or the number of failed customer interactions in the channels, sub-channels, or applications as they relate to other channels, sub-channels, or applications.

3. The system of claim 1, wherein the processor is operable to execute computer-readable instructions stored in the computer-readable medium to display on the user interface the number of incidents associated with each business channel, sub-channel, or application.

4. The system of claim 1, wherein the processor is operable to execute computer-readable instructions stored in the computer-readable medium to display on the user interface a performance score associated with each business channel, sub-channel, or application.

5. The system of claim 1, wherein the processor is operable to execute computer-readable instructions stored in the computer-readable medium to: provide a knowledge management application that further includes an academy for providing training to users such that the user is qualified to respond to the one or more incidents; and
    display on the user interface the academy for providing training associated with the incidents.

6. The system of claim 1, wherein the processor is operable to execute computer-readable instructions stored in the computer-readable medium to display on the user interface failed customer interactions that resulted from the incidents.

7. A monitoring system for use in tracking and resolving incidents occurring in a business, the system comprising:
    a user interface;
    a memory device;
    a communication device; and
    a processor operatively coupled to the communication device, the user interface, and the memory device, and configured to execute the computer-readable program code to:
        receive information related to one or more incidents associated with a business channel, a sub-channel, and an application within a financial institution;

store the information in the memory device;

provide a knowledge management application for tracking and displaying each of the one or more incidents, wherein the knowledge management application includes a knowledgebase for searching resolved incidents and an incident communications interface for viewing information related to the incidents;

display on a dashboard on the user interface the business channels, the sub-channels, and the applications along with information about the one or more incidents associated with each business channel, sub-channel, and application;

store, for each of the one or more instances the status and a resolution in the memory device, wherein the stored information, status, and resolution further comprises data relating to the process, people, and resources utilized to resolve each of the one or more incidents; and allow searchable access to the stored information, status, and resolution for each of the one more incidents that have been resolved such that the information, status, and resolution of each of the one or more incidents that have been resolved aid in determining resolutions for similar incidents that occur.

8. The system of claim 7, wherein the processor is operable to execute computer-readable instructions stored in the computer-readable medium to display on the user interface information related to the one or more incidents on a channel level, a sub-channel level, an application level, and an individual incident level.

9. The system of claim 7, wherein the processor is operable to execute computer-readable instructions stored in the computer-readable medium to track the status of at least one incident between the occurrence and the resolution of the incident.

10. The system of claim 7, wherein the user interface displays information associated with the one or more incidents, such as the number of open incident tickets, incidents open longer than a specific response time, the number of incidents per channel, sub-channel, and application per hour, day, and week, the number of failed customer interactions resulting from the incidents, the root cause of the incidents, or the number of failed customer interactions in the channels, sub-channels, or applications as they relate to other channels, sub-channels, or applications.

11. The system of claim 7, wherein the processor is operable to execute computer-readable instructions stored in the computer-readable medium to display on the user interface information regarding whether the performance associated with the incidents is unacceptable or acceptable.

12. The system of claim 7, wherein the processor is operable to execute computer-readable instructions stored in the computer-readable medium to: provide a knowledge management application that further includes an academy for providing training to users such that the user is qualified to respond to the one or more incidents; and display on the user interface the academy for providing training associated with the incidents.

13. The system of claim 7, wherein the processor is operable to execute computer-readable instructions stored in the computer-readable medium to display on the user interface links to individual incidents for viewing analysis and details related to the individual incident.

14. A computer program product for a monitoring system, the computer program product comprising at least one non-transitory computer-readable medium having computer-readable program code portions embodied therein, the computer-readable program code portions comprising:

an executable portion configured for receiving, through the use of a processor, information related to one or more incidents, where each incident is associated with a business channel, a sub-channel, and an application, and wherein the processor is operatively coupled to a memory device, a communication device, a user interface, and the computer-readable program code;

an executable portion configured for storing the information on the memory device;

an executable portion configured for providing a knowledge management application for tracking and displaying each of the one or more incidents, wherein the knowledge management application includes a knowledgebase for searching resolved incidents and an incident communications interface for viewing information related to the incidents;

an executable portion configured for tracking, through the use of the processor, a status of each of the one or more incidents between an occurrence and a resolution of the one or more incidents;

an executable portion configured for displaying, on the user interface, the information related to the incident on a channel level, a sub-channel level, an application level, and an individual incident level;

an executable portion configured for storing, for each of the one or more instances a status and a resolution in the memory device, wherein the stored information, status, and resolution further comprises data relating to the process, people, and resources utilized to resolve each of the one or more incidents; and an executable portion configured for allowing searchable access to the stored information, status, and resolution for each of the one more incidents that have been resolved such that the information, status, and resolution of each of the one or more incidents that have been resolved aid in determining resolutions for similar incidents that occur.

15. The computer program product of claim 14, wherein the user interface displays information associated with the two or more incidents, such as the number of open incident tickets, incidents open longer than a specific response time, the number of incidents per channel, sub-channel, and application per hour, day, and week, the number of failed customer interactions resulting from the incidents, the root cause of the incidents, or the number of failed customer interactions in the channels, sub-channels, or applications as they relate to other channels, sub-channels, or applications.

16. The computer program product of claim 14, comprising: an executable portion configured for displaying, on the user interface, the number of incidents associated with each business channel, sub-channel, or application.

17. The computer program product of claim 14, comprising: an executable portion configured for displaying, on the user interface, a performance score associated with each business channel, sub-channel, or application.

18. The computer program product of claim 14, comprising:

an executable portion configured for providing a knowledge management application that further includes an academy for providing training to users such that the user is qualified to respond to the one or more incidents; and an executable portion configured for displaying on the user interface the academy for providing training associated with the incidents displaying, on the user interface, one or more graphical charts illustrating one or more of the following factors associated with the incidents: response times for the incidents; intensity of the incidents or failed customer interactions; root causes of the incidents or failure to resolve the incidents; or ratios of the incidents or failed customer interactions per channel, sub-channel, or application.

19. The computer program product of claim 14, comprising: an executable portion configured for displaying, on the user interface, failed customer interactions that resulted from the incidents.

20. A computer program product for a monitoring system, the computer program product comprising at least one non-transitory computer-readable medium having computer-readable program code portions embodied therein, the computer-readable program code portions comprising:

an executable portion configured for receiving, through the use of a processor, information related to one or more incidents associated with a business channel, a sub-channel, and an application, and wherein the processor is operatively coupled to a memory device, a communication device, a user interface, and the computer-readable program code;

an executable portion configured for storing the information on the memory device;

an executable portion configured for providing a knowledge management application for tracking and displaying each of the one or more incidents, wherein the knowledge management application includes a knowledgebase for searching resolved incidents and an incident communications interface for viewing information related to the incidents;

an executable portion configured for displaying, on the user interface, the business channels, sub-channels, and applications along with the information about the incidents associated with each business channel, sub-channel, and application;

an executable portion configured for storing, for each of the one or more instances a status and a resolution in the memory device, wherein the stored information, status, and resolution further comprises data relating to the process, people, and resources utilized to resolve each of the one or more incidents; and an executable portion configured for allowing searchable access to the stored information, status, and resolution for each of the one more incidents that have been resolved such that the information, status, and resolution of each of the one or more incidents that have been resolved aid in determining resolutions for similar incidents that occur.

21. The computer program product of claim 20, comprising: an executable portion configured for displaying, on the user interface, information related to the incident on a channel level, a sub-channel level, an application level, and an individual incident level.

22. The computer program product of claim 20, comprising: an executable portion configured for tracking, through the use of the processor, the status of at least one incident between the occurrence and the resolution of the incident.

23. The computer program product of claim 20, wherein the user interface displays information associated with the one or more incidents, such as the number of open incident tickets, incidents open longer than a specific response time, the number of incidents per channel, sub-channel, and application per hour, day, and week, the number of failed customer interactions resulting from the incidents, the root cause of the incidents, or the number of failed customer interactions in the channels, sub-channels, or applications as they relate to other channels, sub-channels, or applications.

24. The computer program product of claim 20, comprising: an executable portion configured for displaying, on the user interface, information regarding whether the performance associated with the one or more incidents are unacceptable or acceptable.

25. The computer program product of claim 20, comprising:

an executable portion configured for providing a knowledge management application that further includes an academy for providing training to users such that the user is qualified to respond to the one or more incidents; and an executable portion configured for displaying, on the user interface the academy for providing training associated with the incidents.

26. The computer program product of claim 20, comprising; an executable portion configured for displaying, on the user interfaces, links to individual incidents for viewing Analysis and details related to the individual incident.

\* \* \* \* \*